(12) United States Patent
Kim et al.

(10) Patent No.: US 10,924,912 B2
(45) Date of Patent: Feb. 16, 2021

(54) METHOD FOR TRANSMITTING AND RECEIVING DATA THROUGH RELAY IN WIRELESS COMMUNICATION SYSTEM AND APPARATUS THEREFOR

(71) Applicant: LG ELECTRONICS INC., Seoul (KR)

(72) Inventors: Taehun Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/473,204

(22) PCT Filed: Jan. 8, 2018

(86) PCT No.: PCT/KR2018/000368
§ 371 (c)(1),
(2) Date: Jun. 24, 2019

(87) PCT Pub. No.: WO2018/128505
PCT Pub. Date: Jul. 12, 2018

(65) Prior Publication Data
US 2020/0100088 A1  Mar. 26, 2020

Related U.S. Application Data

(60) Provisional application No. 62/442,998, filed on Jan. 6, 2017, provisional application No. 62/476,731, filed (Continued)

(51) Int. Cl.
*H04W 8/00* (2009.01)
*H04W 76/23* (2018.01)
(Continued)

(52) U.S. Cl.
CPC ........... *H04W 8/005* (2013.01); *H04W 48/08* (2013.01); *H04W 76/23* (2018.02); *H04W 88/04* (2013.01)

(58) Field of Classification Search
CPC ....... H04W 8/00; H04W 88/04; H04W 48/08; H04W 76/23; H04W 8/005
See application file for complete search history.

(56) References Cited

U.S. PATENT DOCUMENTS

2005/0122927 A1* 6/2005 Wentink ............... H04B 7/2126
370/311
2015/0304996 A1* 10/2015 Yang ..................... H04L 5/0055
370/329
(Continued)

FOREIGN PATENT DOCUMENTS

KR  1020160064172  6/2016
WO  2016164493  10/2016

OTHER PUBLICATIONS

PCT International Application No. PCT/KR2014/005057, International Search Report dated Apr. 24, 2018, 5 pages.
(Continued)

*Primary Examiner* — Chi Ho A Lee
(74) *Attorney, Agent, or Firm* — Lee Hong Degerman Kang Waimey

(57) ABSTRACT

Disclosed are a method for transmitting and receiving data through a relay in a wireless communication system and an apparatus therefor. Specifically, a method for transmitting and receiving, by a remote user equipment (UE), data to and from a network through a relay UE in a wireless communication system includes: recognizing that small data to be transmitted to the network is generated; performing a discovery procedure through the relay UE and a PC5 interface; and transmitting a PC5 message including the small data to the relay UE when it is verified that the relay UE has an
(Continued)

ability to transmit the small data to the network in the discovery procedure, in which when it is indicated that the relay UE supports a small data transmitting procedure by a PC5 discovery message received from the relay UE in the discovery procedure, it may be determined that the relay UE has the ability to transmit the small data to the network.

15 Claims, 20 Drawing Sheets

Related U.S. Application Data on Mar. 25, 2017, provisional application No. 62/584,606, filed on Nov. 10, 2017.

(51) Int. Cl.
*H04W 48/08* (2009.01)
*H04W 88/04* (2009.01)

(56) References Cited

U.S. PATENT DOCUMENTS

| | | | |
|---|---|---|---|
| 2016/0044613 A1 | 2/2016 | Cai et al. | |
| 2016/0309377 A1 | 10/2016 | Jung et al. | |
| 2017/0041752 A1* | 2/2017 | Baek | H04W 4/60 |
| 2017/0353819 A1* | 12/2017 | Yin | H04L 47/30 |
| 2018/0092125 A1* | 3/2018 | Sun | H04W 74/02 |
| 2018/0295556 A1* | 10/2018 | Baek | H04L 63/306 |
| 2019/0281127 A1* | 9/2019 | Schmidt | H04W 76/14 |
| 2019/0313248 A1* | 10/2019 | Middelesch | H04W 8/08 |
| 2020/0053802 A1* | 2/2020 | Li | H04L 41/5041 |

OTHER PUBLICATIONS

Huawei, et al., "Relay discovery and connection setup procedures on LTE Sidelink", 3GPP TSG RAN WG2 Meeting #96, R2-167694, Nov. 2016, 7 pages.

* cited by examiner (a) Control plane protocol stack (b) User plane protocol stack

METHOD FOR TRANSMITTING AND RECEIVING DATA THROUGH RELAY IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/000368, filed on Jan. 8, 2018, which claims the benefit of U.S. Provisional Application No. 62/442,998, filed on Jan. 6, 2017, 62/476,731, filed on Mar. 25, 2017, and 62/584,606, filed on Nov. 10, 2017, the contents of which are all hereby incorporated by reference herein in their entirety.

BACKGROUND OF THE INVENTION

Field of the Invention

The present invention relates to a wireless communication system, and more particularly, to a method for transmitting and receiving, by a remote user equipment) data to and from a network through a relay user equipment and an apparatus therefor.

Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

The present invention provides a method for transmitting and receiving, by a remote UE, data and from a network via a relay UE connected through PC5 (i.e., inter-UE radio interface/reference point).

The present invention also provides a method for transmitting and receiving, by the remote UE, small data which transmitted intermittently or one time to and from the network through a relay UE.

The present invention also provides a method for transmitting and receiving the small data between the relay UE and the network to/from multiple connected remote UEs.

The technical objects of the present invention are not limited to the aforementioned technical objects, and other technical objects, which are not mentioned above, will be apparently appreciated by a person having ordinary skill in the art from the following description.

In an aspect of the present invention, a method for transmitting and receiving, by a remote user equipment (UE), data to and from a network through a relay UE in a wireless communication system includes: recognizing that small data to be transmitted to the network is generated; performing a discovery procedure through the relay UE and a PC5 interface; and transmitting a PC5 message including the small data to the relay UE when it is verified that the relay UE has an ability to transmit the small data to the network in the discovery procedure, in which when it is indicated that the relay UE supports a small data transmitting procedure by a PC5 discovery message received from the relay UE in the discovery procedure, it may be determined that the relay UE has the ability to transmit the small data to the network.

In another aspect of the present invention, a remote user equipment (UE) transmitting and receiving data to and from a network through a relay UE in a wireless communication system includes: a communication module transmitting and receiving a wired/wireless signal; and a processor controlling the communication module, in which the processor may be configured to recognize that small data to be transmitted to the network is generated, perform a discovery procedure through the relay UE and a PC5 interface, and transmit a PC5 message including the small data to the relay UE when it is verified that the relay UE has an ability to transmit the small data to the network in the discovery procedure, and when it is indicated that the relay UE supports a small transmitting procedure by a PC5 discovery message received from the relay UE in the discovery procedure, it may be determined that the relay UE has the ability to transmit the small data to the network.

Preferably, the PC5 discovery message may be a PC5 discovery message for a UE-to-network relay discovery announcement or a PC5 discovery message for a UE-to-network relay discovery response.

Preferably, the PC5 discovery message may include a small data transmission indicator (SDTI) indicating whether the relay UE supports the small data transmitting procedure within a status indicator information element (IE) for indicating a status of a UE-to-network relay.

Preferably, when an indication indicating that transmission of the small data is required is provided from a higher layer of the remote UE together with the small data, it may be recognized that the small data to be transmitted to the network is generated.

Preferably, information indicating whether set-up of a user plane is required may be provided from the higher layer of the remote UE.

Preferably, the PC5 message may further include at least one of message type information indicating small data transmission or general data transmission, PDU type information indicating whether a protocol data unit (PDU) included in the PC5 message is a signaling or data, small data information indicating whether uplink and/or downlink transmission is predicted next to transmission of the small data, activation transmission time information indicating a time for maintaining transmission the relay UE and the PC5 interface, a security parameter, and a unique sequence number for the transmission of the small data.

Preferably, the method may further include receiving a PC5 response message in response to the PC5 message, in which the PCT message may include information indicating whether the transmission of the small data is successful or unsuccessful, a unique sequence number for the small data transmission, and the security parameter.

Preferably, in a case where a type of small data is control plane data, when the relay UE is in an idle mode, the small data of the remote UE, which is included in a non-access stratum (NAS) message may be transmitted to the network by a control plane without performing a procedure for the relay UE to be switched to a connected mode.

Preferably, after data transmission is completed through an established direct link with the relay UE, a suspend request message for requesting suspension of the established direct link may be transmitted or received and a suspend accept message for indicating that the suspension for the established direct link is accepted may be received or transmitted.

Preferably, the suspend request message may include at least one of an indication indicating that transmission of all data is completed, a suspend request message, a resume identifier, a signaling or a communication bandwidth, and communication period information.

Preferably, the suspend accept message may include at least one of the resume identifier, the signaling or the communication bandwidth, and the communication period information.

Preferably, a resume request message for requesting resumption of the suspended direct link may be transmitted and a resume message indicating whether the resumption of the suspended direct link is successful or unsuccessful may be received in response to the resume request message.

Preferably, the resume request message may include a resume identifier included in the suspend accept message.

Preferably, the resume request message may be used as the PC5 message including the small data.

The present invention has an advantage in that a remote UE, which is a low power, low rate, and low complexity/low cost device, can efficiently transmit small data.

Furthermore, the present invention has an advantage in that the remote UE and/or a relay UE can minimize power consumption.

Advantages which can be obtained in the present invention are not limited to the aforementioned effects and other unmentioned advantages will be clearly understood by those skilled in the art from the following description.

BRIEF DESCRIPTION OF THE DRAWINGS

In order to help understanding of the present invention, the accompanying drawings which are included as a part of the Detailed Description provide embodiments of the present invention and describe the technical features of the present invention together with the Detailed Description.

DESCRIPTION OF EXEMPLARY EMBODIMENTS

Figure 1:
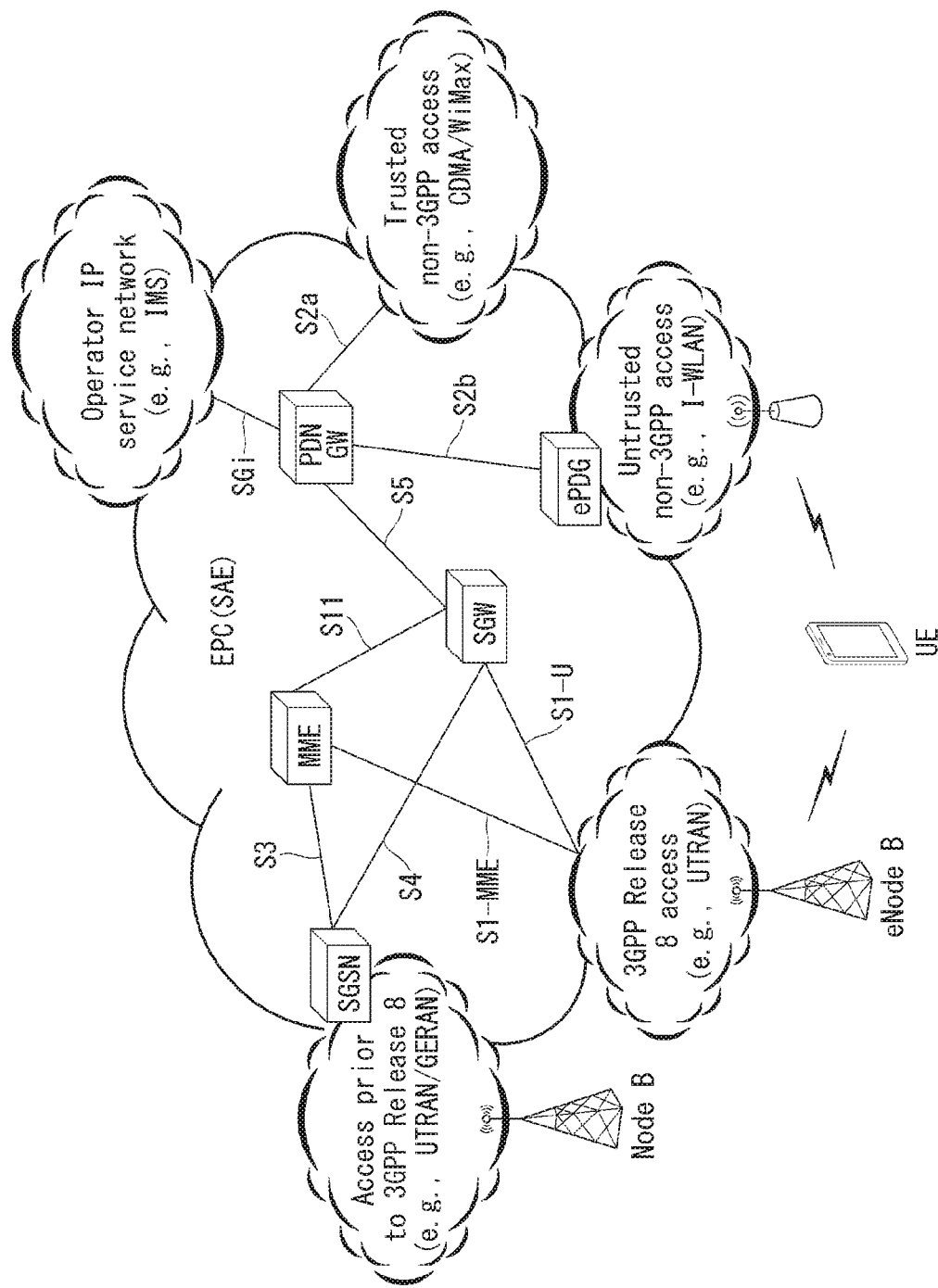
FIG. 1 is a diagram schematically illustrating an evolved packet system (EPS) to which the present invention may be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention may be embodied without the specific information.

For some cases, to avoid obscuring the technical principles of the present invention, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Also, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention may be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention may be supported by the documents above. Also, all of the terms disclosed in this document may be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It may be installed inside or outside a mobile communication network. It may provide an interface through which an MTC user may access the server. Also, an MTC server may provide MTC-related services to other servers (in the form of Services Capability Server (SCS)) or the MTC server itself may be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier includes a domain identifier and a local identifier as described below.

Domain identifier: an identifier used for identifying a domain in the control region of a mobile communication network service provider. A service provider may use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS may perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of system to which the present invention may be applied

FIG. 1 illustrates an Evolved Packet System (EPS) to which the present invention may be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC includes various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, if UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW may support policy enforcement features, packet filtering, charging support, and so on. Also, the PDN GW may act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability may access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
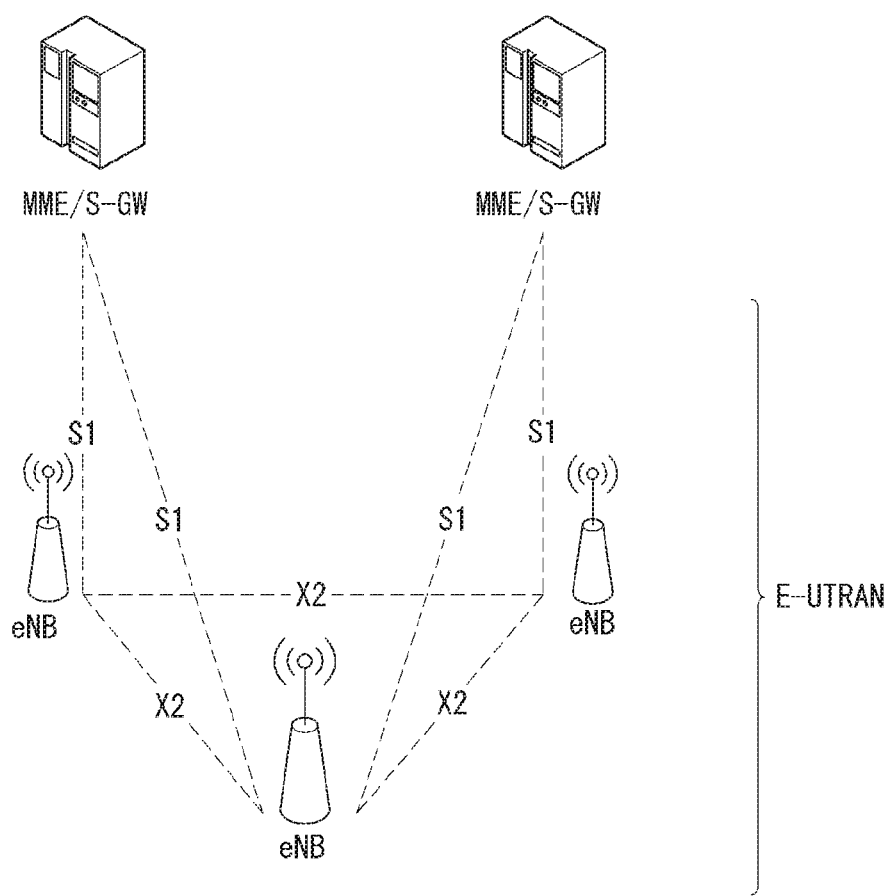
FIG. 2 illustrates an example of a network structure of an evolved universal terrestrial radio access network (E-UTRAN) to which the present invention may be applied.

FIG. 2 illustrates one example of an Evolved Universal Terrestrial Radio Access Network (E-UTRAN) to which the present invention may be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

Figure 3:
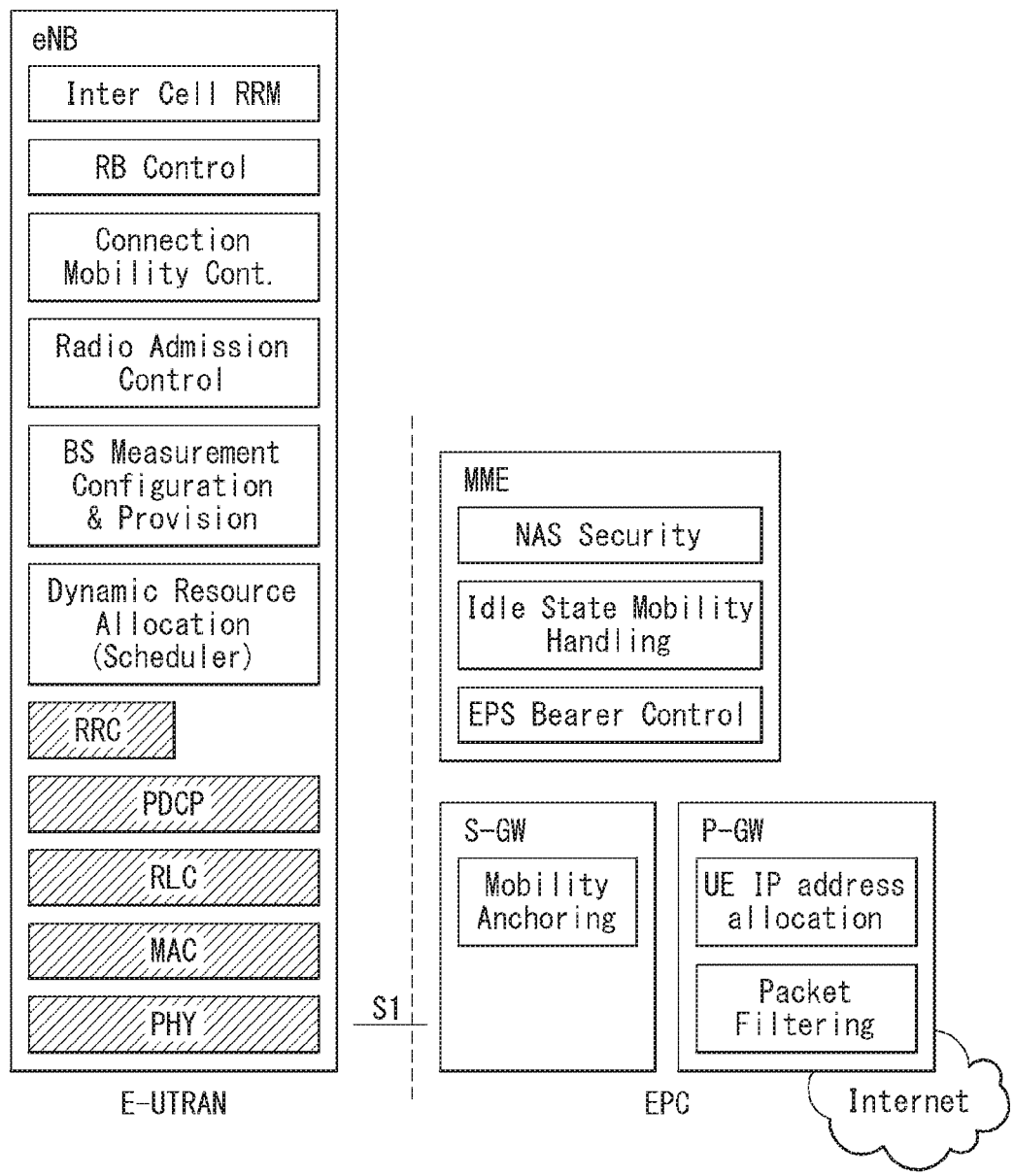
FIG. 3 illustrates structures of E-UTRAN and EPC in a wireless communication system to which the present invention may be applied.

FIG. 3 exemplifies a structure of E-UTRAN and EPC in a wireless communication system to which the present invention may be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

Figure 4:
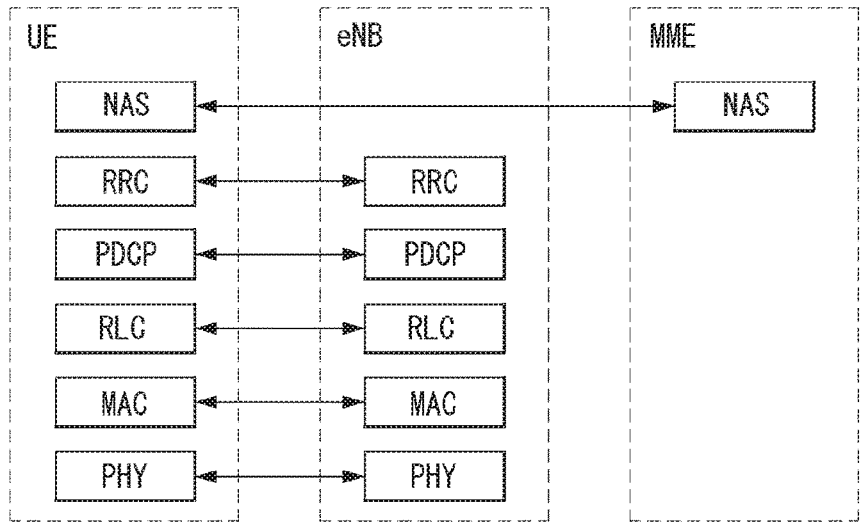
FIG. 4 illustrates a radio interface protocol structure between a UE and the E-UTRAN in the wireless communication system to which the present invention may be applied.
Figure 4:
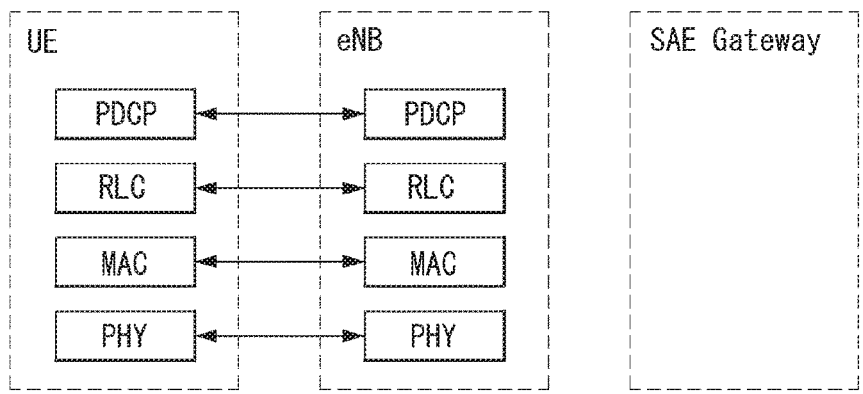

FIG. 4 illustrates a radio interface protocol structure between a UE and an E-UTRAN in a wireless communication system to which the present invention may be applied.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH may carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM).

The AM RLC provides error correction through Automatic Repeat reQuest (ARQ). Meanwhile, if MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

Figure 5:
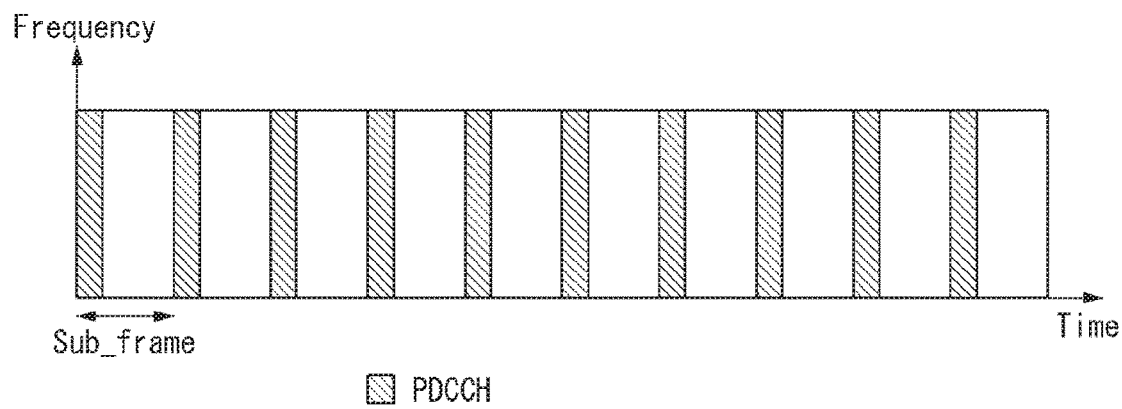
FIG. 5 is a diagram schematically illustrating a structure of a physical channel in the wireless communication system to which the present invention may be applied.

FIG. 5 is a diagram schematically exemplifying a structure of physical channel in a wireless communication system to which the present invention may be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

Figure 6:
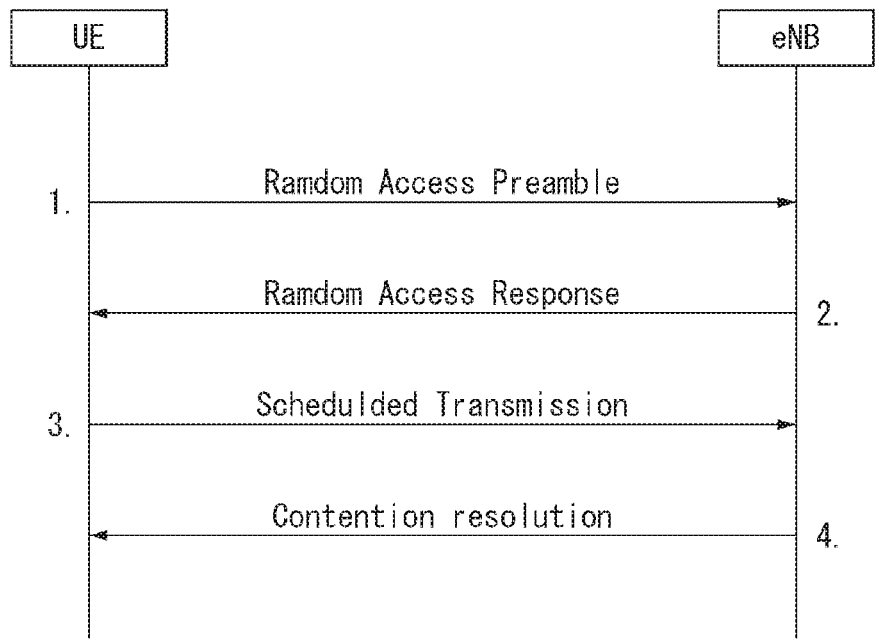
FIG. 6 is a diagram for describing a contention based random access procedure in the wireless communication system to which the present invention may be applied.

FIG. 6 is a diagram for describing the contention-based random access procedure in the wireless communication system to which the present invention may be applied.

(1) Message 1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, SAE temporary mobile subscriber identity (S-TMSI) or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Figure 11:
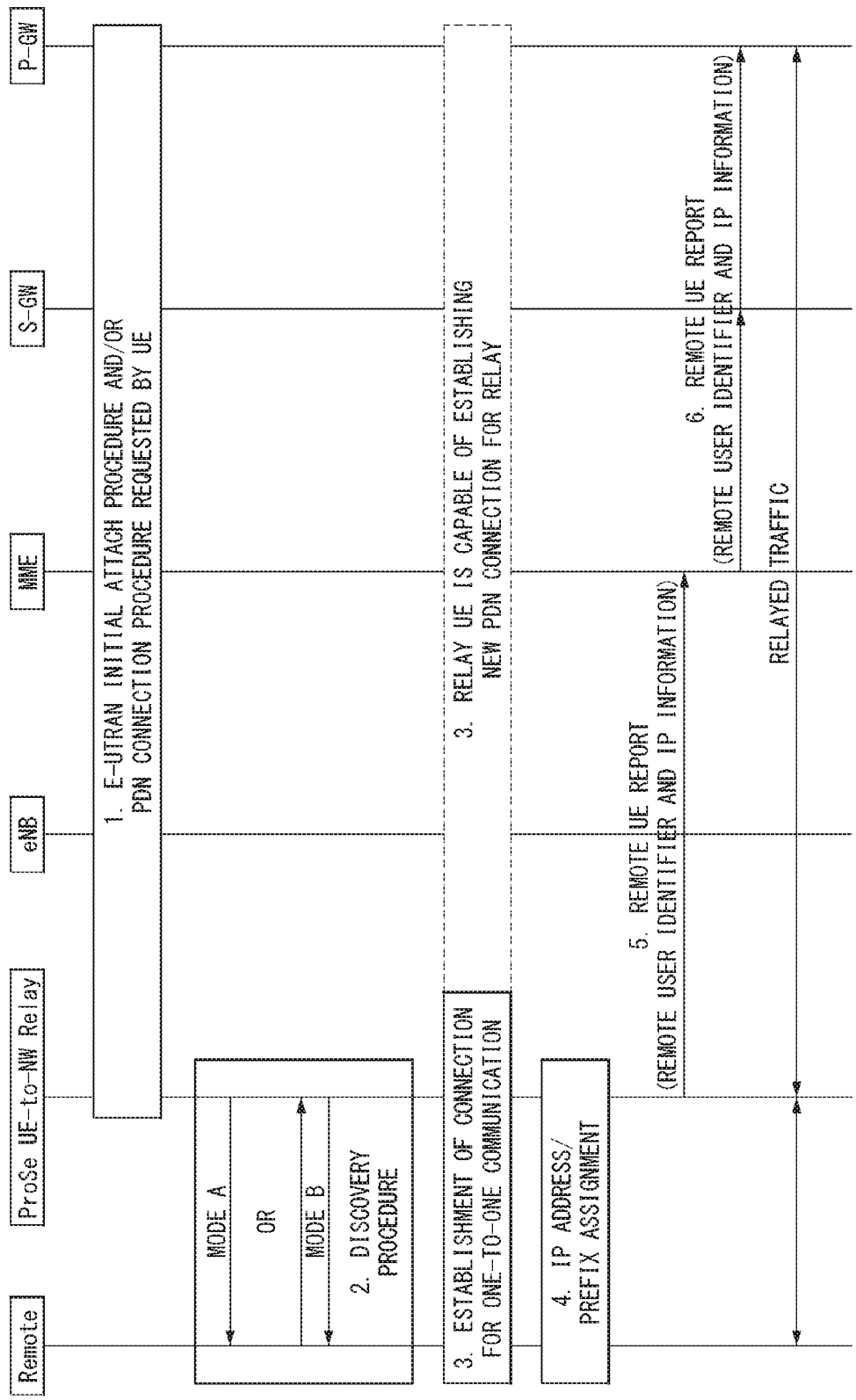
FIG. 11 is a diagram illustrating a ProSe UE-to-network relay procedure in the wireless communication system to which the present invention may be applied.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Terms used in this specification are described below.

Dedicated bearer: an EPS bearer associated with an uplink packet filter(s) within a UE and a downlink packet filter(s) within a P-GW. In this case, only a specific packet is matched with the filter(s).

Default bearer: an EPS bearer established even new PDN connection. Context of a default bearer is maintained during the lifetime of a PDN connection.

EPS mobility management (EMM)-EMM-NULL state: an EPS service within a UE is deactivated. Any EPS mobility management function is not performed.

EMM-DEREGISTERED state: in the EMM-DEREGISTERED state, EMM context is not established and an MME is not notified of a UE location. Accordingly, the UE is unreachable by the MME. In order to establish EMM context, the UE needs to start an Attach or combined Attach procedure.

EMM-REGISTERED state: In the EMM-REGISTERED state, EMM context within a UE has been established and default EPS bearer context has been activated. When a UE is in the EMM-IDLE mode, an MME is notified of a UE location with accuracy of a list of TAs including a specific number of a TA. The UE may initiate the transmission and reception of user data and signaling information and may respond to paging. Furthermore, a TAU or combined TAU procedure is performed.

EMM-CONNECTED mode: when an NAS signaling connection is set up between a UE and a network, the UE is the EMM-CONNECTED mode. The term "EMM-CONNECTED" may be referred to as a term "ECM-CONNECTED state."

EMM-IDLE mode: when an NAS signaling connection is not present between a UE and a network (i.e., an EMM-IDLE mode without suspend indication) or RRC connection suspend is indicated by a lower layer (i.e., an EMM-IDLE mode with suspend indication), the UE is in the EMM-IDLE mode. The term "EMM-IDLE" may be referred to as a term "ECM-IDLE state."

EMM context: when an Attach procedure is successfully completed, EMM context is established between a UE and an MME.

Control plane CIoT EPS optimization: signaling optimization that enables the efficient transport of user data (IP, non-IP or SMS) through a control plane via an MME. This may optionally include the header compression of IP data.

User plane CIoT EPS optimization: signaling optimization that enables the efficient transport of user data (IP or non-IP) through a user plane.

EPS service(s): a service(s) provided by a PS domain.

NAS signaling connection: a peer-to-peer S1 mode connection between a UE and an MME. An NAS signaling connection has a concatenation of an RRC connection via an LTE-Uu interface and an S1AP connection via an S1 interface.

UE using EPS services with control plane CIoT EPS optimization: UE attached for EPS services with control plane CIOT EPS optimization approved by a network Non-access stratum (NAS): a functional layer for exchanging an UMTS, signaling between a UE and a core network in an EPS protocol stack, and a traffic message. This has a main function of supporting the mobility of a UE and supporting a session management procedure of establishing and maintaining an IP connection between a UE and a PDN GW.

Access stratum (AS): this means a protocol layer under the NAS layer on the interface protocol between an E-UTRAN (eNB) and a UE or between an E-UTRAN (eNB) and an MME. For example, in the control plane protocol stack, the RRC layer, PDCP layer, RLC layer, MAC layer and PHY layer may be collectively referred to as an AS layer or any one of the layers may be referred to as an AS layer. Or, in the user plane protocol stack, the PDCP layer, RLC layer, MAC layer and PHY layer may be collectively referred to as an AS layer or any one of the layers may be referred to as an AS layer.

S1 mode: a mode applied to a system having functional separation according to the use of an S1 interface between a radio access network and a core network. The S1 mode includes a WB-S1 mode and an NB-S1 mode.

NB-S1 mode: this mode is applied by a UE when a serving radio access network of the UE provides access to a network service (via E-UTRA) based on a narrow band (NB)-Internet of things (IoT).

WB-S1 mode: this mode is applied when a system operates in the S1 mode, but is not the NB-S1 mode.

In 3GPP Release 14, service requirements are being worked in SA1 so that non-public safety UEs receives a network connection service through a relay UE. As a UE receiving the network connection service through the relay UE, a wearable device is representatively considered.

Even in SA2 and RAN WG, each of FS_REAR (a remote UE connection through the relay UE) and F2D2D (enhancement of LTE device to device communication and a relay between a UE and a network for Internet of things (IoT) and wearables) as a study item description (SID) for a release (Rel)-13 relay is approved and a study related thereto is in progress.

Characteristically, an F2D2D study item is under discussion to target low power, low rate, and low complexity/low cost devices.

In addition, in an FS_REAR study item, it is discussed whether a common solution for asymmetric uplink/downlink connection (i.e., uplink transmission through the PC5 and direct downlink transmission through Uu with an enhanced ProSe UE-to-Network Relay) and symmetric uplink/downlink connection is available.

As described above, two cases, i.e., asymmetric uplink/downlink and symmetric uplink/downlink are considered.

Here, the 'asymmetric uplink/downlink' refers to a case where the remote UE uses a direct link with the relay UE for the uplink transmission and a Uu interface from an eNB for downlink transmission.

The 'symmetric uplink/downlink' refers to a case where the remote UE uses the direct link with the relay UE for both uplink and downlink transmissions.

Hereinafter, the present invention proposes a method for transmitting and receiving, by the remote UE, small data through the relay UE.

One-to-One Proximity-Based Services (ProSe) Direct Communication and PC5 Signaling Procedures/Messages Hereinafter, a PC5 (i.e., UE-to-UE radio interface) signaling protocol procedure between two ProSe-enabled UEs for the one-to-one ProSe direct communication will be described.

The following PC5 signaling protocol procedure is defined:
Direct link setup;
Direct link keepalive;
Direct link release; and
Direct link authentication.

The UE should be authenticated for the one-to-one ProSe direct communication and acquire a ProSe direct communication policy parameter based on a service authentication procedure before initiating or participating in any PC5 signaling protocol procedure for the one-to-one ProSe direct communication.

The UE selects a radio resource for the one-to-one ProSe direct communication.

For one-to-one communication between the remote UE and a ProSe UE-to-network relay UE, when the remote UE receives a lower layer indication that the use of a radio resource for relay communication is not permitted, the remote UE stops an ongoing procedure (i.e., PC5 signaling protocol procedure and data transmission/reception) involving the relay. In addition, the remote UE starts a specific timer having a T value. While the timer is running, the remote UE does not initiate any procedure involving the relay. When the remote UE receives a lower layer indication that the use of the radio resource for the relay communication is permitted, the remote UE may stop the specific timer and resume the procedure involving the relay. Otherwise, after the specific timer expires, the remote UE locally releases all direct links for communication with the relay(s).

1. Direct Link Setup Procedure

Hereinafter, the direct link setup procedure for setting up the direct link will be described. According to contents to be described below, the remote UE transmits a direct communication request (REQUEST_COMMUNICATION_REQUEST) message to the relay UE in order to set up the direct link. The DIRECT_COMMUNICATION_REQUEST message contains parameters required for setting up the direct link.

IP Address Config IE or Link Local IPv6 Address IE is a parameter required for assignment of an IP address of the remote UE.

The following are security related parameters for establishing a secure connection and authenticating the direct link.

Nonce_1 IE, UE Security Capabilities, Most Significant Bit (MSB) of KD-sess ID, KD ID, and Signature According to contents to be described below, when the relay UE receiving the DIRECT_COMMUNICATION_REQUEST message successfully completes confirmation of user information and an IP configuration, the UE performs a direct security mode control procedure in order to establish a security association with the remote UE.

1) General

The direct link setup procedure is used for establishing a safe direct link between two ProSe-enabled UEs. A UE that transmits the request message is referred to as "initiating UE" and the other UE is referred to as "target UE".

When the direct link setup is for isolated one-to-one ProSe direct communication (i.e., when both UEs are not the ProSe UE-to-network relays), both UEs are required to obtain a set of qualifications associated with a public key of a key management server (KMS) and an identifier of the UE in advance.

2) Initiating Direct Link Setup Procedure by Initiating UE

Figure 7:
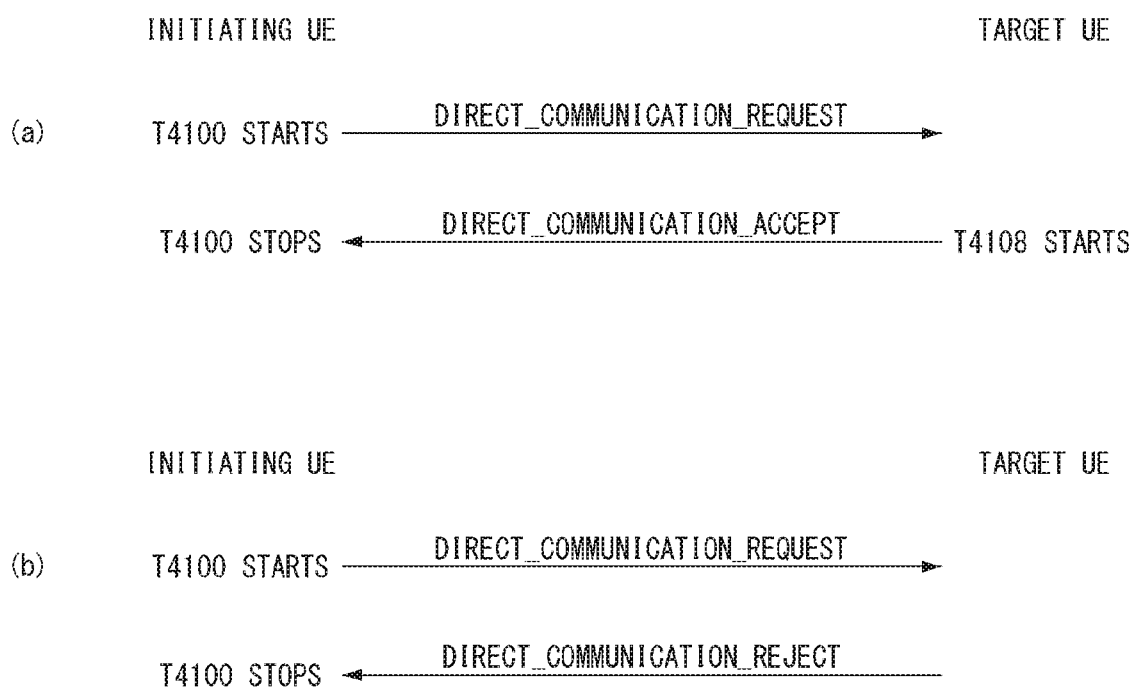
FIG. 7 illustrates a direct link setup procedure in the wireless communication system to which the present invention may be applied.

FIG. 7 illustrates a direct link setup procedure in the wireless communication system to which the present invention may be applied.

The initiating UE needs to satisfy the following pre-conditions before initiating such a procedure:
a request is received from an upper layer for establishing the direct link with a target UE and a link between the initiating UE and the corresponding target UE is not present;
a link layer identifier (i.e., layer 2 ID used for unicast communication) for the initiating UE is available (e.g., pre-configured or self-assigned);
a link layer identifier (i.e., layer 2 ID used for unicast communication) for the target UE is available for the initiating UE (e.g., pre-configured or acquired through ProSe direct discovery); and
the initiating UE is authenticated for ProSe direct communication in serving PLMN or has a valid authentication for the ProSe direct communication when is not served by E-UTRAN.

The initiating UE generates the direct communication request (DIRECT_COMMUNICATION_REQUEST) message to initiate the direct link setup procedure.

In this case, the DIRECT_COMMUNICATION_REQUEST message includes the following.

i) User information (User Info) set as follows:
User Info of the initiating UE, which is received from the upper layer when the target UE is not the ProSe UE-to-network relay UE;
ProSe relay user key ID received from a ProSe Key Management Function (PKMF) when the target UE is the ProSe UE-to-network relay UE and the initiating UE receives PRUK for the relay from the PKMF and a connection attempt to the relay is not rejected because a PRUK ID is not recognized;

IMSI of the initiating UE when the target UE is the ProSe UE-to-network relay UE and the initiating UE does not receive the PRUK from the PKMF for the relay; or IMSI of the initiating UE when the target UE is the ProSe UE-to-network relay UE and the initiating UE receives the PRUK from the PKMF for the relay, but the connection attempt to the relay is rejected because the PRUK ID is not recognized;

ii) Internet protocol (IP) address config information element (IE) set to one value of the following values:

when an IP version 4 (IPv4) address allocation mechanism is supported by the initiating UE, that is, the IP version 4 (IPv4) address allocation mechanism operates as a Dynamic Host Configuration Protocol version 4 (DHCPv4), "DHCPv4 server";

when an IP version 6 (Ipv6) address allocation mechanism is supported by the initiating UE, that is, the IP version 6 (Ipv6) address allocation mechanism operates as an Ipv6 router, "IPv6 router";

when both IPv4 and IPv6 address allocation mechanisms are supported by the initiating UE, "DHCPv4 server and IPv6 router"; or when both IPv4 and IPv6 address allocation mechanisms are not supported by the initiating UE, "address allocation not supported";

iii) when the IP Address Config IE is set to "address allocation not supported" and the link is set up for isolated one-to-one communication, link local address (Link Local IPv6 Address) IE locally formed based on Internet Engineering Task Force (IETF) Request for Comments (RFC) 4862;

iv) Maximum Inactivity Period IE indicating a maximum inactivity period of a requesting UE through the direct link;

v) Nonce_1 IE set to 128-bit nonce value generated by the initiating UE for establishing a session key through the direct link;

vi) UE Security Capabilities IE set to indicate a list of algorithms which the initiating UE supports for establishing security of the direct link;

vii) MSB of K_D-sess ID IE set to most significant 8 bits of K_D-sess identifier (ID); and viii) optionally, when the initiating UE has the existing K_D with the target UE, K_D ID IE set to known ID of K_D established previously.

When the direct link setup is for the isolated one-to-one ProSe direct communication, the DIRECT_COMMUNICATION_REQUEST message also includes the following parameter:

Signature IE set to Elliptic Curve-Based Certificateless Signatures for Identity-Based Encryption (ECCSI) signature calculated by User Info IE and Nonce_1 IE.

Otherwise, when the link setup is for ProSe direct communication to the ProSe UE-to-network relay, the DIRECT_COMMUNICATION_REQUEST message includes a Relay Service Code IE set to a relay service code of a target relay.

After the DIRECT_COMMUNICATION_REQUEST message is generated, the initiating UE transports the message to the lower layer together with layer 2 ID (for unicast communication) of the initiating UE and layer 2 ID (for unicast communication) of the target UE for transmitting the message and starts a T4100 timer. The UE does not transmit a new DIRECT_COMMUNICATION_REQUEST message to the same target UE while the T4100 timer is running.

3) Direct Link Setup Procedure Accepted by Target UE

Referring to FIG. 7(a), when receiving the DIRECT_COMMUNICATION_REQUEST message, the target UE stores a pair (for unicast communication) of layer 2 IDs used in transport of the message provided by the lower layer and associates the pair of layer 2 IDs with a direct link context.

The target UE checks the User Info IE included in the DIRECT_COMMUNICATION_REQUEST message and determines whether the request is to be accepted. In addition, the target UE checks IP Address Config IE in order to check whether at least one common IP address configuration option is supported by both the initiating UE and the target UE. When all checks described above are successful, the target UE calls the direct security mode control procedure in order to establish a security association between the target UE and the initiating UE. After completion of the link authentication procedure and successful establishment of the security association, the target UE transmits a direct communication accept (DIRECT_COMMUNICATION_ACCEPT) message to the initiating UE.

The target UE encapsulates the IP Address Config IE set to one of the following values:

when the IPv4 address allocation mechanism is supported by the target UE and the target UE may operate as the DHCP server, "DHCPv4 Server";

when the IPv6 address allocation mechanism is supported by the target UE and the target UE may operate as the IPv6 router, "IPv6 Router";

when both IPv4 and IPv6 address allocation mechanisms are supported by the target UE, "DHCPv4 server and IPv6 router"; or when both IPv4 and IPv6 address allocation mechanisms are not supported by the target UE, "address allocation not supported".

When the IP Address Config IE is set to "address allocation not supported" and the received DIRECT_COMMUNICATION_REQUEST message contains the Link Local IPv6 Address IE, the target UE encapsulates the Link Local IPv6 Address IE set to the locally formed link local IPv6 address.

The ProSe UE-to-network relay UE supports at least one IP address allocation mechanism.

In the case where the target UE operates as the ProSe UE-to-network relay UE and the PDN connection for the relay associated with the ProSe relay UE ID is not yet established or an additional PDN connection used for the relay is required when the ProSe UE-to-network relay UE transmits the DIRECT_COMMUNICATION_ACCEPT message to the remote UE, the ProSe UE-to-network relay UE transmits a PDN CONNECTIVITY REQUEST message including an APN associated with the ProSe Relay UE ID to initiate a UE-requested PDN connectivity procedure.

When the target UE is the ProSe-UE-to-network relay UE, the target UE generates an inactivity timer T4108 with the value provided by the Maximum Inactivity Period IE included in the DIRECT_COMMUNICATION_REQUEST message and when there is no more message to be transmitted via the link to be established, the target UE starts the T4108 timer. In the case where the T4108 timer is started, when any communication activity occurs before the T4108 timer expires, the UE terminates the T4108 timer and resets the T4108 timer to an initial value, otherwise a new value is provided in the Maximum Inactivity Period IE in the DIRECT_COMMUNICATION_KEEPALIVE message.

In the case where the target UE is the ProSe-UE-to-network relay UE and the target UE is configured to report an International Mobile Station Equipment Identity (IMEI)

or IMEISV of the remote UE(s) served by the relay based on a service authorization procedure by a serving PLMN, the ProSe UE-to-network relay UE initiates a remote UE information request procedure in order to request the IMEI or IMEISV of the remote UE when the direct link is successfully established.

4) Completion of Direct Link Setup Procedure by Initiating UE

Upon receiving the DIRECT_COMMUNICATION_ACCEPT, the initiating UE stops the T4100 timer. From this time, the initiating UE uses the established link for all one-to-one communications (including additional PC5 signaling messages) to the target UE.

5) Direct Link Setup Procedure not Accepted by Target UE

Referring to FIG. 7(b), WHEN the direct link setup request may not be accepted, the target UE transmits a DIRECT_COMMUNICATION_REJECT message. The DIRECT_COMMUNICATION_REJECT message contains a PC5 signaling protocol cause value set to one of the following cause values:

1 Direct communication to target UE not allowed;
2 Authentication failure;
3 Conflict of Layer 2 ID for unicast communication is detected;
4 Lack of resources for proposed link;
5 IP version mismatch; or
6 Link setup failure due to other errors.

When the target UE is not permitted to accept such a request (for example, based on an operator policy or service permission provisioning), the target UE transmits the DIRECT_COMMUNICATION_REJECT message including the PC5 signaling protocol cause value #1 "Direct communication to target UE not allowed".

When the target UE fails in verification of signature parameters included in the DIRECT_COMMUNICATION_REQUEST, the target UE transmits the DIRECT_COMMUNICATION_REJECT message including the PC5 signaling protocol cause value #2 "Authentication failure".

When the target UE fails in the direct link setup due to a problem in the direct link permission procedure, the target UE transmits the DIRECT_COMMUNICATION_REJECT message including the PC5 signaling protocol cause value #2 "Authentication failure".

For the Layer 2 ID of the received DIRECT_COMMUNICATION_REQUEST message, when the target UE has an established existing link to the UE that already uses the Layer 2 ID, which is known by the target UE or when the target UE is currently processing the DIRECT_COMMUNICATION_REQUEST message from the same Layer 2 ID, but has User Info different from User Info IE included in a newly received message, the target UE transmits the DIRECT_COMMUNICATION_REJECT message including the PC5 signaling protocol cause value #3 "Conflict of Layer 2 ID for unicast communication is detected".

When the direct link setup is unsuccessful due to other transient lower layer problems causing congestion problems or resource limitations, the target UE transmits the DIRECT_COMMUNICATION_REJECT message including the PC5 signaling protocol cause value #4 "Lack of resources for proposed link".

In the case of the ProSe UE-to-network relay UE, the remote UE desires to use the ProSe UE-to-network relay UE with respect to mission critical communication (e.g., Mission Critical Push To Talk (MCPTT), but when the ProSe UE-to-network relay UE does not support the IPv6 address allocation scheme as the router, the target UE (i.e., ProSe UE-to-network relay UE) transmits the DIRECT_COMMUNICATION_REJECT message including the PC5 signaling protocol cause value #5 "IP version mismatch".

For other reasons causing the link establishment failure, the target UE transmits the DIRECT_COMMUNICATION_REJECT message including the PC5 signaling protocol cause value #6 "Link setup failure due to other errors".

Upon receiving the DIRECT_COMMUNICATION_REJECT message, the initiating UE stops the T4100 timer and terminates the direct link setup procedure. When the cause value in the DIRECT_COMMUNICATION_REJECT message is #1 "Direct communication to target UE not allowed" or #4 "Lack of resources for proposed link", the UE does not attempt to set up the direct link with the same target UE for at least a time period T. In addition, when the initiating UE is the remote UE that requests the link setup to the ProSe UE-to-network relay UE, the initiating UE initiates a relay reselection procedure.

When it is no longer necessary to establish the link before such a procedure is completed, the initiating UE terminates the procedure.

When the Layer 2 ID of the received DIRECT_COMMUNICATION_REQUEST message includes the same User Info as a user that knows a new request with the established existing link to the UE that already uses the Layer 2 ID, which is known by the target UE, the UE performs the new request. However, the target UE deletes the existing link context after a new link setup procedure is successful or after the link keepalive procedure is unsuccessful.

6) Abnormal Case

When the inactivity timer T4108 expires and the target UE is the ProSe UE-to-network relay UE, the target UE initiates the direct link release procedure due to release cause #3 "Direct connection is not available any more". Otherwise, the target UE may operate as follows:

A) The target UE initiates a keepalive procedure to check the link; or

B) The target UE initiates release cause #3 "Direct connection is not available any more".

7) PC5_Signaling Message Related to Direct Link Setup Procedure i) DIRECT_COMMUNICATION_REQUEST The message is transmitted by the UE to another peer UE to establish the direct link.

Table 2 shows the DIRECT_COMMUNICATION_REQUEST message.

TABLE 2

| IEI | Information element | Type/Reference | Presence | Format | Length |
|---|---|---|---|---|---|
| | DIRECT_COMMUNICATION_REQUEST message identity | PC5-SP message type TS 24.334 12.5.1.1. | M | V | 1 |
| | Sequence Number | Sequence Number TS 24.334 12.5.1.2 | M | V | 2 |
| | User Info | User Info TS 24.334 12.5.1.3 | M | LV | 3-253 |

TABLE 2-continued

| IEI | Information element | Type/Reference | Presence | Format | Length |
|---|---|---|---|---|---|
| | IP Address Config | IP Address Config TS 24.334 12.5.1.4 | M | V | 1 |
| | Maximum Inactivity Period | Maximum Inactivity Period TS 24.334 12.5.1.9 | M | V | 4 |
| | Nonce_1 | Nonce_1 TS 24.334 12.5.1.30 | M | V | 16 |
| | UE Security Capabilities | UE Security Capabilities TS 24.334 12.5.1.22 | M | V | 2 |
| | MSB of K_D-sess ID | MSB of KD-sess ID TS 24.334 12.5.1.25 | M | V | 1 |
| 17 | K_D ID | KD ID TS 24.334 12.5.1.30 | O | TV | 5 |
| 25 | Relay Service Code | Relay Service Code TS 24.334 12.5.1.17 | O | TV | 4 |
| 22 | Signature | Signature TS 24.334 12.5.1.33 | O | TV | 130 |
| 3 | Link Local IPv6 Address | IPv6 Address TS 24.334 12.5.1.5 | O | TV | 17 |

In Table 2, the information element represents a name of the information element. 'M' in a Presence field as a mandatory represents an IE included in the message, and 'O' as an optional IE represents an IE that may be included in the message or not included in the message, and 'C' represents as a conditional IE represents an IE included in the message only when a specific condition is satisfied.

ii) DIRECT_COMMUNICATION_ACCEPT

The message is transmitted by the UE to another peer UE to indicate that the corresponding direct link setup request is accepted.

Table 3 shows the DIRECT_COMMUNICATION_ACCEPT message.

TABLE 3

| IEI | Information element | Type/Reference | Presence | Format | Length |
|---|---|---|---|---|---|
| | DIRECT_COMMUNICATION_ACCEPT message identity | PC5-SP message type TS 24.334 12.5.1.1. | M | V | 1 |
| | Sequence Number | Sequence Number TS 24.334 12.5.1.2 | M | V | 2 |
| | IP Address Config | IP Address Config TS 24.334 12.5.1.4 | M | V | 1 |
| 3 | Link Local IPv6 Address | Link Local IPv6 Address TS 24.334 12.5.1.5 | O | TV | 17 |

In Table 3, when the IP Address Config IE is set to "address allocation not supported UE", the UE encapsulates the Link Local IPv6 Address IE.

iii) DIRECT_COMMUNICATION_REJECT

The message is transmitted by the UE to another peer UE to indicate that the corresponding direct link setup request is rejected.

Table 4 shows the DIRECT_COMMUNICATION_REJECT message.

TABLE 4

| IEI | Information element | Type/Reference | Presence | Format | Length |
|---|---|---|---|---|---|
| | DIRECT_COMMUNICATION_REJECT message identity | PC5-SP message type 12.5.1.1. | M | V | 1 |
| | Sequence Number | Sequence Number 12.5.1.2 | M | V | 2 |
| | PC5 Signalling Cause Value | PC5 Signalling Cause Value 12.5.1.7 | M | V | 1 |

2. Direct Link Keepalive Procedure

1) General

The direct link keepalive procedure is used to maintain THE direct link between two ProSe-enabled UEs (i.e., check whether the link between the two UEs is still maintainable). Such a procedure may be initiated by any one UE or both UEs in the established direct link. When the direct link is used for one-to-one communication between the remote UE and the ProSe UE-to-network relay UE, only the remote UE initiates the link keepalive procedure.

Within such a procedure, a UE that transmits the Direct COMMUNICATION_KEEPALIVE message is referred to as the "requesting UE" and the other UE is referred to as the "peer UE".

2) Initiation of Direct Link Keepalive Procedure by Requesting UE

Figure 8:
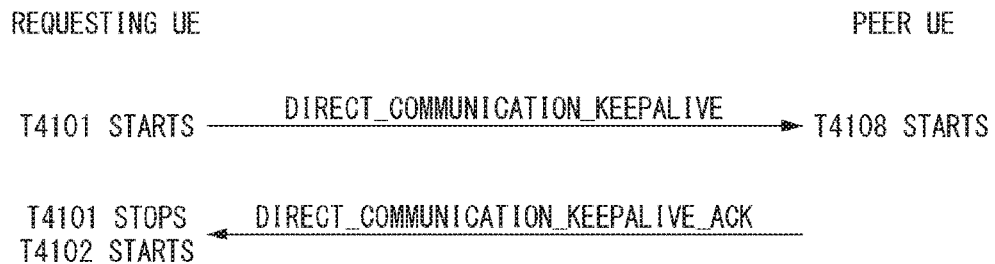
FIG. 8 illustrates a direct link keepalive procedure in the wireless communication system to which the present invention may be applied.

FIG. 8 is a diagram illustrating a direct link keepalive in a wireless communication system to which the present invention may be applied.

The requesting UE manages a keepalive timer T4102 and a keepalive counter for such a procedure. The keepalive timer T4102 is used to trigger periodic initiation of the procedure. The timer is started or restarted whenever the UE receives a PC5 signaling message or PC5 user plane data from the peer UE over this link. The keepalive counter is set to an initial value of 0 after link establishment.

The requesting UE may initiate this procedure in the following case:

Case of receiving a request from the upper layer so as to check maintainability of the direct link; or Case where the keepalive timer T4102 for this link expires.

When the timer T4102 is running, the requesting UE stops the timer T4102 and generates the DIRECT_COMMUNICATION_KEEPALIVE message with a keepalive counter to initiate the procedure. Optionally, the initiating UE may encapsulate the Maximum Inactivity Period IE in order to indicate the maximum inactivity period of the requesting UE through the direct link. When the remote UE transmits the DIRECT_COMMUNICATION_KEEPALIVE message to the ProSe UE-to-network relay UE, the IE is included in the DIRECT_COMMUNICATION_KEEPALIVE message.

After the DIRECT_COMMUNICATION_KEEPALIVE message is generated, the requesting UE transports the message to the lower layer together with layer 2 ID (for unicast communication) of the requesting UE and layer 2 ID (for unicast communication) of the peer UE for transmission and starts a retransmission timer T4101.

3) Direct Link Keepalive Procedure Accepted by Peer UE

Upon receipt of the DIRECT_COMMUNICATION_KEEPALIVE message, the peer UE responds with a DIRECT_COMMUNICATION_KEEPALIVE_ACK message containing a Keepalive Counter IE set to a value which is the same as the value received in the DIRECT_COMMUNICATION_KEEPALIVE message.

When the Maximum Inactivity Period IE is included in the DIRECT_COMMUNICATION_KEEPALIVE message, the peer UE stops the inactivity timer T4108 (when the inactivity timer T4108 is running) and restarts the timer T4108 with the provided value. In addition, when any communication activity occurs in this direct link before the timer T4108 expires, the UE stops the timer T4108 and resets the timer T4108 to the initial value.

4) Completion of Direct Link Keepalive Procedure by Requesting UE

Upon receiving the DIRECT_COMMUNICATION_KEEPALIVE_ACK message, the requesting UE stops the retransmission timer T4101, starts the keepalive timer T4102, and increments the keepalive counter for this link.

5) Abnormal Case

When the retransmission timer T4101 expires, the requesting UE retransmits the DIRECT_COMMUNICATION_KEEPALIVE message with a last used keepalive counter value again and restarts the timer T4101. When no response is received from the peer UE until the maximum number of allowed retransmissions is reached, the requesting UE terminates the link keepalive procedure and instead initiates the direct link release procedure. When the requesting UE is the remote UE, the requesting UE initiates the relay reselection procedure.

When the direct link need not be used before the direct link keepalive procedure is completed, the requesting UE terminates the procedure and instead starts the direct link release procedure.

When the inactivity timer T4108 expires and the peer UE is the ProSe UE-to-network relay UE, the peer UE initiates the direct link release procedure due to release cause #3 "Direct connection is not available any more". Otherwise, the peer UE may operate as follows:

A) The peer UE initiates the keepalive procedure to check the link; or

B) The target UE initiates the direct link due to release cause #3 "Direct connection is not available any more".

3. Direct Link Release Procedure

1) General

The direct link release procedure is used for releasing the safe direct link between two ProSe-enabled UEs. The link may be released from any one UE of the two UEs. A UE that transmits the DIRECT_COMMUNICATION_RELEASE message is referred to as a "releasing requesting UE" and the other UE is referred to as the "peer UE".

When the direct link between the remote UE and the ProSe UE-to-network relay UE is released, the ProSe-UE-to-network relay UE performs a Remote UE report procedure.

2) Initiation of Direct Link Release Procedure by Releasing UE

Figure 9:
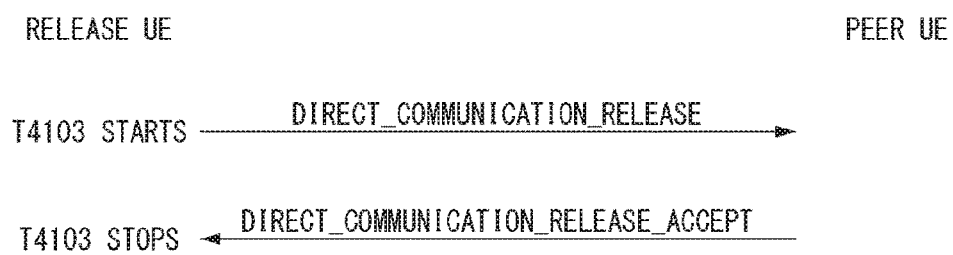
FIG. 9 may be configured through a direct link release procedure in the wireless communication system to which the present invention may be applied.

FIG. 9 is a diagram illustrating a direct link release procedure in a wireless communication system to which the present invention may be applied.

The releasing UE initiates the procedure in the following case:

Case where the request is received from the upper layer so as to release the direct link with the peer UE using known Layer 2 ID (for unicast communication) and the link between the corresponding two UEs is present; or Case where the peer UE is non-responsive (e.g., case where the direct link keepalive procedure may not be completed).

The releasing UE initiates the direct link release procedure by generating an IRECT_COMMUNICATION_RELEASE message with a Release Reason IE indicating one of the following cause values:

1 Direct Communication to peer UE no longer needed;

2 Direct communication with the peer UE is no longer allowed; or

3 Direct connection is not available any more.

After the DIRECT_COMMUNICATION_RELEASE message is generated, the releasing UE transports the message to the lower layer together with layer 2 ID (for unicast communication) of the releasing UE and layer 2 ID (for unicast communication) of the peer UE for transmission. When the release clause is #3 "Direct connection is not available any more", the releasing UE locally releases the direct link. Otherwise, the releasing UE starts a timer T4013.

3) Direct link release procedure accepted by peer UE

Upon receipt of the DIRECT_COMMUNICATION_RELEASE message, the peer UE stops the timer T4101, the timer T4102, or the timer T4103 for this link (when any timer is running) In addition, the peer UE terminates any ongoing PC5 signaling protocol procedure over this link. The peer UE responds with a DIRECT_COMMUNICATION_RELEASE_ACCEPT message. After this message is sent, the peer UE removes a context of this direct link and does not transmit or receive any message over this link any longer.

When the cause value in the DIRECT_COMMUNICATION_RELEASE message is "Direct communication with the peer UE is no longer allowed", the UE will not attempt to set up the direct link with the releasing UE for at least a time period T. In addition, when the initiating UE is the remote UE that requests the link setup to the ProSe UE-to-network relay UE, the initiating UE initiates the relay reselection procedure.

4) Completion of Direct Link Release Procedure by Releasing UE

Upon receiving the DIRECT_COMMUNICATION_RELEASE_ACCEPT message, the releasing UE stops the timer T4103. From this time, the releasing UE does not transmit or receive any message through this link any longer.

5) Abnormal Case

When the retransmission timer T4108 expires, the releasing UE transmits the DIRECT_COMMUNICATION_RELEASE message again and restarts the timer T4103. When no response is received from the peer UE until the maximum number of allowed retransmissions is reached, the releasing UE locally releases the direct link. From this time, the releasing UE does not transmit or receive any message through this link any longer.

4. Direct Security Mode Control Procedure

1) General

The security association for the direct link between two ProSe-Enabled UEs is established by exchanging message contents associated with direct security mode establishment during the direct link setup procedure or a direct link rekeying procedure. After the direct security mode control procedure is successfully completed, the selected security algorithm and key are used for integrity protection and encryption of all PC5 signaling messages exchanged between UEs. In addition, the selected security algorithm and key are used for encrypting all data plane traffic exchanged between the UEs.

A UE that transmits a DIRECT_SECURITY_MODE_COMMAND message is referred to as a "commanding UE" and the other UE is referred to as the "peer UE".

2) Initiation of Direct Security Mode Control Procedure by Commanding UE

Figure 10:
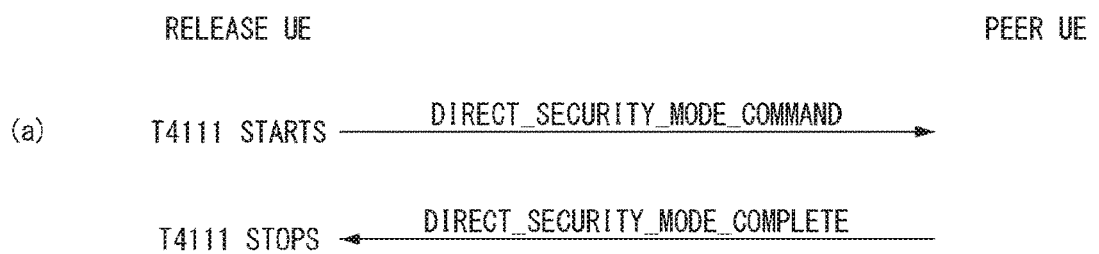
FIG. 10 illustrates a direct security mode control procedure in the wireless communication system to which the present invention may be applied.
Figure 10:
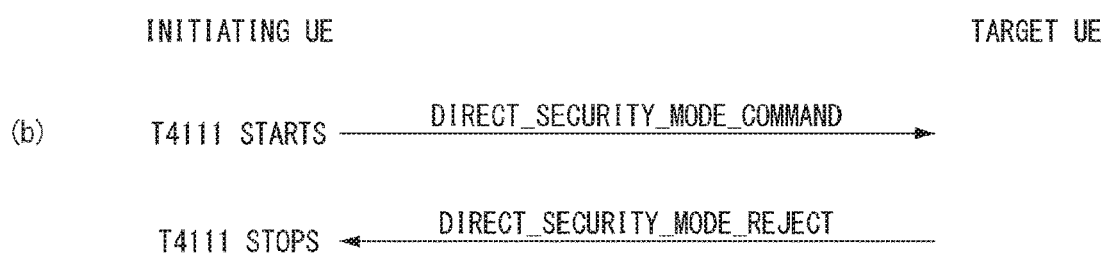

FIG. 10 illustrates a direct security mode control procedure in a wireless communication system to which the present invention may be applied.

The commanding UE may initiate a direct security mode control procedure in response to reception of the DIRECT_COMMUNICATION_REQUEST message or the DIRECT_REKEYING_REQUEST message.

When the procedure is performed between the remote UE and the ProSe UE-to-network relay UE and the procedure is triggered by the DIRECT_REKEYING_REQUEST message for refreshing not K_D but K_D-sess, the ProSe UE-commanding UE or the remote UE may operate as the commanding UE. Otherwise, when both K_D and K_D-sess are refreshed, the ProSe UE-to-network relay UE operates as the commanding UE.

In order to initiate this procedure, the commanding UE identifies the existing K_D based on the K_D ID contained in the DIRECT_COMMUNICATION_REQUEST message or the DIRECT_REKEYING_REQUEST message or when the commanding does not share the known K_D with the peer UE, the commanding UE derives a fresh K_D or desires to derive the fresh K_D. In the latter case, the commanding UE generates a Most Significant Bit (MSB) of the K_D ID to ensure that the resulting generated K_D ID is unique within the commanding UE. Then, the commanding UE generates a Least Significant Bit (LSB) of the K_D-sess ID (received within the DIRECT_COMMUNICATION_REQUEST or DIRECT_REKEYING_REQUEST to trigger the direct security mode procedure) so that the K_D-sess ID formed through the combination with the MSB of the K_D-sess ID is unique within the commanding UE.

Next, the commanding UE generates a 128-bit Nonce_2 value. The commanding UE derives the K_D-sess by using K_D, Nonce_2, and Nonce_1 received within the DIRECT_COMMUNICATION_REQUEST or DIRECT_REKEYING_REQUEST message.

In addition, the UE constructs a direct security mode command (DIRECT_SECURITY_MODE_COMMAND) message with the following:

Nonce_2 IE set to Nonce_2;

Least significant bit of K_D-sess ID IE set to indicate least significant 8 bits of K_D-sess ID;

UE Security Capabilities IE set to UE security capabilities received within the DIRECT_COMMUNICATION_REQUEST message or DIRECT_REKEYING_REQUEST message; and Chosen Algorithms IE set to an algorithm to be used for encryption and integrity protection.

When the DIRECT_SECURITY_MODE_COMMAND message is used between the remote UE and the ProSe UE-to-network relay UE and the ProSe UE-to-network relay UE receives a K_D freshness parameter from the PKMF, the relay UE encapsulates the following additional parameters in the DIRECT_SECURITY_MODE_COMMAND message in order to generate a fresh K_D.

GPI IE including a GBA Push-Info (GPI) payload when being received from the PKMF;

K_D Freshness IE set to the K_D freshness parameter received from the PKMF; and

MSB of KD ID IE set to the MSB of a K_D ID of the fresh K_D.

When the DIRECT_SECURITY_MODE_COMMAND message is used for the isolated one-to-one ProSe direct communication, the commanding UE encapsulates the following additional parameters in the DIRECT_SECURITY_MODE_COMMAND message in order to generate the fresh K_D:

User Info IE set to User Info received from the upper layer;

MSB of KD ID IE set to MSB of the K_D ID of the fresh K_D; and

Signature IE set to an ECCSI signature calculated by User Info IE, Nonce_1 IE, and Encrypted Payload IE set to a Sakai-Kasahara Key Encryption (SAKKE) payload.

The commanding UE chooses an integrity protection and encryption algorithm to be used and optionally encapsulates the chosen algorithm in the Chosen algorithms IE within the DIRECT SECURITY MODE COMMAND message. The commanding UE encapsulates the received UE security capabilities which are present within the DIRECT_COMMUNICATION_REQUEST or DIRECT_REKEYING_REQUEST message to trigger the DIRECT SECURITY MODE COMMAND message.

The commanding UE transmits the DIRECT SECURITY MODE COMMAND message which is not encrypted, but integrity-protects the corresponding message with a new security context. After transmitting the DIRECT_SECURITY_MODE_COMMAND message, the commanding UE starts a timer T4111.

3) Direct Security Mode Control Procedure Accepted by Peer UE

Referring to FIG. 10(a), when receiving the DIRECT_SECURITY_MODE_COMMAND message, the peer UE checks whether a security mode command may be accepted. This is performed by checking the integrity of the message and comparing the received UE security capabilities with a last value which the peer UE transmits to the commanding UE within the DIRECT_COMMUNICATION_REQUEST or DIRECT_REKEYING_REQUEST message and checking that the corresponding is replaced.

In order to check the integrity, the peer UE needs to generate the security context. When the MSB of the K_D ID is included in the DIRECT_SECURITY_MODE_COMMAND message, the peer UE performs one of two operations described below:

When performing the isolated one-to-one ProSe direct communication, the peer UE first checks a signature included in SIGN IE of the DIRECT SECURITY MODE COMMAND and acquires the fresh K_D from the Encrypted Payload IE; or When the peer UE is the remote UE that receives the DIRECT_SECURITY_MODE_COMMAND from the ProSe UE-to-network relay UE, the peer UE replaces the PRUK ID and the PRUK thereof if the GPI IE is included in the DIRECT_SECURITY_MODE_COMMAND. Eventually, the UE derives the fresh K_D.

When the MSB of the K_D ID is not included in the DIRECT_SECURITY_MODE_COMMAND message, the peer UE uses the existing K_D indicated by the K_D ID included in the DIRECT_COMMUNICATION_REQUEST message or a currently used K_D.

The peer UE derives the K_D-sess based on the K_D-sess ID in the same scheme as the commanding UE. As a result, the peer UE uses the algorithm indicated in the Chosen Algorithms IE.

When the DIRECT_SECURITY_MODE_COMMAND message may be accepted, the peer UE transmits a DIRECT_ SECURITY_MODE_COMPLETE message encrypted and integrity-protected with a new security context. The DIRECT_SECURITY_MODE_COMPLETE message contains least significant 16 bits of the K_D ID if the initiating UE includes the MSB of the K_D ID in the DIRECT_SECURITY_MODE_COMMAND message.

From this time, the peer UE protects all signaling messages and user data with the new security context.

4) Completion of Direct Security Mode Control Procedure by Commanding UE

Upon receiving the DIRECT_SECURITY_MODE_COMPLETE message, the commanding UE stops the timer T4111. When the LSB of the K_D ID IE is included in this message, the commanding UE uses the LSB of the K_D ID IE and the MSB of the previously transmitted K_D ID in order to form the K_D ID of the fresh K_D. From this time, the commanding UE protects all signaling messages and user data with the new security context.

5) Direct Security Mode Control Procedure Accepted by Peer UE

When the DIRECT_SECURITY_MODE_COMMAND message may not be accepted, the peer UE transmits a DIRECT_SECURITY_MODE_REJECT message. The DIRECT_SECURITY_MODE_REJECT message includes a PC5 Signaling Protocol Cause Value IE indicating one cause value of the following cause values:

7: UE security capabilities mismatch;
8: Unspecified error; or
9: Authentication synchronization error.

When processing an authentication vector included in the GPI payload transmitted to the remote UE by the ProSe UE-to-network relay UE, if the DIRECT_SECURITY_MODE_COMMAND may not be accepted due to a synchronization error, the peer UE encapsulates random challenge (RAND) and Authentication Token (AUTS) parameters in the DIRECT_SECURITY_MODE_REJECT message.

Upon receiving the DIRECT_SECURITY_MODE_REJECT message, the commanding UE stops the timer T4111. When the PC5 Signaling Protocol Cause Value IE indicates the synchronization error and the message includes the RAND and the AUTS, the ProSe UE-to-network relay transmits a key request message including the RAND and the AUTS to a fresh K_D from the PKMF. Otherwise, the UE terminates the ongoing procedure in which the initiation of the direct security mode control procedure is triggered.

6) Abnormal Case

When the timer T4111 expires, and when the direct security mode control procedure is triggered by the DIRECT_COMMUNICATION_REQUEST message, the commanding UE discards any derived key with Nonce_1 and transmits the DIRECT_COMMUNICATION_REJECT message with the PC5 Signaling Protocol Cause Value IE set to #10 "non-responsive peer during the direct security mode procedure"; or when the direct security mode control procedure is triggered by the DIRECT_REKEYING_REQUEST message, the commanding UE continuously uses the previous key until the corresponding key is not valid any longer.

When the DIRECT_SECURITY_MODE_COMMAND message is malformed, the peer UE discards this message.

7) PC5_Signaling Message Related to Direct Security Mode Control Procedure i) DIRECT_SECURITY_MODE_COMMAND The message is transmitted by the UE to the peer UE to establish the security of the direct link.

Table 5 shows the DIRECT_SECURITY_MODE_COMMAND message.

TABLE 5

| IEI | Information element | Type/Reference | Presence | Format | Length |
|---|---|---|---|---|---|
| | DIRECT_SECURITY MODE COMMAND message identity | PC5-SP Message Type TS 24.334 12.5.1.1. | M | V | 1 |
| | Sequence Number | Sequence Number TS 24.334 12.5.1.2 | M | V | 2 |
| | UE Security Capabilities | UE Security Capabilities TS 24.334 12.5.1.22 | M | V | 2 |
| | Nonce 2 | Nonce 2 TS 24.334 12.5.1.31 | M | V | 16 |
| | Chosen Algorithms | Chosen Algorithms TS 24.334 12.5.1.23 | M | V | 1 |
| | LSB of K_D-sess ID | LSB of K_D-sess TS 24.334 12.5.1.24 | M | V | 1 |
| 16 | MSB of K_D ID | MSB of K_D ID TS 24.334 12.5.1.27 | O | TV | 3 |
| 18 | K_D Freshness | K_D Freshness TS 24.334 12.5.1.30 | O | TV | 17 |

TABLE 5-continued

| IEI | Information element | Type/Reference | Presence | Format | Length |
|---|---|---|---|---|---|
| 24 | GPI | GPI<br>TS 24.334 12.5.1.18 | O | TLV | Variable |
| 1 | User Info | User Info<br>TS 24.334 12.5.1.3 | O | TLV | 3-253 |
| 22 | Signature | Signature<br>TS 24.334 12.5.1.33 | O | TV | 130 |
| 23 | Encrypted Payload | Encrypted Payload<br>TS 24.334 12.5.1.34 | O | TLV | Variable | ii) DIRECT_SECURITY_MODE_COMPLETE

The message is transmitted by the peer UE to the commanding UE to confirm the security establishment.

Table 6 shows the DIRECT_SECURITY_MODE_COMPLETE message.

TABLE 6

| IEI | Information Element | Type/Reference | Presence | Format | Length |
|---|---|---|---|---|---|
| | DIRECT_SECURITY MODE COMPLETE message identity | PC5-SP message type<br>TS 24.334 12.5.1.1. | M | V | 1 |
| | Sequence Number | Sequence Number<br>TS 24.334 12.5.1.2 | M | V | 2 |
| 15 | LSB of K_D ID | LSB of K_D ID<br>TS 24.334 12.5.1.26 | O | TV | 3 | iii) DIRECT_SECURITY_MODE_REJECT

The message is transmitted by the peer UE to the commanding UE to indicate that the security establishment is unsuccessful.

Table 7 shows the DIRECT_SECURITY_MODE_REJECT message.

TABLE 7

| IEI | Information element | Type/Reference | Presence | Format | Length |
|---|---|---|---|---|---|
| | DIRECT_SECURITY MODE REJECT message identity | PC5-SP message type<br>TS 24.334 12.5.1.1. | M | V | 1 |
| | Sequence Number | Sequence Number<br>TS 24.334 12.5.1.2 | M | V | 2 |
| | PC5 Signalling Protocol Cause Value | PC5 Signalling Protocol Cause Value<br>TS 24.334 12.5.1.7 | M | V | 1 |
| 10 | RAND | RAND<br>TS 24.334 12.5.1.21 | O | TV | 17 |
| 9 | AUTS | AUTS<br>TS 24.334 12.5.1.20 | O | TV | 15 |

In this model, the announcing UE broadcasts a discovery message at a predetermined discovery interval and the monitoring UE that is interested in the message reads and processes the corresponding message.

In Model A mode, the UE may operate as the "announcing UE" only within a carrier frequency signaled by the serving PLMN, but may operate as the "monitoring UE" within resources of the serving PLMN and a local PLMN. When inter-PLMN discovery transmission is supported, the carrier frequency may be operated by a PLMN other than the serving PLMN.

Discovery Models

Hereinafter, a discovery model defined in D2D (or ProSe) will be described. The discovery model is divided into Model A and Model B. In the UE-to-Network Relay, in the case of Model A, when the relay UE becomes an announcing UE, the remote UE corresponds to a monitoring UE. In the UE-to-Network Relay, in the case of Model B, when the remote UE becomes a discoverer UE, the relay UE corresponds to a discoveree UE.

1) Model A ("I am Here")

This model defines two roles for a ProSe-enabled UE(s) which participates in a ProSe direct discovery.

Announcing UE: The UE announces specific information which may be used by a nearby UE which is allowed to be discovered.

Monitoring UE: The UE monitors specific information of an interested nearby announcing UE.

An open and restricted discovery type is supported by Model A.

2) Model B ("Who is There?"/"Are You There?")

When the proposed discovery type is used, this model defines two roles for a ProSe-enabled UE(s) which participates in a ProSe direct discovery.

Discoverer UE: The UE sends a request containing specific information regarding a UE to be discovered.

Discoveree UE: The UE that receives the request message may respond with information related to a request of a discoverer.

Since the discoverer UE transmits information regarding other UEs that desire to receive a response (e.g., information regarding a ProSe application identifier corresponding to a group, members of the group may respond), "who is there" and "are you there" are equal to each other.

When using Model B discovery, the discoverer UE and the discoveree UE may broadcast within the carrier frequency signaled by the serving PLMN. When inter-PLMN discovery transmission is supported, the carrier frequency may be operated by a PLMN other than the serving PLMN. The discoverer UE and the discoveree UE are allowed to monitor or broadcast within the serving PLMN and the authorized local PLMN.

Only the restricted discovery type is supported by Mode B.

It is regarded that a public safety discovery is supported. The monitoring UE/discoverer UE needs to be authorized to perform the discovery of an appropriate service (via pre-provisioned parameters).

PC5 Discovery Message for UE-to-Network Relay

Hereinafter, a PC5_discovery message defined for the discovery of the PC5_Discovery message for UE-to-network relay in D2D (or ProSe).

A PC5_DISCOVERY message for UE-to-Network Relay discovery announcement to be described below is used in Mode A. A PC5_DISCOVERY message for UE-to-Network Relay discovery solicitation and a PC5_DISCOVERY message for UE-to-Network Relay Discovery Response are used in Model B.

A PC5_DISCOVERY message for the UE-to-Network Relay Discovery Announcement and a PC5_DISCOVERY message for the UE-to-Network Relay Discovery Response transmitted by the Relay UE include a Status Indicator IE. The Status Indicator IE includes a Resource Status Indicator (RSI) parameter. The RSI parameter indicates whether the relay UE may support an additional remote UE.

Table 8 shows the PC5_DISCOVERY message for the UE-to-Network Relay Discovery Announcement.

TABLE 8

| Information element | Type/Reference | Presence | Length (bit) |
|---|---|---|---|
| Message Type | Message Type TS 24.334 12.2.2.10 | M | 8 |
| Relay Service Code | Binary TS 24.334 12.2.2.51 | M | 24 |
| Information of announcing UE (Announcer Info) | Binary TS 24.334 12.2.2.50 | M | 48 |
| ProSe Relay UE ID | Binary TS 24.334 12.2.2.49 | M | 24 |
| Status Indicator | Binary TS 24.334 12.2.2.67 | M | 8 |
| Spare | Binary TS 24.334 12.2.2.56 | M | 80 |
| Message Integrity Check (MIC) | Binary TS 24.334 12.2.2.11 | M | 32 |
| Date and time (UTC)-based Counter LSB | Binary TS 24.334 12.2.2.22 | M | 8 |

The discovery type is set to the "Restricted discovery", the content type is set to "UE-to-Network Relay Discovery Announcement or UE-to-Network Relay Discovery Response", and a discovery model is set to "model A".

Table 9 shows the PC5_DISCOVERY message for the UE-to-Network Relay Discovery Solicitation.

TABLE 9

| Information element | Type/Reference | Presence | Length (bit) |
|---|---|---|---|
| Message Type | Message Type TS 24.334 12.2.2.10 | M | 8 |
| Relay Service Code | Binary TS 24.334 12.2.2.51 | M | 24 |

TABLE 9-continued

| Information element | Type/Reference | Presence | Length (bit) |
|---|---|---|---|
| Information of discoverying UE (Discoverer Info) | Binary TS 24.334 12.2.2.50 | M | 48 |
| UE-to-Network Relay Discovery Solicitation (URDS) Composition | Binary TS 24.334 12.2.2.66 | M | 8 |
| ProSe Relay UE ID | Binary TS 24.334 12.2.2.49 | C (NOTE 2) | 24 |
| Spare | Binary TS 24.334 12.2.2.56 | M | 80 or 104 (NOTE 3) |
| MIC | Binary TS 24.334 12.2.2.11 | M | 32 |
| UTC-based Counter LSB | Binary TS 24.334 12.2.2.22 | M | 8 |

The discovery type is set to the "Restricted discovery", the content type is set to "UE-to-Network Relay Discovery Announcement or UE-to-Network Relay Discovery Solicitation", and the discovery model is set to "model B".
The presence of the ProSe Relay UE ID is indicated by the ProSe Relay UE ID. When the ProSe Relay UE ID is present, the length of the spare is 80 bits. When the ProSe Relay UE ID is not included, the length of the spare is 104 bits.

Table 10 shows the PC5_DISCOVERY message for the UE-to-Network Relay Discovery Response.

TABLE 10

| Information element | Type/Reference | Presence | Length (bit) |
|---|---|---|---|
| Message Type | Message Type 12.2.2.10 | M | 8 |
| Relay Service Code | Binary 12.2.2.51 | M | 24 |
| Information of discovered UE (Discoveree Info) | Binary 12.2.2.50 | M | 48 |
| ProSe Relay UE ID | Binary 12.2.2.49 | M | 24 |
| Status Indicator | Binary 12.2.2.67 | M | 8 |
| Spare | Binary 12.2.2.56 | M | 80 |
| Message integrity check (MIC) | Binary 12.2.2.11 | M | 32 |
| UTC-based Counter LSB | Binary 12.2.2.22 | M | 8 |

The discovery type is set to the "Restricted discovery", the counter type is set to "UE-to-Network Relay Discovery Announcement or UE-to-Network Relay Discovery Response", and the discovery model is set to "model B".

The status indicator parameter is used for indicating the status of the ProSe UE-to-network relay. The parameter is coded as shown in Table 11 below.

The RSI is used for indicating whether the UE has a resource available for providing a connectivity service for an additional ProSe-enabled public safety UE.

Table 11 shows the status indicator parameter.

TABLE 11

| RSI (octet 1) |
|---|
| Bit |
| 8 |
| 0   The UE does not have the resource available for providing the connectivity service for the ProSe-enabled public safety UE(s). |
| 1   The UE has the resource available for providing the connectivity service for the ProSe-enabled public safety UE(s). |
| Bits 1 to 7 of octet 1 are spare and coded to 0. |

Direct Communication Via ProSe UE-to-Network Relay

Hereinafter, an operation (3-layer relay) related to direct communication via the ProSe UE-to-Network Relay in ProSe will be described.

A UE capable of performing the ProSe UE-to-Network Relay is enabled may be attached to the network (if it is not already connected), connect a PDN connection that enables required relay traffic, or need to connect an additional PDN connection(s) in order to provide the relay traffic toward the remote UE(s). The PDN connection(s) supporting the UE-to-Network Relay is used only for the relay traffic of the Remote ProSe UE(s).

FIG. 11 is a diagram illustrating a ProSe UE-to-network relay procedure in a wireless communication system to which the present invention may be applied.

1. The ProSe UE-to-Network Relay performs initial E-UTRAN Attach (if not already attached) and/or establishes the PDN connection for relay (if there is no appropriate PDN connection for the relay). In the case of IPv6, the ProSe UE-to-Network Relay obtains an IPv6 prefix from the network via a prefix delegation function.

2. The remote UE performs the discovery of the ProSe UE-to-Network Relay using the Model A or Model B discovery.

3. The remote UE selects the ProSe UE-to-Network Relay and establishes a connection for one-to-one ProSe direct communication. When there is no PDN connection associated with the ProSe Relay UE identifier (ID) or an additional PDN connection is required for the relay, the ProSe UE-to-Network Relay initiates a new PDN connection establishment procedure.

4. An IPv6 prefix or IPv4 address is assigned for the remote UE. From this time, uplink and downlink relays may be started.

5. The ProSe UE-to-Network Relay transmits a remote UE report (including a remote user ID and IP information (IP info)) to the MME for the PDN connection associated with the relay. The Remote User ID is an identifier (provided via the user information (User Info)) of a Remote UE user that is successfully connected in step 3. The MME stores the remote user ID(s) and associated IP info in the EPS bearer context of the ProSe UE-to-Network Relay for the PDN connection associated with the relay.

6. The MME transports the Remote UE Report message to the S-GW and the S-GW transports the message to the P-GW of the UE-to-Network Relay UE. The MME may report multiple Remote UEs in one Remote UE Report message.

For the IP info, the following principles may be applied:
In the case of IPv4, the UE-to-network relay reports a Transmission Control Protocol (TCP)/UDP (user datagram protocol) port range assigned to individual Remote UE(s) (together with the Remote User ID);
In the case of IPv6, the UE-to-network relay reports a IPv6 prefix(s) assigned to the individual Remote UE(s) (together with the Remote User ID).

When the remote UE is disconnected from the ProSe UE-to-Network Relay, the Remote UE Report message is transmitted to announce to the MME, the S-GW, and the P-GW that the remote UE(s) leaves (e.g., when an explicit layer-2 link is released or when there is no keepalive message through PC5).

For TAUs including MME changes, the associated IP info corresponding to the Remote UE(s) connected with the Remote User ID is transmitted to a new MME as part of the EPS bearer context transport for the ProSe UE-to-Network Relay.

After connecting to the ProSe UE-to-Network Relay, the Remote UE continues to measure the signal strength of the Discovery message transmitted by the ProSe UE-to-Network Relay for relay selection (i.e., UE-to-Network Relay Discovery Announcement message in Model A or in the UE-to-Network Relay Discovery Announcement message or UE-to-Network Relay Discovery Response message in Model B). In the case of Model B, in order to measure a PC5 link quality, the remote UE periodically transmits the UE-to-Network Relay Discovery Solicitation message. This message contains a ProSe Relay UE ID of a serving ProSe UE-to-Network Relay. When the ProSe Relay UE ID is included in this message, only the ProSe UE-to-Network Relay having the ProSe Relay UE ID responds to the UE-to-Network Relay Discovery Solicitation message.

CP CIoT EPS Optimization

When the UE and the MME use Control Plane CIoT EPS Optimization, the UE and the MME may transmit data within the NAS PDU(s) containing an EPS Bearer Identity (EBI) of the PDN connection in which the S1-U bearer is not established (When the S1-U bearer is established, the UE uses S1-U for data PDU(s) transmission). Both IP and non-IP data types are supported. When the UE and the MME support the Control Plane CIoT EPS Optimization, a service request procedure is not used for an EPC Mobile Originated Location Request (EPC-MO-LR) or an EPC Mobile Terminated Location Request (EPC-MT-LR). Instead, the UE and MME use the Control Plane CIoT EPS Optimization for data transport.

This is achieved by using an NAS transport capability of the RRC and S1-AP protocols and the data transport of a GTP-u tunnel between the MME and the S-GW and between the S-GW and the P-GW.

The UE and the MME may perform header compression for IP data based on the Robust Header Compression (ROHC) framework IETF RFC 5795. In the case of uplink IP data, the UE implements an ROHC compressor and the MME implements a decompressor. In the case of downlink IP data, the MME implements the ROHC compressor and the UE implements the decompressor. Uplink and downlink ROHC channels need to be bound to the UE and the MME in order to support feedback. A configuration for header compression is established during the PDN connection establishment.

In order to minimize a potential conflict between an NAS signaling PDU and an NAS data PDU, the MME needs to complete a security (e.g., authentication, a security mode command, and Globally Unique Temporary Identifier (GUTI) reassignment) related to the procedure before the UE announces to the HSS, MSC or S-GW an entry into the ECM-CONNECTED state and before starting downlink transport of the NAS data PDU.

Figure 12:
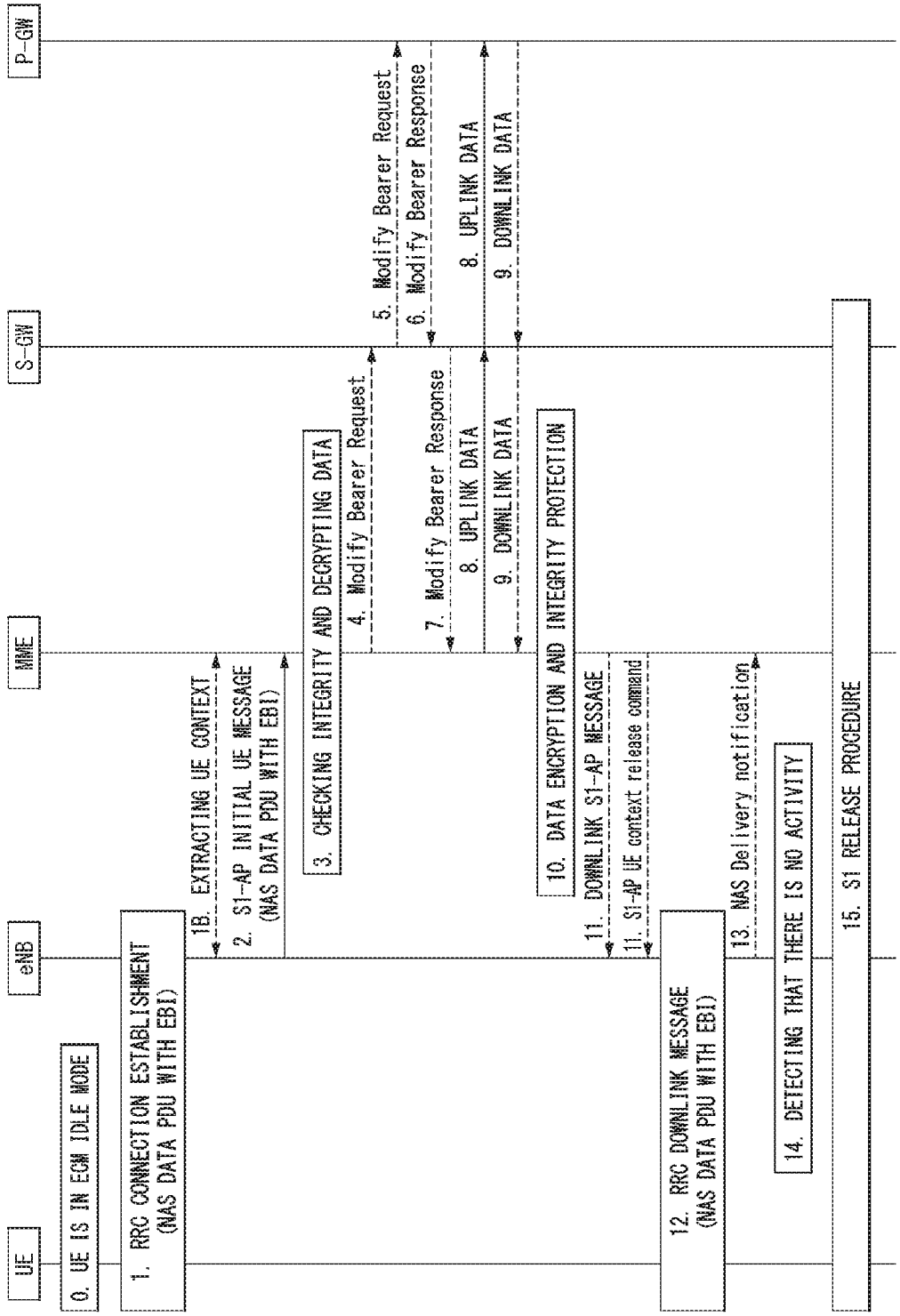

FIG. 12 is a diagram illustrating CP CIoT EPS optimization and UP CIoT EPS optimization for mobile originated data in a wireless communication system to which the present invention may be applied.

0. The UE is in EPS connection management (ECM)-idle.

1. The UE establishes the RRC connection and transmits the NAS PDU integrity protected as a part of the establishment of the RRC connection to the eNB. The NAS PDU carries the EPS bearer ID and the encrypted uplink data. In the case of an IP PDN type of PDN connection configured to support header compression, the UE applies the header compression before encapsulating the data in the NAS message. The UE indicates whether additional uplink or downlink data transmission is expected or only single downlink data transmission (e.g., an acknowledgment or a response to uplink data) following the uplink data transmission is expected in Release Assistance Information in the NAS PDU.

1b. In the case of Narrow Band-Internet of Things (NB-IoT), the eNB obtains an EPS negotiated QoS profile from the MME based on the configuration if not previously acquired. An MME code in S-TMSI in the RRC connection request message is used to identify the MME. The eNB may apply priorities between requests from different UEs across the RRC connection before triggering step 2.

2. The NAS PDU transmitted in step 1 above is relayed to the MME by using an S1-AP initial UE message by the eNB and the initial UE message is accompanied by an indication that the eNB supports an acknowledgment for the downlink NAS data PDU.

In order to assist location services, the eNB indicates a Coverage Level of the UE to the MME.

3. The MME checks integrity of the received NAS PDU and decrypts data included in the NAS PDU. When the ROHC is configured to be used, if the header compression is applied to the PDN connection, the MME decompresses the IP header.

The MME performs any EPS Mobility Management (EMM) or EPS Session Management (ESM) procedure (e.g., security related procedure) if necessary (and the UE responds thereto). Steps 4 to 9 continue in parallel thereto, but steps 10 and 11 wait until all EMM or ESM procedures are completed.

4a. When the S11-U connection is not established, the MME transmits the modify bearer request message to the S-GW for each PDN connection.

The Modify Bearer Request message includes an MME address, an MME Tunnel Endpoint Identifier (TEID) DL, a delay Downlink Packet Notification Request, the RAT type, and a mobile originated (MO) Exception data counter.

The S-GW may now transmit downlink data to the UE. The MME indicates S11-U tunneling of the NAS user data and transmits an S11-U IP address and an MME DL TEID thereof for the downlink data transported by the S-GW. Further, regardless of whether the S11-U is already established:

When the P-GW requests a location and/or user Closed Subscriber Group (CSG) information of the UE and the location and/or user CSG information of the UE is changed, the MME transmits the Closed Subscriber Group message and encapsulates a user location information element (IE) and/or a user CSG information IE in the message.

When a Serving Network IE is changed by comparing the Serving Network IE with a last reported Serving Network IE, the MME transmits the Modify Bearer Request message and encapsulates the Serving Network IE in the message.

When a UE time zone is changed by comparing the UE time zone with a last reported UE time zone, the MME transmits the Modify Bearer Request message and encapsulates a UE Time Zone IE in the message.

When the RRC establishment cause is the "MO exception data" and the UE accesses through NB-IoT RAT, the MME encapsulates only the MO Exception Data Counter. The S-GW instructs a counter related to a Charging Data Record (CDR) to use the RRC establishment cause. The MME may immediately transmit the MO Exception Data Counter to the S-GW.

4b. When the S11-U connection is established and the UE accesses the RRC establishment cause set to the "MO exception data" through the NB-IoT RAT, the MME informs the S-GW. The MME may immediately transmit the MO Exception Data Counter to the S-GW.

5. When an RAT type is changed compared to a last reported RAT type or when the location and/or information IE and/or UE time zone and serving network ID of the UE are present in step 4 above, the S-GW transmits the Modify Bearer Request message to the P-GW.

The Modify Bearer Request message includes the RAT type and the MO Exception data counter. The User Location Information IE and/or User CSG Information IE and/or Serving Network IE and/or UE Time Zone are included when being present in step 4 above.

When the Modify Bearer Request message is not transmitted due to the reason described above and P-GW billing is paused, the S-GW transmits to the P-GW the Modify Bearer Request message with a PDN Charging Pause Stop Indication indicating that billing to the P-GW is not paused any longer. The message does not include other IEs.

When the Modify Bearer Request is not transmitted for the reason described above, but the MME indicates the MO Exception data counter, the S-GW announces to the P-GW that the RRC establishment cause is used by the indication of the MO Exception Data Counter. The S-GW instructs the related counter to use the RRC establishment cause.

6. The P-GW transmits a Modify Bearer Response message to the S-GW.

The P-GW instructs the related counter to use the RRC establishment cause "MO Exception Data".

7. When the modify bearer request message is transmitted in step 4, the S-GW transmits the modify bearer response message to the MME in response to the modify bearer request message.

The modify bearer response message includes the S-GW address and the TEID for the uplink traffic.

The S-GW address and the S-GW TEID for the S11-U user plane are used to deliver the uplink data to the S-GW by the MME.

8. The MME transmits the uplink data to the P-GW via the S-GW.

9. When downlink data is not expected based on Release Assistance Information from the UE in step 1 above, this means that exchange of all application layer data is completed by uplink data transmission. Accordingly, when the MME does not know mobile terminated (MT) traffic that is pending and the S1-U bearer is not established, the MME immediately releases the connection and step 14 is performed.

Otherwise, the downlink data may arrive at the P-GW. Then, the P-GW transmits the downlink data to the MME via the S-GW. When the data is not received, steps 10 to 12 may be omitted and the eNB may not detect any activity in step 13 and thereafter, trigger step 14. While the RRC connection is active, the UE may still transmit the uplink data and receive the downlink data within the NAS PDU(s) transported in the S1AP uplink or downlink message. When the user plane bearer is not established any longer, the UE may provide the Release Assistance Information together with the uplink data. In this case, the eNB may instruct the MME to provide the Coverage Level of the UE in order to assist a location service.

10. When the downlink data is received in step 9, the MME encrypts and integrity-protects the downlink data.

11. When step 10 is performed, the downlink data is encrypted in the NAS PDU and transmitted to the eNB within the S1-AP downlink message. When the eNB supports acknowledgment of the downlink NAS data PDU and acknowledgment of the downlink NAS data PDU is enabled within subscription information of the UE, the MME indicates that the acknowledgment is requested to the eNB within the downlink S1-AP message. In the case of an IP PDN type of PDN connection configured to support the header compression, the UE applies the header compression before encapsulating the data in the NAS message. When step 10 above is not performed, the MME may transmit the Connection Establishment Indication message to the eNB. A UE Radio Capability may be provided from the MME to the eNB within the Connection Establishment Indication message. In addition, the eNB stores received UE Radio Capability information.

When the is received together with the uplink data and the Release Assistance Information indicates that the downlink data is expected, this means that a next downlink packet subsequent to transmission of the Release Assistance Information is a last packet of exchange of application layer data. In this case, when the MME does not know additional pending MT traffic and when the S1-U bearer is not established, the MME immediately transmits an S1 UE Context Release Command as an indication that the eNB releases the RRC connection after the data is successfully transmitted to the UE after the S1-AP message including the encapsulated downlink data within the NAS PDU.

When the UE is accessing through the NB-IoT cell or is accessing through a wide band (WB)-E-UTRAN cell and Coverage Enhancement (CE) mode B is enabled, the MME considers a transmission delay of the NAS PDU and a CE mode in order to determine an NAS PDU retransmission scheme (i.e., setting an NAS timer sufficiently long in accordance with a worst transmission delay).

12. The eNB transmits an RRC Downlink data message including the downlink data encapsulated in the NAS PDU. When the S1-AP message with the NAS DATA PDU is followed by the S1 UE Context Release Command in step 11, step 15 is completed immediately after transmission of the downlink data of the NAS PDU to the UE, acknowledgment to the MME is completed in the eNB in step 13, and step 14 need not be performed for the eNB. When the header compression is applied to the PDN, the UE performs header decompression in order to rebuild the IP header.

13. The eNB transmits an NAS Delivery indication to the MME. When the eNB reports an unsuccessful delivery by an S1-AP NAS Non-Delivery Indication, the MME waits for a predetermined time until the UE has a re-established connection to the MME as the cell is potentially changed. When the UE has the re-established connection, the MME needs to retransmit the downlink S1-AP message to the eNB. Otherwise, the MME reports the unsuccessful delivery to the SCEF. When the eNB reports the successful delivery with the S1-AP NAS Delivery Indication and the downlink data is received through a T6a interface, the MME needs to respond to the SCEF. When the eNB does not support the S1-AP NAS delivery indication, the MME instructs the SCEF to perform a cause code 'Success Unacknowledged Delivery'.

14. When the NAS PDU activity is not present, the eNB starts S1 release in step 15.

15. An S1 release procedure is triggered by the eNB or MME. Further, when the MME transmits a UE Context Release Command in step 11, step 5 of the S1 release procedure or a Connection Suspend Procedure first starts. The UE and the MME then store a context for ROHC configuration and uplink/downlink data transmission when entering the ECM-CONNECTED state.

UP CIoT EPS Optimization

Figure 13:
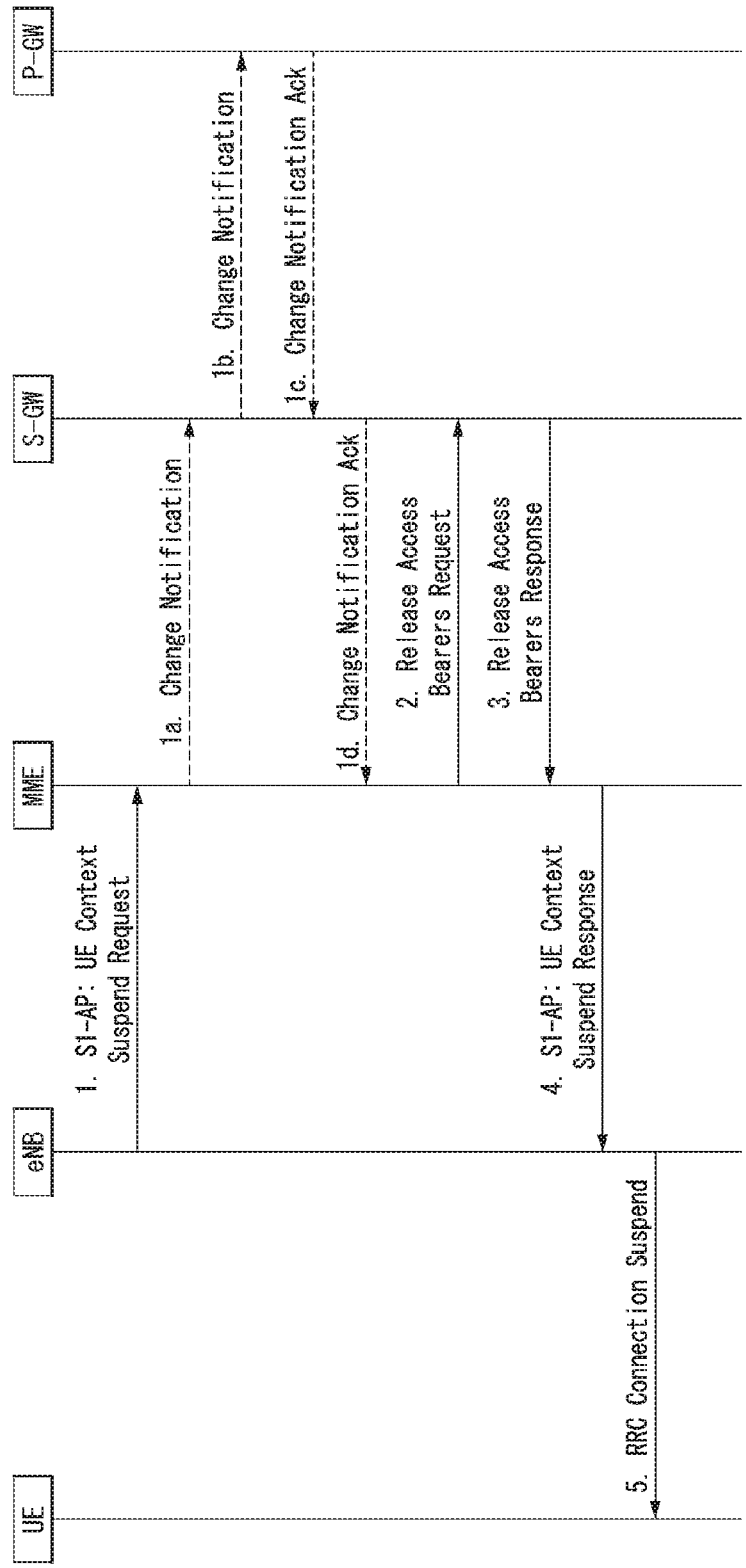
FIG. 13 illustrates a connection suspend procedure initiated by an eNB in the wireless communication system to which the present invention may be applied.

FIG. 13 illustrates a connection suspend procedure initiated by an eNB in a wireless communication system to which the present invention may be applied.

When the UE and the network support UP CIoT EPS optimization, such a procedure is used for suspending the connection by the network.

1. The eNB initiates a connection suspend procedure to the MME. The eNB indicates to the MME that the RRC connection of the UE is to be suspended when the MME enters ECM-IDLE.

Data related to the S1AP association required to resume the connection, UE context, and bearer context are maintained at the eNB, the UE, and the MME.

The eNB may encapsulate Information On Recommended Cells And eNBs For Paging in an S1 UE Context Suspend Request message. When the information is available, the MME may store the information in order to use the information at the time of paging the UE.

When the information is available, the eNB may encapsulate Information for Enhanced Coverage in the S1 UE Context Suspend Request message.

When the PLMN configures a secondary RAT report and the eNB has Secondary RAT utilization data to be reported, the Secondary RAT utilization data is included.

1a-d. When the eNB provides the Secondary RAT utilization data in step 1, the MME initiates a Secondary RAT utilization data reporting procedure.

2. The MME transmits a Release Access Bearers Request message to the S-GW in order to request the release of all S1-U (S1 user plane) bearers for the UE.

3. The S-GW releases eNB related information (i.e., eNB address and downlink Tunnel endpoint identifier(s) (TEIDs) for all UEs. In addition, the S-GW responds to the MME with a Release Access Bearers Response message.

Other elements of the S-GW context of the UE are not influenced. When the downlink packet for the UE arrives, the S-GW buffers the downlink packet received for the UE and initiates a Network Triggered Service Request procedure (see 3GPP TS 23.401).

The S-GW announces the release of the S1-U bearer to the MME within the Release Access Bearers Response message.

4. The MME transmits to the eNB an S1-AP UE Context Suspend Response message in order to successfully terminate the connection suspend procedure initiated by the eNB.

5. The eNB transmits the RRC message to the UE in order to suspend the RRC connection to the UE.

When the UE NAS is suspended in the EMM-IDLE state (i.e., when the UE is in the EMM-IDLE mode with the suspend indication), the UE needs to start a resume procedure in order to transmit uplink signaling or data.

Figure 14:
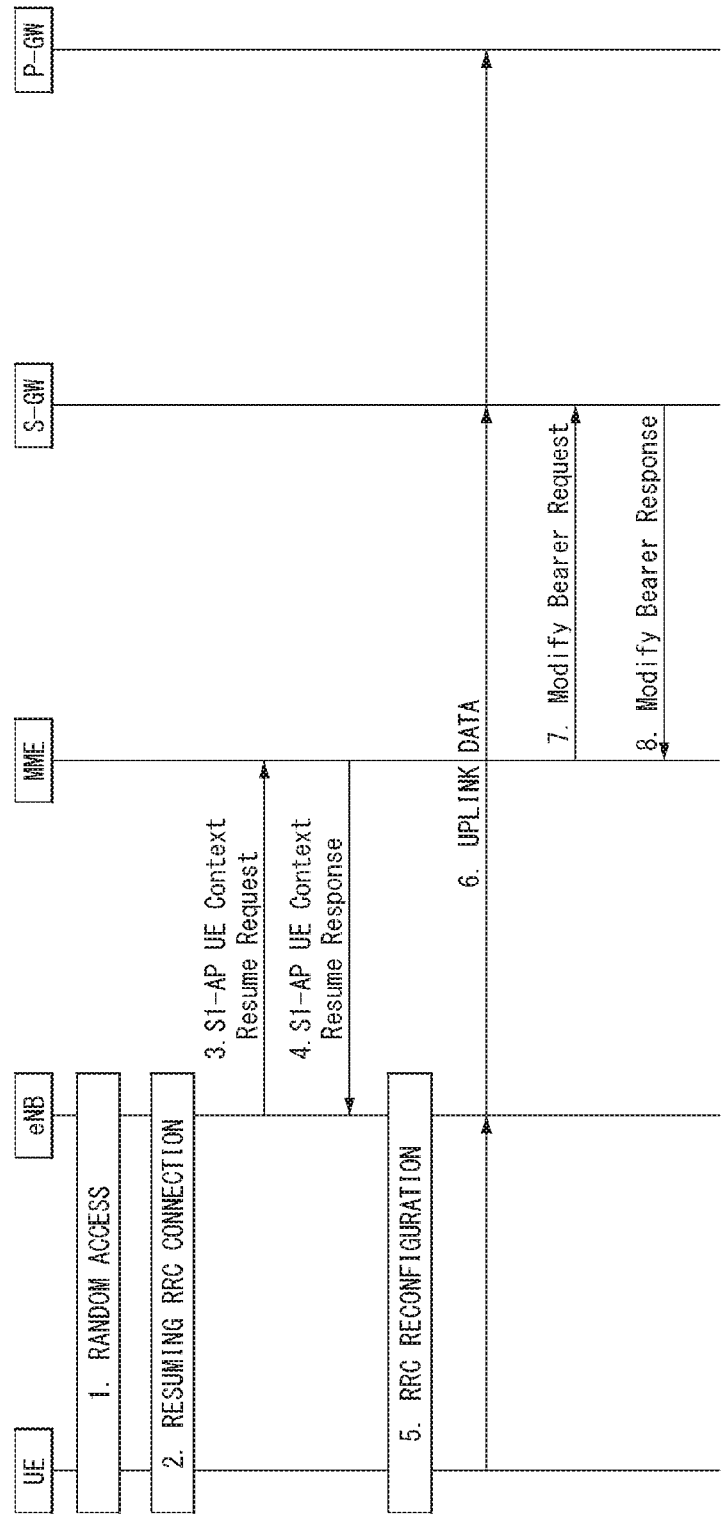
FIG. 14 may be configured through a connection resume procedure initiated by an eNB in the wireless communication system to which the present invention may be applied.

FIG. 14 illustrates a connection resume procedure initiated by a UE in a wireless communication system to which the present invention may be applied.

When the UE and the network support the UP CIoT EPS optimization and stores information required to perform the connection resume procedure, such a procedure is used for resuming ECM connection. Otherwise, a service request procedure (see TS 23.401) is used.

1. The UE triggers a random access procedure (see FIG. 6) to the eNB.

2. The UE triggers the RRC connection resume procedure including information required by the eNB in order to access a stored AS context of the UE.

The E-UTRAN performs security check.

EPS bearer state synchronization between the UE and the network is performed. That is, the UE does not set up a radio bearer and locally deletes not the CP CIoT EPS bearer but the EPS bearer. When the radio bearer for a default EPS bearer is not established, the UE locally deactivates all EPS bearers associated with the default EPS bearer.

3. The eNB announces to the MME that the RRC connection of the UE is resumed within the S1-AP UE Context Resume Request message including the RRC resume cause. When the eNB may not admit all suspended bearers, the eNB indicates all suspended bearers within a list of rejected EPS bearers. The MME enters the ECM-CONNECTED state. The MME identifies whether the UE returns to the eNB for the MME that stores data, UE context, and DL TEID related to the S1AP association required for resuming the connection.

When the default EPS bearer is not accepted by the eNB, all EPS bearers associated with the default bearer are treated as non-accepted bearers. The MME triggers the bearer release procedure (see TS 24.301) to release a non-accepted bearer and a non-established bearer.

In order to assist the location service, the eNB instructs the MME to provide the Coverage Level of the UE.

When the S1-U connection is resumed and the UE accesses the RRC establishment cause set to the "MO exception data" through the NB-IoT RAT, the MME announces the use of the establishment cause to the S-GW by the MO Exception Data Counter. The MME maintains the MO Exception Data Counter and transmits the maintained MO Exception Data Counter to the S-GW.

3b. When the RRC establishment cause "MO Exception Data" is used by the MO Exception Data Counter, the S-GW needs to inform the P-GW. The S-GW instructs the related counter to use the RRC establishment cause.

3c. The P-GW instructs the related counter to use the RRC establishment cause "MO Exception Data".

4. The MME acknowledges connection resume in the S1-AP UE Context Resume Response message. When the MME may not admit all suspended E-RABs, the MME indicates all suspended E-RABs within an E-RABs Failed To Resume List information element (IE).

5. When the MME includes an E-RABs Failed To Resume List in step 4 above, the eNB reconfigures the radio bearer.

6. Now, the uplink data may be delivered to the S-GW from the UE by the eNB. The eNB transmits the uplink data to the S-GW using the S-GW address and TEID stored during the connection suspend procedure. The S-GW delivers the uplink data to the P-GW.

7. The MME transmits a modify bearer request message to the S-GW for each PDN connection. The Modify Bearer Request message includes the eNB address, the S1 TEID for the accepted EPS bearer, a Delay Downlink Packet Notification Request, and an RAT type.

When the S-GW supports a Modify Access Bearers Request procedure and further, when the S-GW need not transmit the signaling to the P-GW, the MME may transmit a Modify Access Bearers Request to the S-GW for each UE for signaling optimization. The Modify Access Bearers Request may include the eNB address(es) and TEID(s) for a downlink user plane for the accepted EPS bearer and the Delay Downlink Packet Notification Request.

The S-GW may now transmit the downlink data to the UE.

In order to memorize which downlink data buffered for the UE using a power saving function is delivered and in order to prevent unnecessary user plane set-up together with subsequent TAU, the MME and the S-GW clear a DL Data Buffer Expiration Time within a UE context thereof (if set).

8. The S-GW may return the Modify Bearer Response message to the MME in response to the Modify Bearer Request message or return the Modify Access Bearers Response message to the MME in response to the Modify Access Bearers Request message.

The Modify Bearer Response message and the Modify Access Bearers Response message may include an S-GW address and a TEID for uplink traffic.

When the S-GW may not serve an MME request within the Modify Access Bearers Request message without an S5/S8 signaling other than unpause charging in the P-GW or a corresponding Gxc signaling when the PMIP is used other than S5/S8, the S-GW responds to the MME with an indication that modification is not limited to the S1-U bearer. In addition, the MME repeats the request by using the Modify Bearer Request message for each PDN connection.

When Selected IP Traffic Offload (SIPTO) is activated for the PDN connection involving a stand-alone gateway deployment in a local network and a Local Home Network ID for a stand-alone connected by the UE is different from a Local Home Network ID of an SIPTO@LN PDN connection initiated by the UE, the MME requests disconnection of the SIPTO in a local network PDN connection with a "reactivation requested" cause value.

When the Selected IP Traffic Offload (SIPTO) is activated for the PDN connection involving a collocated local gateway (LGW) deployment and an LGW core network (CN) address of the cell connected by the UE is different from an LGW CN address of the cell of the SIPTO initiated by the UE in the local network PDN connection, the MME requests the disconnection of the SIPTO in the local network PDN connection with the "reactivation requested" cause value.

Figure 15:
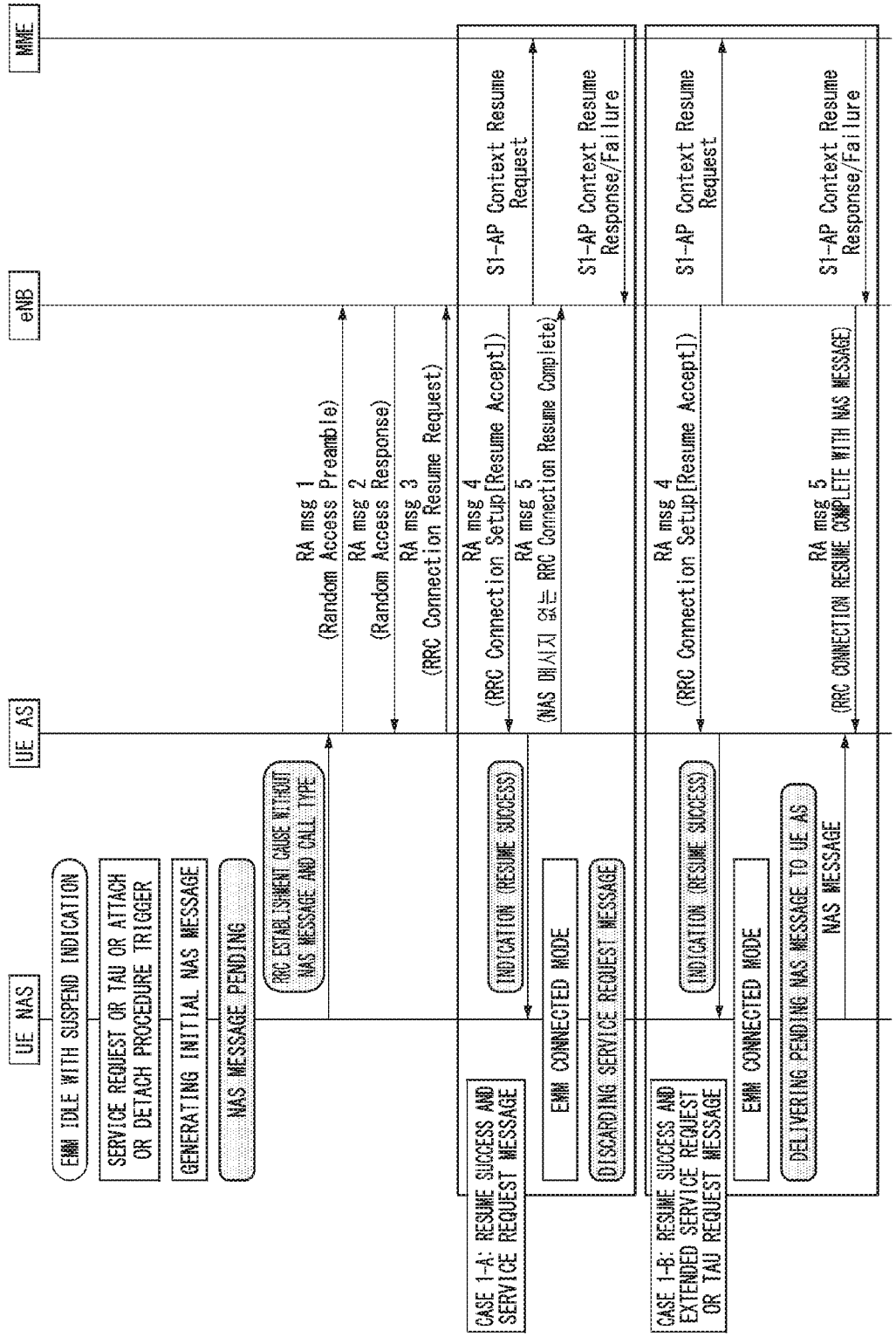
FIG. 15 more specifically illustrates a resume procedure in the wireless communication system to which the present invention may be applied.

FIG. 15 more specifically illustrates a resume procedure in a wireless communication system to which the present invention may be applied.

Referring to FIG. 15, the NAS layer of the UE is an EMM-IDLE mode with suspend indication. In the NAS layer of the UE, a service request or tracking area update (TAU) or attach or detach procedure is triggered. The NAS layer of the UE generates an initial NAS message and the initial NAS message is pending.

The NAS layer of the UE transmits an RRC establishment cause and a call type to the AS layer of the UE without an NAS message.

I-A) Resume is Successful and Service Request Message

When the AS layer of the UE receives an RRC Connection Setup message with Resume Accept from the eNB, it is indicated to the NAS layer of the UE that the resume is successful.

The NAS layer of the UE enters the EMM-CONNECTED mode and discards the SERVICE REQUEST message.

The AS layer of the UE transmits to the eNB an RRC Connection Resume Complete message with no NAS message.

I-A) Resume is Successful and EXTENDED SERVICE REQUEST or TAU REQUEST Message

When the AS layer of the UE receives the RRC Connection Setup message with Resume Accept from the eNB, it is indicated to the NAS layer of the UE that the resume is successful.

The NAS layer of the UE enters the mode and delivers the pending NAS message to the AS layer of the UE.

The AS layer of the UE transmits to the eNB the RRC Connection Resume Complete message including the NAS message.

Enhancement of Connection Set-Up Between Enhanced Remote UE (eRemote-UE) and Enhanced Relay UE (eRelay-UE)

A fast connection set-up between the eRelay-UE and the eRemote-UE is a part of a service requirement and pairing is proposed as a means for achieving the fast connection set-up. When developing solutions for the fast connection set-up, the following should be required:

whether to enhance the connection set-up and how to enhance the set-up without a prior association.

whether an association between the eRemote-UE and the eRelay-UE is provided as a supplement of the EPC.

whether the prior association is used only for a private relay network (i.e., network constituted only by devices with a specific trusted relationship with each other).

For the key issues, three different solutions are currently present. All solutions are different only in that a relay function is used for delivering a signaling and user data between the eRemote-UE and the network and are based on a legacy service request procedure.

As one solution of the solutions, in order to set up PC5 communication, a legacy ProSe procedure for one-to-one communication is used, but a direct (indirect) communication request/response which is a new message type is changed in order to indicate to the eRelay-UE that one-to-one communication is used for indirect communication.

The solution may operate with a minimal impact compared to legacy for both open and restricted discoveries.

Hereinafter, the solution will be described in more detail.

The solution proposes a method for optimizing the connection set-up between the eRemote-UE and the network in order to achieve the fast connection set-up.

Such a procedure includes two steps. First, UE-1 transmits a Direct Communication Request message to UE-2. The message triggers two steps: mutual authentication and security association between UE-1 and UE-2.

A solution for Layer-2 relay uses a fact that traffic may be safely protected by a legacy AS security procedure with respect to traffic using indirect 3GPP communication between the eRemote-UE and the eNB. The protection may be used for providing a safe PC5 link. In optimization proposed to set up one-to-one communication between the eRemote-UE and the eRelay-UE, since PC5 is protected by AS security between the eRemote and the eNB, 2 steps are omitted in a procedure defined in section 5.4.5 of 3GPP TS 23.303.

The solution is based on the legacy service request procedure specified in section 5.3.4 of TS 23.401, but it is different that an L2 layer-relay function is used in order to deliver the signaling and user data between the eRemote-UE and the network.

Figure 16:
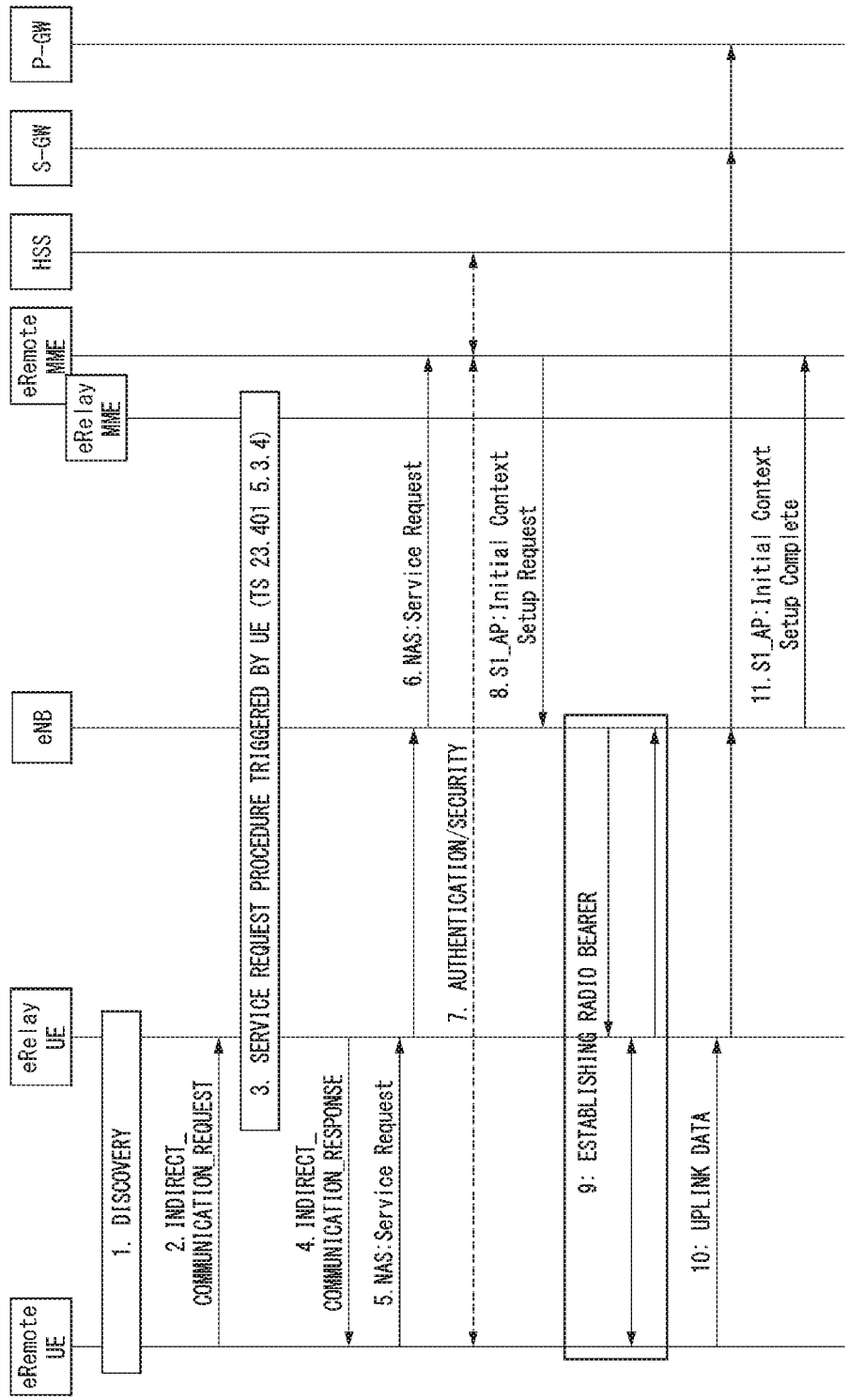
FIG. 16 illustrates a service request procedure triggered by an enhanced remote UE (eRemote-UE) in the wireless communication system to which the present invention may be applied.

FIG. 16 illustrates a service request procedure triggered by an enhanced remote UE (eRemote-UE) in a wireless communication system to which the present invention may be applied.

1. The eRemote-UE and the eRelay-UE perform a PC5 discovery procedure.

2. The eRemote-UE transmits a INDIRECT_COMMUNICATION_REQUEST message triggered by the upper layer to the eRelay-UE to initiate one-to-one communication with the eRelay-UE.

3. The eRelay-UE transmits to the MME of the eRelay-UE the Service Request message (including an identifier of the eRelay-UE, e.g., GUTI and S-TMSI) triggered by the request received from the eRemote-UE. This step is performed according to section 5.3.4 of TS 23.401.

4. The eRelay-UE transmits an INDIRECT_COMMUNICATION_RESPONSE message to the eRemote-UE.

5. When INDIRECT_COMMUNICATION_REQUEST is accepted, the eRemote-UE transmits to the MME of the eRemote-UE the service request (including the identifier of the eRemote-UE, e.g., GUTI and S-TMSI). The Service Request message is encapsulated in the RRC message and transmitted to the eNB. The eRelay-UE delivers the message to the eNB using a RAN specific L2 relay method.

6. The eNB derives an MME identifier of the eRemote-UE using the identifier of the eRemote-UE and delivers the NAS message within an S1-MME control message. This step is performed according to section 5.3.4 of TS 23.401.

7. An NAS authentication/security procedure defined in section 5.3.4 of TS 23.401 may be performed.

8. The MME transmits an S1-AP Initial Context Setup Request message to the eNB.

9. The eNB performs a radio bearer establishment procedure according to section 5.3.4 of TS 23.401. The eRelay-UE delivers all messages between the eRemote-UE and the eNB using the RAN specific L2 relay method.

10. Now, the uplink data from the eRemote-UE may be delivered to the S-GW by the eRelay-UE and the eNB. The S-GW delivers the uplink data to the P-GW.

11. The eNB transmits the S1-AP Initial Context Setup Complete message to the MME. This step is described in detail in TS 36.300.

Method for Transmitting and Receiving Sidelink (Direct Link) Small Data

1. Problem 1

According to an operation in the related art, in order to transmit data through the relay UE, the remote UE needs to establish a direct link (i.e., a sidelink) with the relay UE and transmit the data.

The remote UE needs to perform the direct link setup procedure in order to establish the direct link with the relay UE.

In this case, the remote UE may transmit the DIRECT COMMUNICATION REQUEST message to the relay UE in order to establish a secured connection during the direct link setup procedure and receive a DIRECT COMMUNICATION ACCEPT message from the relay UE receiving the DIRECT COMMUNICATION REQUEST message and thereafter, transmit data to be transmitted through the direct link.

When the direct link is established, the remote UE needs to perform a direct link keepalive procedure in order to maintain the corresponding direct link and perform a direct link release procedure in order to release the corresponding direct link.

Even when the remote UE which is a low power, low rate, and low complexity/low cost device transmits small data through the relay UE, performing the aforementioned operation in the related art may occur as overhead. Specifically, the above case will be described below.

When the remote UE wishes to transmit only small data that may be transmitted once (one packet/one time slot) via the direct link, the remote UE needs to perform the following procedure.

The remote UE needs to perform the direct link setup procedure in order to establish the direct link. When the direct link is successfully established, the corresponding small data may be transmitted through the established direct link. When the relay UE receiving the DIRECT_COMMUNICATION_REQUEST message in the direct link setup procedure successfully completes confirming the user information and the IP configuration, the relay UE performs a direct security mode control procedure in order to establish the security association with the remote UE.

When the remote UE no longer transmits data via the corresponding direct link, the remote UE needs to perform the direct link release procedure in order to release the corresponding direct link.

In this case, when the direct link is not released, the direct link keepalive procedure needs to be performed.

2. Problem 2

When the relay UE relays the small data of a plurality of remote UEs, the relay UE attempts to transmit the corresponding small data at each small data transmission time of each remote UE through the Uu interface (i.e., the radio interface between the UE and the RAN), which reduces power and channel efficiency. Assuming that a data transmission period of the remote UE is long and the transmission time of each remote UE is asynchronized, such efficiency may be lower. As a result, power consumption of the relay UE increases and signaling overhead increases due to repetition of the following operations.

- Operation for switching from EMM-IDLE mode to EMM-CONNECTED mode
- Operation for switching from EMM-CONNECTED mode to EMM-IDLE mode
- Process of requesting a resource for transmission (data volume indicator (DVI), buffer state report (BSR), etc.)

In particular, in an IoT environment, when it is assumed that a plurality of remote UEs (for example, sensor devices) communicate with the network via one relay UE, the aforementioned problem may occur with a higher probability more frequently.

The present invention intends to propose a method for transmitting small data while minimizing the power consumption by the remote UE. The present invention may be more effective when the remote UE is the low power, low rate, and low complexity/low cost device.

Hereinafter, in the description of the present invention, the small data may mean not only data (user data) but also a signaling (message). In this case, the signaling may mean an NAS signaling or an RRC signaling.

Further, uplink or downlink transmission of the remote UE means uplink or downlink transmission through the sidelink with the relay UE.

Figure 17:
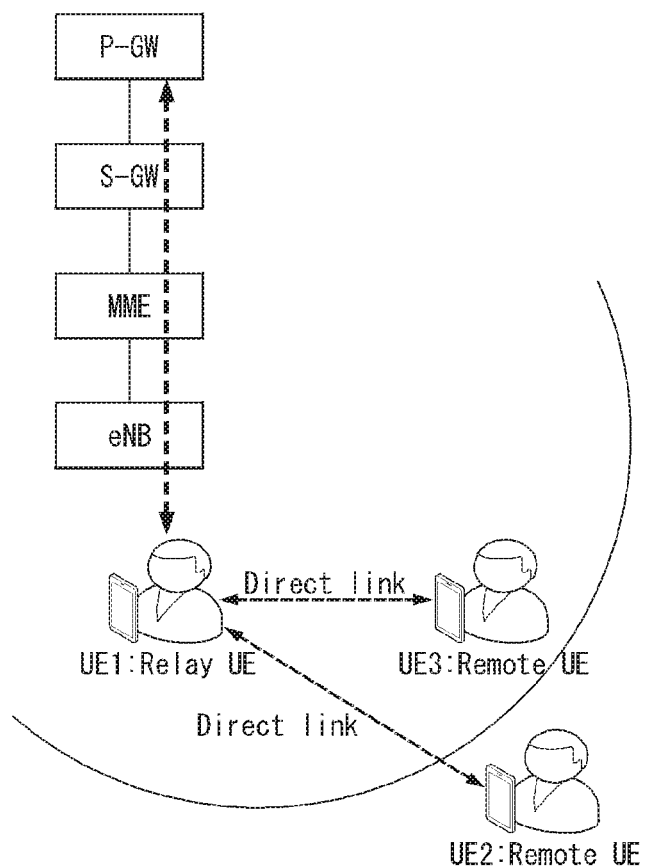
FIG. 17 illustrates a base scenario according to an embodiment of the present invention.

FIG. 17 is a diagram illustrating a basic scenario according to an embodiment of the present invention.

The remote UE may be positioned in coverage of the cell and out of coverage. The remote UE considers a situation in which the remote UE intends to transmit data to the network through the relay UE.

Embodiment 1

Figure 18:
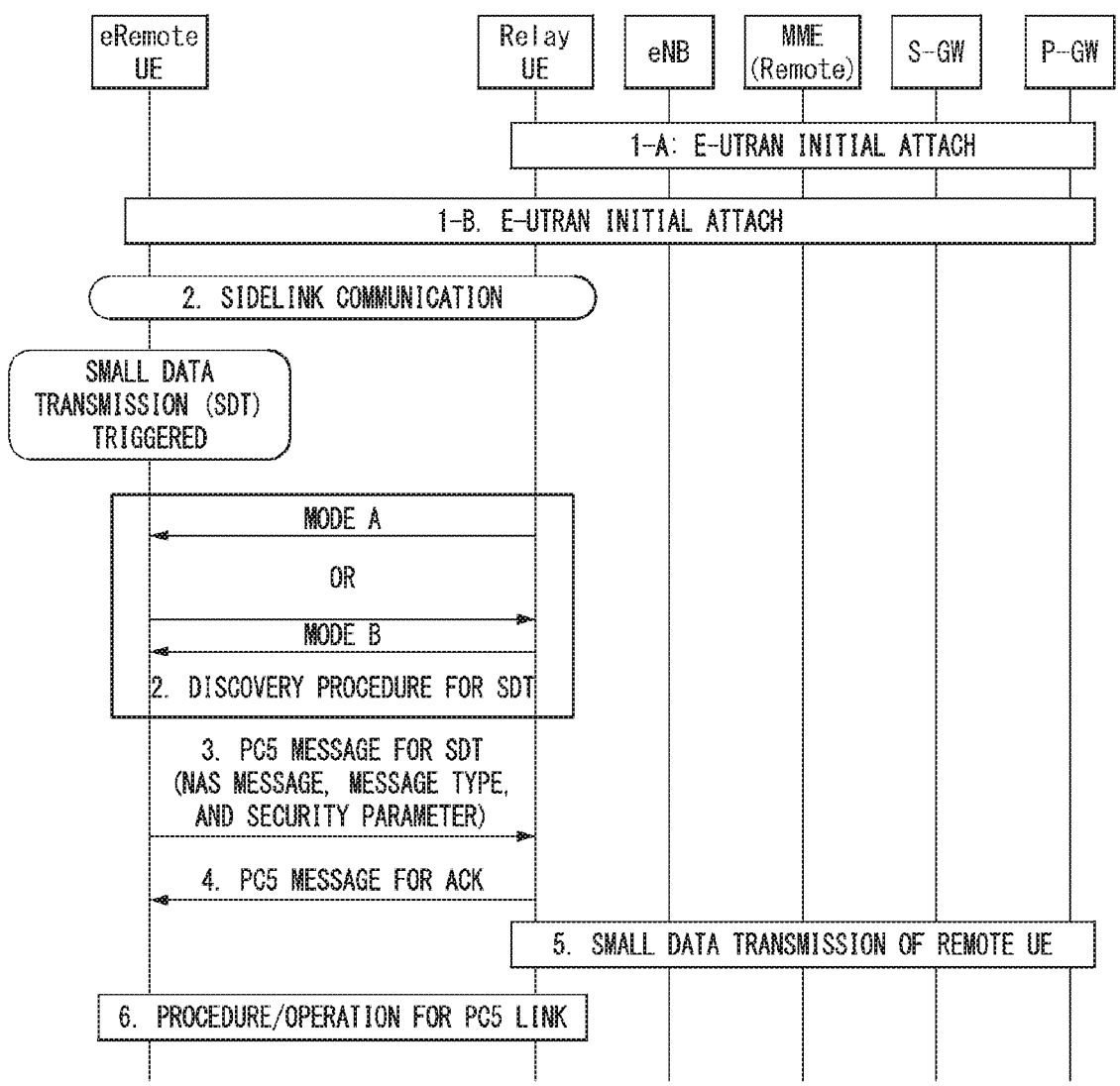
FIG. 18 is a diagram illustrating a method for transmitting small data through a relay UE of a remote UE according to an embodiment of the present invention.

FIG. 18 is a diagram illustrating a method for transmitting small data through a relay UE of a remote UE according to an embodiment of the present invention.

1. The relay UE performs an initial attach procedure to E-UTRAN (1-A). The relay UE performs the initial attach procedure to the E-UTRAN (1-B).

2. When Small Data Transmission (SDT) is triggered, the remote UE performs a discovery procedure with the Relay UE for the SDT.

3. The remote UE may transmit a PC5 message for the SDT to the relay UE. Small data transmitted from the remote UE may be data transmitted to a user plane (UP) or data transmitted to a control plane (CP). When the small data is transmitted in the control plane, a user bearer (i.e., a data radio bearer (DRB) and an S1-U bearer) is not established and the small data is constituted by NAS PDU(s), included in the NAS message, and transmitted to the control plane.

4. The remote UE receives a PC5 message for response/acknowledge (Ack) from the relay UE.

5. The relay UE transmits the small data of the remote UE to the network.

In this case, when the type of small data transmitted from the remote UE is control plane (CP) data, the relay UE may transmit the small data of the Remote UE to the network using the data transmission method in the CP CIoT EPS optimization illustrated in FIG. 11 above. In relation to more specific procedures, TS 23.401 V14.2.0 may be incorporated into this document as a reference.

6. The remote UE and the relay UE perform a procedure/operation for the PC5 link.

Hereinafter, the procedure depending on FIG. 18 will be described in more detail.

[1] Method of Confirming the Capability of the Small Data Transmission of the Relay UE (Through the Discover Procedure)—Corresponding to Step 2 in FIG. 18 Above The capability of the small data transmission of each UE is provisioned. For example, the capability of the small data transmission may be pre-configured in a Universal Subscriber Identity Module (USIM) or a Mobile Equipment (ME) or configured from an operator (e.g., Open Mobile Alliance (OMA)).

The remote UE may confirm whether the relay UE has the capability of the small data transmission in the following method.

When the relay UE performs the discovery procedure, the relay UE may announce the capability thereof to a PC5_DISCOVERY message. This may be implemented by the following method.

A. In the above description, the PC5_DISCOVERY message may be the following message according to a discovery model.

i. Model A: PC5_DISCOVERY message for UE-to-Network Relay Discovery Announcement ii. Model B: PC5_DISCOVERY message for UE-to-Network Relay Discovery Response In methods i and ii described above, a new parameter for the capability of supporting the small data transmission may be included in a status indicator IE of the PC5_Discovery message.

The status indicator parameter is used for indicating the status of the ProSe UE-to-network relay. Such a parameter may be coded according to Table 12 below.

The RSI is used for indicating whether the UE has a resource available for providing a connectivity service for an additional ProSe-enabled public safety UE.

A Small Data Transmission Indicator (SDTI) is used for indicating whether the UE supports a small data transmission procedure.

Table 12 shows a Status Indicator parameter (or IE).

TABLE 12

| Bit | |
|---|---|
| | RSI (octet 1) |
| 8 | |
| 0 | The UE does not have the resource available for providing the connectivity service for the ProSe-enabled public safety UE(s). |
| 1 | The UE has the resource available for providing the connectivity service for the ProSe-enabled public safety UE(s). |

TABLE 12-continued

| Bit | |
|---|---|
| SDTI (octet 1) | |
| 7 | |
| 0 | The UE does not support the small data transmission procedure. |
| 1 | The UE supports the small data transmission procedure. Bits 1 to 6 of octet 1 are spare and coded to 0. |

Alternatively, in methods i and ii described above, a new IE may be added to the PC5_Discovery message and a new parameter for the capability of supporting the small data transmission may be included in the new added IE 'capability'.

B. The aforementioned capability means a capability of supporting the small data transmission. A method for announcing such a capability may be announced by whether to support the small data transmission.

C. When the capability is reported in the PC5_DISCOVERY message for the UE-to-Network Relay Discovery Response (i.e., when operating in Model B), the above operation is possible in all of the following cases:

i. Case where the remote UE transmits the PC5_DISCOVERY message for UE-to-Network Relay Discovery Solicitation as an inquiry for the corresponding capability and the relay UE receives the PC5_DISCOVERY message ii. Case where the relay UE receives the PC5_DISCOVERY message for UE-to-Network Relay Discovery Solicitation regardless of the inquiry of the remote UE A further implementation of the aforementioned operation is referred to the 'discovery model' and the 'PC5_Discovery message for UE-to-network relay'.

[2] Method for Recognizing Small Data Transmission—Corresponding to Step 2 (in Particular, SDT Triggered) in FIG. 18 Above When the small data is generated inside the remote UE, the upper layer (e.g., an application layer (or V2X layer or ProSe layer) or NAS layer) announces the lower layer (e.g., AS layer or RRC layer) that the small data is generated, and as a result, the lower layer may recognize that the small data is generated.

1) When the small data is data (i.e., user data) other than the signaling, the remote UE can recognize the generation of the small data in the following method/order.

A. Data to be transmitted through the PC5 is generated in the application layer (or V2X layer or ProSe layer) and it is recognized that the data is the small data. In the above description, the small data means data (or signaling) in which an amount of the data may be transmitted at a small number of times (e.g., once or twice) or a small amount of time by a transmission method described in [3] to be described below. In this case, the application layer of the remote UE delivers to the lower layer (e.g., AS layer or RRC layer) data including the following.

i. small data; and
    ii. Indication (e.g., small data transmission indication) that the small data transmission is required; and
    iii. Small data information is delivered. The small data information may include any one of the following IEs.
      I. 'No uplink or downlink data transmission is expected after uplink data transmission'; or
      II. 'No uplink data transmission is expected after single downlink data transmission and uplink data transmission'; or
      III. 'No available information'

In the above description, instead of III), it may be expressed that 'additional uplink or downlink data transmission is expected after uplink data transmission'. Alternatively, III) may be interpreted as 'additional uplink or downlink data transmission is expected after uplink data transmission'.

B. The lower layer (e.g., AS layer or RRC layer) receiving the interpretation recognizes that the small data transmission is required and determines to use the transmission method of [3] described below.

2) When the small data is the NAS signaling or RRC signaling, the remote UE can recognize the generation of the small data in the following method/order.

A. When the NAS signaling is generated in the NAS layer of the remote UE, the NAS layer delivers the corresponding NAS signaling message to the lower layer (e.g., AS layer or RRC layer). In this case, the NAS layer of the remote UE may deliver to the lower layer (e.g., AS layer or RRC layer) the NAS signaling message including the following.

i. small data; and
    ii. Indication (e.g., small data transmission indication) that the small data transmission is required; and
    iii. Small data information is delivered. The small data information may include any one of the following information.
      I. 'No uplink or downlink data transmission is expected after uplink data transmission'; or
      II. 'No uplink data transmission is expected after single downlink data transmission and uplink data transmission'; or
      III. 'No available information'

In the above description, instead of III), it may be expressed that 'additional uplink or downlink data transmission is expected after uplink data transmission'. Alternatively, III) may be interpreted as 'additional uplink or downlink data transmission is expected after uplink data transmission'.

B. In A), the NAS layer of the remote UE may transmit the following additional information to the lower layer (e.g., AS layer or RRC layer) together with the NAS signaling message.

Whether user plane set-up is required. The information may be indicated by whether an active flag is configured.

C. The lower layer (e.g., AS layer or RRC layer) receiving the information recognizes that the small data transmission is required and determines to use the transmission method of [3] described below.

in C) above, when the lower layer determines transmission of the small data, the lower layer may determine the transmission by considering the amount of the data to be transmitted to the user plane. For example, the NAS message is received and the small data may be transmitted only with the NAS message itself, but when the data amount of the user plane is large, the lower layer (e.g., AS layer or RRC layer) may select not the small data transmission but the transmission method by the operation in the related art.

[3] Small Data Transmission Method—Corresponding to Steps 3 to 6 in FIG. 18 Above

[3-1] Remote UE Operation

The PC5 message which the remote UE uses for the small data transmission may be a PC5 signaling message defined in the related art or a new defined PC5 message.

When the corresponding remote UE transmits the small data, the PC5 message may include at least one of the following IEs.

1. Message type IE: 'small data transmission' or 'normal transmission'

The 'small data transmission' indicates a PC5 message for the small data transmission. The 'normal transmission' means not the small data transmission but the operation in the related art.

2. PDU type IE: 'Data' or 'Signaling' or 'Control Plane (CP) data (CP_data)'

Indication for distinguishing whether the PDU included in the corresponding PC5 message is the signaling or the data. In the case of the NAS signaling or RRC signaling, when only the data is included as 'signaling', 'data' may be included and when a message of a type in which the NAS signaling includes a data PDU is included in the PDU, the 'CP_data' may be included.

Further, in the case of the 'CP_data', an indication for the 'CP_data' may not be separately defined. In this case, when the message of the type in which the NAS signaling includes the data PDU is included in the PDU, the message may be expressed as 'signaling'.

3. Small data information IE: The small data information may include any one of the following information.

I. 'No uplink or downlink data transmission is expected after uplink data transmission'; or II. 'No uplink data transmission is expected after single downlink data transmission and uplink data transmission'; or III. 'No available information'

In the above description, instead of III), it may be expressed that 'additional uplink or downlink data transmission is expected after uplink data transmission'. Alternatively, III) may be interpreted as 'additional uplink or downlink data transmission is expected after uplink data transmission'.

4. Active Transmission Time IE

The IE indicates a time (i.e., a time of maintaining the direct link through the PC5) for which the remote UE intends to maintain transmission through the PC5 interface with the relay UE. The remote UE may set this IE to be equal to or longer than a required time expected for transmission of the small data.

5. Security parameters IE

Here, it is assumed that the security parameters are provisioned. That is, the security parameters may be pre-configured or configured from the network (e.g., OMA). The remote UE and the relay UE may store and maintain security parameters used when establishing a previously secured connection. In this case, the remote UE may reuse a previously used security parameter value. A specific method of the reuse may also be performed in a scheme which is previously agreed between both UEs. For example, the remote UE may generate a security key value according to the previously used/maintained security parameter and the promised reuse method and use the generated security key value as the security parameter value. The relay UE receiving the security key value may check whether the corresponding remote UE and the remote UE are safe according to the promised reuse method and a verification method. At the time of verification, an identifier, a bearer ID, and the security key value of the UE may be used.

6. Sequence number IE

The sequence number IE includes a unique sequence number for the corresponding small data transmission.

The IEs in sections 1 and 2 described above may be expressed/implemented as one IE. For example, the IEs in sections 1 and 2 may be expressed/implemented as small data transmission for data, small data transmission for signaling, small data transmission for CP_data.

Further, when the IE in section 5 is included in the PC5 message, it is not necessary to perform the direct security mode control procedure performed to establish the security association like the related art. Further, when the remote UE already establishes the security association with the relay UE, the IE in section 5 is not included in the PC5 message.

[3-2] Relay UE Operation

The operation of the Relay UE according to whether each IE is included in the received PC5 message is as follows.

1. When the message type IE contains 'small data transmission', the Relay UE recognizes that the transmission is 'small data transmission' and when the relay UE determines that the PC5 messages transmitted by the remote UE and the remote UE are safe through verification, the relay UE may not perform the direct link setup procedure for establishing the direct link and the direct security mode control procedure performed to establish the security association.

2. When the PDU type is the data, the data (i.e., PDU) may be transmitted from the LTE-Uu interface to the user plane and when the PDU type is the signaling or CP_data, the data (i.e., PDU) may be transmitted through the control plane.

3. The small data information operates as follows according to an indicated value. For the following IE, it is referred to the description of IE described above (i.e., see section 3 of [3-1] above).

I. 'No Uplink or Downlink Data Transmission is Expected after Uplink Data Transmission'

When the relay UE receiving the IE successfully transmits the received small data to the LTE-Uu, the relay UE locally releases the direct link. As a result, transmission and reception with the remote UE are stopped.

II. 'No Uplink Data Transmission is Expected after Single Downlink Data Transmission and Uplink Data Transmission' i. The relay UE receiving the IE successfully transmits the small data to the LTE-Uu and waits for receiving the downlink data for the remote UE. In addition, when the downlink data for the remote UE is received, the relay UE delivers the received downlink data to the remote UE. When the relay UE successfully delivers the downlink data for the remote UE, the relay UE locally releases the direct link with the corresponding remote UE.

In this case, when the downlink data is not received for a predetermined time, the relay UE may operate as follows.

A. The relay UE may announce to the remote UE that the downlink data is not received for a predetermined time.

When the remote UE receives the announcement, the remote UE may perform retransmission.

B. The relay UE may locally release the direct link with the remote UE immediately.

For the aforementioned operation, the relay UE may use a timer. In this case, the relay UE may start while setting the timer to a predetermined value from the time when the small data received from the remote UE is successfully transmitted to the network through the LTE-Uu interface. In addition, when the downlink data of the remote UE is not received until the timer expires, the relay UE may operate as one of A and B above. The timer may be provisioned or delivered while being included in the PC5 message from the remote UE. In this case, the value of the corresponding timer may be equal to or longer than a round trip time of the packet.

ii. When the remote UE transmits the PC5 message including the IE, the remote UE monitors reception of the downlink data. In this case, when the downlink data is not received for a predetermined time, the remote UE may retransmit the same PC5 message again.

For such an operation, the remote UE may use the timer. In this case, the remote UE may start while setting the timer to a predetermined value from the time when the small data is successfully transmitted to the relay UE. In addition, when the downlink data of the remote UE is not received until the timer expires, the relay UE may operate as in section ii above.

III. No Information Available

The relay UE receiving the IE may successfully transmit the small data to the LTE-Uu and maintain a transmission/reception state for a predetermined time. In addition, when the predetermined time expires, the relay UE may locally release the direct link with the corresponding remote UE.

For the aforementioned operation, the relay UE may use an inactivity timer. The corresponding inactivity timer may start from the time when there is no data or signaling with the remote UE and stop when the data or signaling with the remote UE is generated. When the inactivity timer expires, the relay UE may locally release the direct link with the remote UE.

Here, an interface interval of the data or signaling with the remote UE may include both a PC 5 interface interval and an LTE-Uu interface interval. In this case, in the case of the LTE-Uu interval, the generation of the data or signaling with the remote UE may refer to reception of the data or signaling for the remote UE by the relay UE.

Further, a time value of the inactivity timer may adopt a provisioned value or may be delivered from the remote UE. When the time value is delivered from the remote UE, the value of an 'active transmission time' may be used.

Meanwhile, when the relay UE successfully receives the small data received from the remote UE or successfully transmits the small data received from the remote UE through the LTE-Uu, the relay UE may transmit a response/acknowledge (Ack) thereto to the remote UE. The PC5 message for sending the response/Ack may include at least one of the following IEs.

1. Ack/Non-Acknowledge (Nack) indication IE

The IE indicates whether transmission/reception of the corresponding small data is successful or unsuccessful.

In the case of the Nack, the IE may further include a cause indicating a reason for the failure and a reattempt timer (value). The remote UE receiving the cause and the reattempt timer (value) may attempt retransmission until the reattempt timer expires.

2. Sequence number: A sequence number (i.e., a sequence number received from the remote UE) configured in the remote UE is used as it is.

3. Security parameters

The security parameter may be provisioned. That is, the security parameters may be pre-configured or configured from the network (e.g., OMA). The remote UE and the relay UE may store and maintain security parameters used when establishing a previously secured connection. In this case, the relay UE may reuse a previously used security parameter value. A specific method of the reuse is also performed in a scheme which is previously agreed between both UEs. For example, the relay UE may generate a security key value according to the previously used/maintained security parameter and the promised reuse method and use the generated security key value as the security parameter value. The remote UE receiving the security key value may check whether the corresponding relay UE and the relay UE are safe according to the promised reuse method and a verification method. At the time of verification, an identifier, a bearer ID, and the security key value of the UE may be used.

When the remote UE operates as 'asymmetric UL/DL', the remote UE may the security parameter to not II. but I. 'no uplink or downlink data transmission is expected after uplink data transmission' even though an uplink corresponding to II. (i.e., 'No uplink data transmission is expected after single downlink data transmission and uplink data transmission').

Meanwhile, the small data transmission method described above may also be applied to the case where the direct link is established through the direct link setup procedure and the data is transmitted in the related art.

For example, while the remote UE transmits data through the established direct link, when data to be transmitted is last transmission, the data may be transmitted by using the small data transmission method described above.

Embodiment 1-2

The embodiment proposes a method for solving Problem 1 described above.

In order for the remote UE to transmit data to the relay UE,

A. the remote UE needs to discover the relay UE through the discovery procedure.

B. the remote UE needs to then perform the direct link setup procedure in order to establish the direct link. In this process, in the case of layer 3 relay, the IP address needs to be assigned. On the contrary, in the case of layer 2 relay, the bearer needs to be configured.

C. In addition, a separate security procedure (e.g., direct security mode control procedure or direct link rekeying procedure) may be performed in order to make the secured connection.

Performing the processes A to C may be a burden on the IoT device in terms of the power consumption. That is, there is a problem that the overhead occurs in which a lot of processes are required to be performed with respect to the size of data transmitted by the IoT device.

Further, even after processes A to C above are performed, the keepalive procedure needs to be performed in order to maintain the direct link. Accordingly, there is a problem that the remote UE or the relay UE needs to consume power in order to receive a signaling or data at which time is known to be transmitted as long as the direct link is maintained.

When there is no possibility that the downlink data of the remote UE will be generated (i.e., a Mobile Initiated Connection Only (MICO) mode which the remote UE supports only the connection initiated by the UE) or when there is no downlink data for a long time (e.g., when the remote UE is configured in an Extended idle-mode Discontinuous Reception (Edrx) or Power Saving Mode (PSM), a corresponding time interval), a larger benefit may be obtained by establishing the direct link again when the MO occurs after releasing the direct link rather than accepting loss which occurs while maintaining the direct link.

The embodiment intends to propose a method for reducing overhead consumed in establishing a new direct link when establishing the direct link as described above.

Hereinafter, inn the embodiment, the remote UE may given a larger gain to a MICO mode UE in which the downlink data is unlikely to be generated or a UE in eDRX or PSM mode in which there is no downlink data for a long time.

In order to solve the problem, the following invention (sidelink suspend and resume procedure) is to be proposed.

Figure 19:
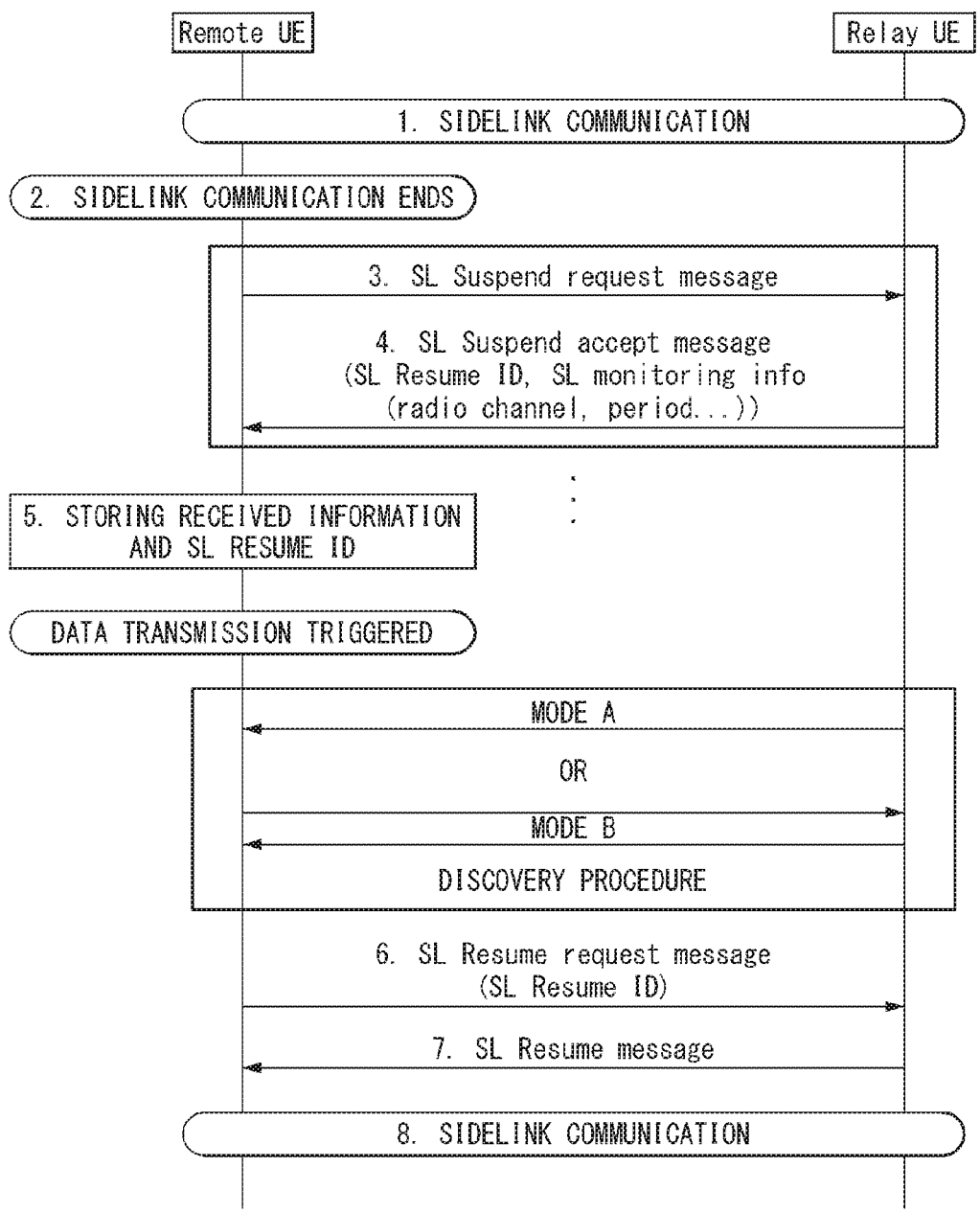
FIG. 19 illustrates sidelink suspend and resume procedures according to an embodiment of the present invention.

FIG. 19 illustrates sidelink suspend and resume procedures according to an embodiment of the present invention.

1. When the remote UE first establishes the direct link (i.e., sidelink (SL)) with the relay UE, the remote UE may perform procedures A to C described above.

Alternatively, when parameters (e.g., a signaling or communication channel bandwidth, security parameters (e.g., chosen security algorithm and key), and address/bearer information) required for procedures A to C are pre-configured, a signaling operation related to the pre-configured parameter may be omitted.

2. After the direct link is established between the remote UE and the relay UE, the remote UE performs data transmission through the established direct link and completes transmission of all data.

3. When the remote UE desires to suspend the corresponding direct link in order to reuse the direct link with the relay UE even for subsequent data transmission, the remote UE transmits the following indication to the relay UE. In this case, an SL suspend request message may be used.

Indication that transmission of all data is completed (e.g., transmission end indication) and/or Suspend request indication.

4. In step 3, upon receipt of an indication that transmission of all data of the remote UE is terminated and the suspend is required, the relay UE stores a context of the remote UE and information related to the direct link established with the remote UE and suspends the direct link. In addition, the relay UE provides to the remote UE an (SL) resume identifier (ID) together information (i.e., the signaling or communication channel bandwidth, a communication period, etc.) required for subsequent communication.

In this case, the information may be provided in a direct link release message or may be provided as a separate direct message (e.g., (SL) Suspend Accept) message.

The relay UE performs the direct link release procedure together with or after delivery of the information or locally releases the direct link with the corresponding remote UE after delivering the information without the direct link release procedure.

Here, the signaling or communication channel bandwidth, and communication period information mean a bandwidth and a reception timing period for receiving a request (i.e., resume request) for the direct link with the remote UE by the relay UE. By providing such information, the relay UE may save power for receiving the request (i.e., resume request) for the direct link with the remote UE.

Both UEs (i.e., the relay UE and the remote UE) may enter a sidelink eDRX state through the signaling or communication channel bandwidth, and communication period information.

Further, in this case, instead of the communication period information, a (sidelink) Paging Time Window and/or (sidelink) eDRX value (eDRX cycle length) may be provided.

5. The remote UE that receives the (sidelink) Paging Time Window and/or (sidelink) eDRX value (eDRX cycle length) stores the received information and an SL resume ID and releases the direct link.

The direct link may be released through the direct link release procedure by the relay UE or locally released by receiving the information without performing the direct link release procedure of the relay UE.

Meanwhile, step 3 above may be performed by the relay UE against the remote UE. An example thereof may be a case where the relay UE recognizes that LTE-Uu connection/RRC connection of the remote UE is released from the network. In this case, the message transmitted to the remote UE by the relay UE in step 3 includes the following indication included in the message transmitted by the remote UE in step 3 and an SL resume identifier (ID), the signaling or communication channel bandwidth, and communication period information included in the message transmitted by the relay UE in step 4. In step 4, the remote UE may transmit a response message to the relay UE in response to receiving the message.

Thereafter, when Small Data Transmission (SDT) is triggered as in step 2 of FIG. 18, the remote UE performs the discovery procedure with the relay UE for the SDT.

6. The remote UE transmits the SL resume ID to the relay UE using the information received in step 5 above.

The remote UE performs the direct link setup procedure or the direct link resume procedure through the signaling or communication channel bandwidth and communication period information already agreed with the relay UE. In this case, the remote UE transmits the message including the SL resume ID to the relay UE.

The direct link resume procedure is a newly defined procedure for resuming a direct connection and a sender sends an SL resume request message including the SL resume ID. In FIG. 19, the case of performing the direct link resume procedure is illustrated.

7. The relay UE that receives the SL resume request message resumes the direct link through the SL resume ID of the remote UE and then, transmits success/failure of the resume to the remote UE. In this case, the SL resume message may be used.

8. When the remote UE receives an indication that the resume is successful from the relay UE, the remote UE performs data transmission through the direct link (i.e., sidelink).

When the remote UE desires to suspend the corresponding direct link so as to reuse the direct link with the relay UE for subsequent data transmission after completing the data transmission, the remote UE may perform the procedure from step 3 again.

On the contrary, when the remote UE receives an indication that the resume is unsuccessful from the relay UE or fails to receive the response from the relay UE for a predetermined time/number of times, the procedure (e.g., discovery procedure, direct link setup procedure, and direct security control procedure) in the related may be performed.

Meanwhile, in step 6 above, when data to be transmitted or delivered to the remote UE by the relay UE is generated, the direct link setup procedure or direct link resume procedure may be initiated through the signaling or communication channel bandwidth and the communication period which are already agreed. In this case, the remote UE transmits the message including the resume ID to the relay UE.

The information (e.g., signaling or communication channel bandwidth and communication period) received from the relay UE by the remote UE may be used similarly even when communication starts again after the communication between the remote UE and the relay UE is interrupted (e.g., due to a sidelink radio link failure (RLF), etc.) in the meantime.

Through the procedure described above, in addition to reducing the signaling (e.g., signaling in the direct link keepalive procedure) required to maintain the direct link, power consumption for receiving the signaling or data from the remote UE may be reduced when the relay UE continuously maintains the direct link.

Embodiments 1 and 1-2 may be combined and performed in one procedure.

Figure 20:
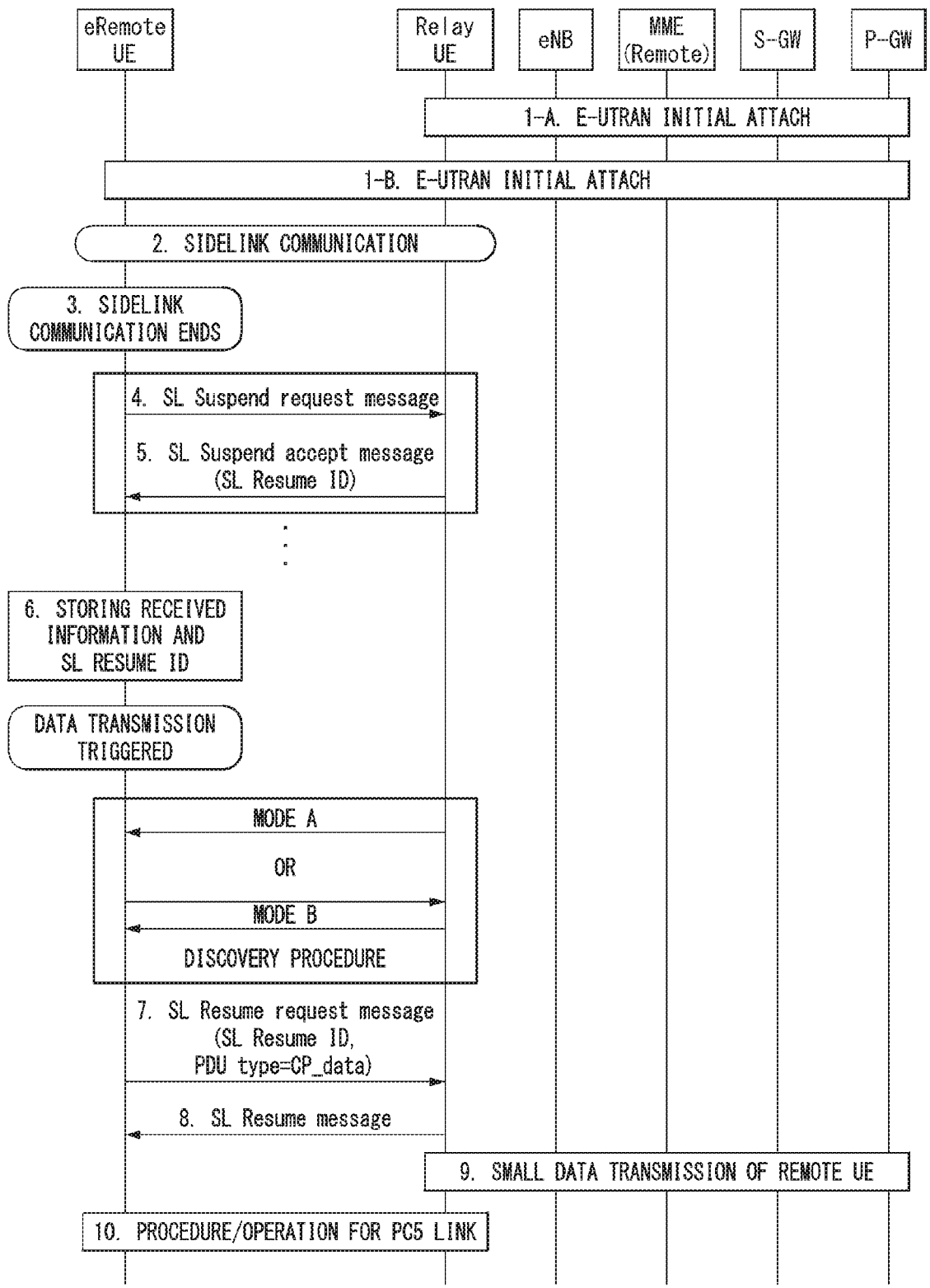
FIG. 20 is a diagram illustrating a method for transmitting data through a relay according to an embodiment of the present invention.

FIG. 20 is a diagram illustrating a method for transmitting data through a relay according to an embodiment of the present invention.

1. The relay UE performs an initial attach procedure to E-UTRAN (1-A). The relay UE performs the initial attach procedure to the E-UTRAN (1-B).

2. When the remote UE first establishes the direct link (i.e., sidelink (SL)) with the relay UE, the remote UE may perform procedures A to C described above.

Alternatively, when parameters (e.g., a signaling or communication channel bandwidth, security parameters (e.g., chosen security algorithm and key), and address/bearer information) required for procedures A to C are pre-configured, a signaling operation related to the pre-configured parameter may be omitted.

3. After the direct link is established between the remote UE and the relay UE, the remote UE performs data transmission through the established direct link and completes transmission of all data.

4. When the remote UE desires to suspend the corresponding direct link in order to reuse the direct link with the relay UE even for subsequent data transmission, the remote UE transmits the following indication to the relay UE. In this case, the SL suspend request message for requesting the suspend of the established direct link may be used.

Indication that transmission of all data is completed (e.g., transmission end indication) and/or Suspend request indication.

5. In step 3, upon receipt of an indication that transmission of all data of the remote UE is terminated and the suspend is required, the relay UE stores a context of the remote UE and information related to the direct link established with the remote UE and suspends the direct link. In addition, the relay UE provides to the remote UE an (SL) resume identifier (ID) together information (i.e., the signaling or communication channel bandwidth, a communication period, etc.) required for subsequent communication.

The relay UE performs the direct link release procedure together with or after delivery of the information or locally releases the direct link with the corresponding remote UE after delivering the information without the direct link release procedure.

Both UEs (i.e., the relay UE and the remote UE) may enter a sidelink eDRX state through the signaling or communication channel bandwidth, and communication period information.

6. The remote UE that receives the (sidelink) Paging Time Window and/or (sidelink) eDRX value (eDRX cycle length) stores the received information and an SL resume ID and releases the direct link.

The direct link may be released through the direct link release procedure by the relay UE or locally released by receiving the information without performing the direct link release procedure of the relay UE.

Meanwhile, step 4 above may be performed by the relay UE against the remote UE. An example thereof may be a case where the relay UE recognizes that LTE-Uu connection/RRC connection of the remote UE is released from the network. In this case, the message transmitted to the remote UE by the relay UE in step 4 includes the following indication included in the message transmitted by the remote UE in step 4 and an SL resume identifier (ID), the signaling or communication channel bandwidth, and communication period information included in the message transmitted by the relay UE in step 5. In step 5, the remote UE may transmit a response message to the relay UE in response to receiving the message. Thereafter, when Small Data Transmission (SDT) is triggered as in step 2 of FIG. 18, the remote UE performs the discovery procedure with the relay UE for the SDT.

7. The remote UE transmits the SL resume ID to the relay UE using the information received in step 6 above.

The remote UE performs the direct link setup procedure or the direct link resume procedure through the signaling or communication channel bandwidth and communication period information already agreed with the relay UE. In this case, the remote UE transmits the message including the SL resume ID to the relay UE.

The direct link resume procedure is a newly defined procedure for resuming the direct connection and the sender sends an SL resume request for requesting the resume of the suspended direct link, which includes the SL resume ID. In this case, the PC5 message for the SDT illustrated in FIG. 18 above may be interpreted as the (SL) resume request message. In this case, the (SL) resume request message may further include the information included in the PC5 message for the SDT of FIG. 18 above together with the (SL) resume ID. For example, when the small data to be transmitted by the remote UE is data transmitted to the control plane, the (SL) resume request message may include the NAS PDU constituted by the small data, in which the 'small data transmission' or 'CP_data' or 'signaling' may be expressed a message type or a PDU type. By another method, after the direct link resume procedure is completed in step 8, data (e.g., PC5 message for the SDT of FIG. 18) may be transmitted separately from the (SL) resume request message.

In FIG. 20, the case of performing the direct link resume procedure is illustrated.

In this case, as described above, the SL Resume Request message may further include the PDU type IE. As described above, the PDU type IE may include 'Data' or 'Signaling' or 'Control Plane (CP) data (CP_data)'. In FIG. 20, a case where the PDU type IE indicates the CP_data is illustrated.

8. The relay UE that receives the CP_data resumes the direct link through the SL resume ID of the remote UE and then, transmits success/failure of the resume of the suspended direct link to the remote UE. In this case, the SL resume message may be used.

9. The relay UE transmits the small data of the remote UE to the network.

In this case, when the type of small data transmitted from the remote UE is control plane (CP) data (i.e., when the user bearer (i.e., data radio bearer (DRB) and the S1-U are not established and the small data is constituted by the NAS PDU(s) and included in the NAS message and transmitted to the control plane), the relay UE may transmit the small data of the Remote UE to the network using the data transmission method in the CP CIoT EPS optimization illustrated in FIG. 11 above. In relation to more specific procedures, TS 23.401 V14.2.0 may be incorporated into this document as a reference. In this case, when the relay UE is in the IDLE mode (e.g., EMM-IDLE mode) with the network, without performing the Service Request procedure for switching to the EMM-CONNECTED mode to transmit the small data of the remote UE to the network, CP CIoT EPS optimization for transmitting the small data of the remote UE may be performed. Therefore, an effect of reducing the power consumption of the relay UE may be obtained.

10. The remote UE and the relay UE perform a procedure/operation for the PC5 link. For example, when the relay UE receives the downlink data or signaling message for the remote UE from the network, the relay UE delivers the received downlink data or signaling message to the remote UE. When the relay UE receives the release message for the remote UE from the network, the relay UE delivers the corresponding release message to the remote UE or performs the direct link release procedure for releasing the PC5 link.

Hereinafter, a process for embodiment 1-2 will be described in more detail.

In an example to be described below, the PSM and the eDRX are prepared based on an EPC system, but the PSM and the eDRX may also be applied to a 5G system.

In an example to be described below, a UE which is in a PSM mode or MICO mode does not perform an operation for receiving uplink/downlink/sidelink signaling or data through the corresponding direct link in the SL direct link suspend state.

A UE which is in an eDRX mode performs uplink/downlink/sidelink signaling or data reception only in a paging occasion by a predetermined eDRX cycle in the SL direct link suspend state and performs a reception operation in the remaining eDRX interval. As a result, a power saving effect may be obtained.

First, a case where the UE is in the PSM mode is described.

Figure 21:
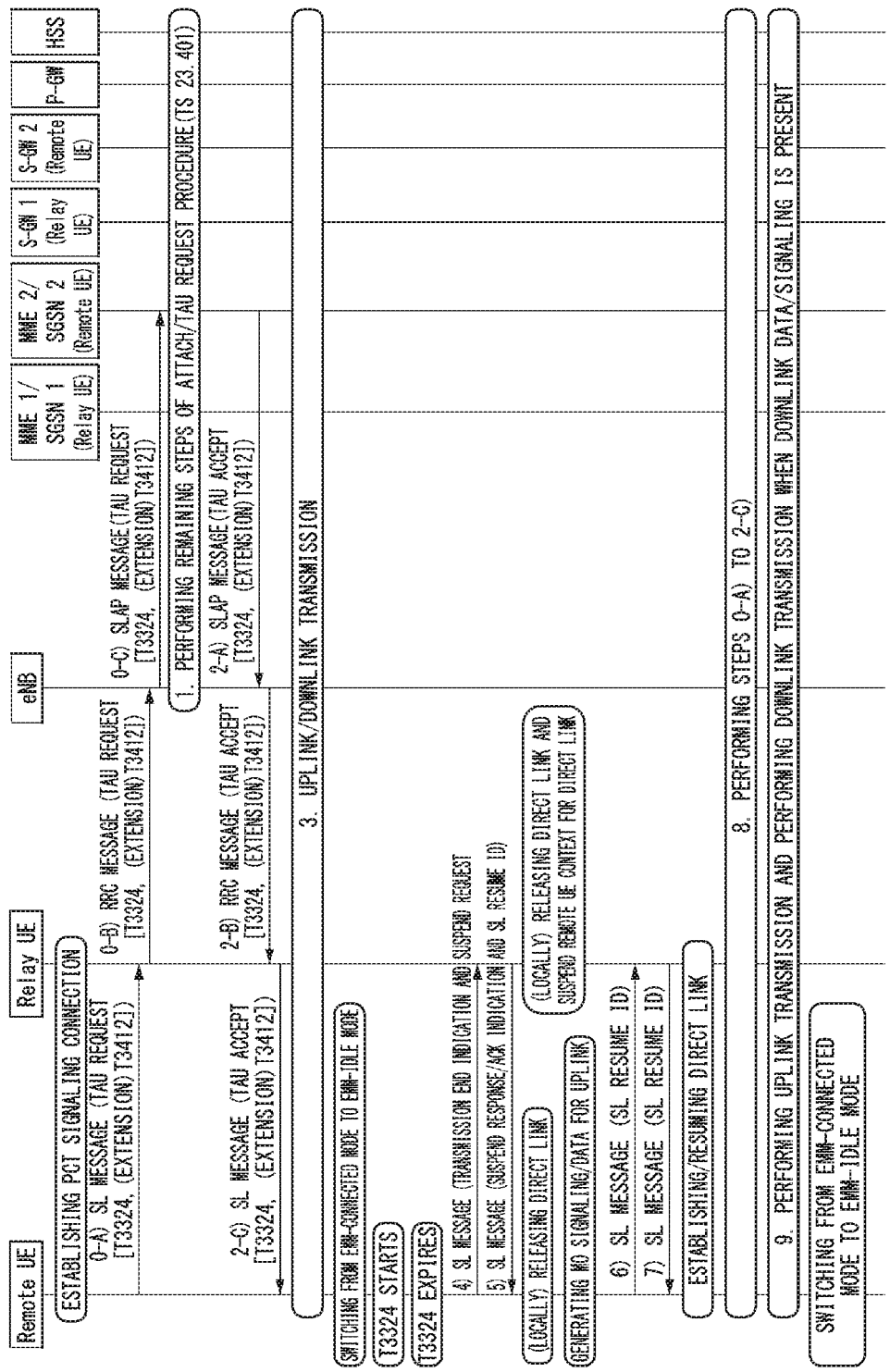
FIG. 21 is a diagram illustrating a method for transmitting data through a relay according to an embodiment of the present invention.

FIG. 21 is a diagram illustrating a method for transmitting data through a relay according to an embodiment of the present invention.

Steps 0-A to 2-C. The remote UE performs a process of accepting the request after requesting the network to operate in the power saving mode (PSM) in a state in which the remote UE establishes the direct link with the relay UE.

The remote UE transmits an SL message including a TAU request message (or an attach request message) including a timer T3324 and a timer (extension) T3412 to the relay UE (step 0-A), the relay UE transmits to the (e)NB an RRC message including a TAU request message (or Attach Request message) including the timer T3324 and the timer (extension) T4312 (step 0-B), and the (e)NB transmits to MME 2 (or SGSN 2) of the remote UE an S1AP message including a TAU request message (or Attach Request message) including the timer T3324 and the timer (extension) T3412 (step 0-C).

Thereafter, the remaining steps of the attach/TAU procedure may be performed. In relation to more specific procedures, TS 23.401 V14.2.0 may be incorporated into this document as a reference.

The MME 2 (or SGSN 2) of the remote UE transmits to the (e)NB an S1AP message including a TAU Accept message (or Attach Accept message) including the timer T3324 and the timer (extension) T3412 (step 2-A), the (e)NB transmits to the relay UE an RRC message including a TAU Accept message (or Attach Accept message) including the timer T3324 and the timer (extension) T3412 (step 2-B), and the relay UE transmits to the remote UE an SL message including a TAU Accept message (or Attach Request message) including the timer T3324 and the timer (extension) T3412 (step 2-C).

Step 3. The remote UE performs UL/DL transmission.

Thereafter, when the remote UE switches from the EMM-CONNECTED mode to the EMM-IDLE mode, the remote UE starts the timer 3324.

Step 4. When the timer T3324 expires, the remote UE transmits to the relay UE a transmission end indication and/or a suspend request indication through an SL message (e.g., a sidelink suspend request message) at the time of or just before switching to the PSM (for Uu connection).

Step 5. When the relay UE may suspend a UE context (including a session context and a security context) of the remote UE, the relay UE transmits to the remote UE an SL message (e.g., a sidelink suspend accept/response message) including the SL Resume ID together with a suspend accept/confirm indication.

In this case, the relay UE and the remote UE locally release the direct link.

Alternatively, the relay UE and the remote UE may perform the direct link release procedure to explicitly release the direct link.

When the direct link is successfully suspended, the remote UE and the relay UE may memorize (store) that the SL Resume ID and the corresponding direct link are suspended. To this end, the corresponding direct link may be memorized (stored) by UE identifiers (for example, a source layer-2 ID and a destination layer-2 ID) corresponding to the direct link. Alternatively, a link number for the direct link is allocated to memorize (store) the corresponding direct link. In addition, it is memorized (stored) that the corresponding direct link is suspended.

On the contrary, unlike FIG. 21, when the relay UE may not suspend the UE context (including the session context and the security context) of the remote UE, the relay UE may transmit to the remote UE an SL message (e.g., a sidelink suspend reject/response message) including a suspend reject indication. When the suspend is rejected, the remote UE may operate as one of two following cases.

Case A0) Thereafter, when the direct link is maintained, the operation in the related art may be performed as follows.
When the remote UE wishes to maintain the direct link, the remote UE may perform the direct link keepalive procedure for maintaining the direct link.
When the remote UE does not wish to maintain the direct link, the remote UE may perform the direct link release procedure for maintaining the direct link.

Case B) Thereafter, when the direct link is released, in the case of the MO (SL or UL) signaling/data is generated, the remote UE may perform the operation in the related art, which includes the direct link setup procedure for establishing the direct link.

Step 6. When the direct link is successfully suspended in step 5 above, the remote UE performs a side link resume procedure for resuming the suspended direct link in the case where the MO (SL or UL) signaling/data is generated.

That is, the remote UE may encapsulate the SL Resume ID received and stored in step 5 above in the SL message (for example, the Sidelink Resume Request message) and configure the Layer-2 ID of the relay UE corresponding to the direct link to the destination Layer-2 ID and transmit the Layer-2 ID to the relay UE.

Step 7. When the relay UE that receives the Layer-2 ID may confirm the SL resume ID and resume the SL UE context of the corresponding remote UE, the relay UE allocates and transmits a resume accept/confirm indication indicating that the resume is successful and (the existing or new) SL Resume ID to the SL message (e.g., a Sidelink Resume message). Thereafter, the direct link between the relay UE and the remote UE is resumed.

When the relay UE may confirm the SL resume ID and may not resume the SL UE context of the corresponding remote UE, the relay UE transmits a resume reject indication indicating that the resume is rejected, which is included in the SL message (e.g., a Sidelink Resume message). The remote UE that receives the resume reject message may recognize that the resume is unsuccessful and perform the operation in the related art, which includes the direct link setup procedure for establishing the direct link.

Step 8. When the direct link is resumed or established, the remote UE transmits the signaling or data to the relay UE through the SL.

When there is the UL signaling/data to be transmitted, the remote UE may perform a process of accepting the request after requesting the network to operate in the power saving mode (PSM) in a state in which the remote UE establishes the direct link with the relay UE. That is, steps 0-A to 2-C above may be performed.

9) When there is the UL signaling/data to be transmitted, the remote UE performs UL transmission. Further, in this process, the DL transmission may also be performed. Thereafter, the remote UE may operate in one of the following options.

Option 1) When the remote UE switches from the EMM-CONNECTED mode to the EMM-IDLE mode, the remote UE may start T3324 and restart step 4 above when T3324 expires.

In addition, when the relay UE recognizes the switching of the remote UE from the EMM-CONNECTED mode to the EMM-IDLE mode and the expiration of the T3324, the relay UE may performs step 4 above to the remote UE and the remote UE may perform step 5 above to the relay UE (in this case, may be performed before the expiration of T3324). The subsequent process is the same as the steps described above.

Option 2) As another method, the remote UE may switch from the EMM-CONNECTED mode to the EMM-CONNECTED mode without separately performing steps 4 and 5 (when T3324 expires) and the relay UE and the remote UE may suspend mutual UE contexts and locally release the direct link.

Thereafter, when the MO (SL or UL) signaling/data is generated, the process may be performed again from step 6 above.

Next, a case where the UE is eDRX will be described.

Figure 22:
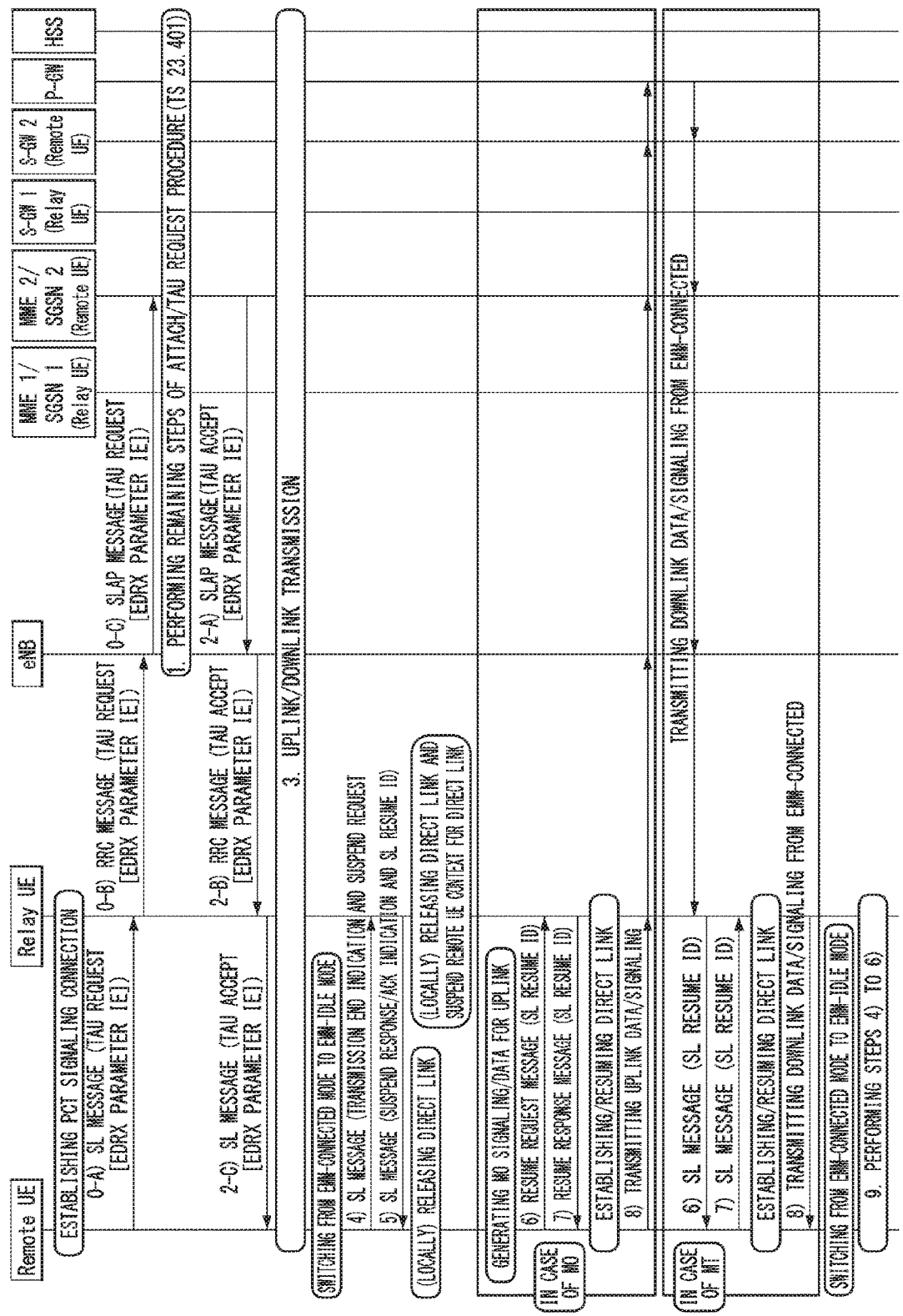
FIG. 22 is a diagram illustrating a method for transmitting data through a relay according to an embodiment of the present invention.

FIG. 22 is a diagram illustrating a method for transmitting data through a relay according to an embodiment of the present invention.

Steps 0-A to 2-C. A remote UE establishes a direct link with the relay UE and performs a process of receiving a request to the network to operate as the eDRX.

The remote UE transmits an SL message including a TAU Request message (or an Attach Request message) including an eDRX parameter IE to a relay UE (step 0-A), the relay UE transmits an RRC message including the TAU Request message (or the Attach Request message) including the eDRX parameter IE to an (e)NB (step 0-B), and the (e)NB transmits an S1 AP message including the TAU Request message (or the Attach Request message) including the eDRX parameter IE to an MME 2 (or SGSN 2) of the remote UE (step 0-C).

Thereafter, the remaining steps of the attach/TAU procedure may be performed. In relation to more specific procedures, TS 23401 V14.2.0 may be incorporated into this document as a reference.

The remote UE transmits an S1 AP message including a TAU Accept message (or an Attach Accept message) including an eDRX parameter IE to the (e)NB (step 2-A), the (e)NB transmits an RRC message including the TAU Accept message (or the Attach Accept message) including the eDRX parameter IE to the relay UE (step 2-B), and the relay UE transmits an SL message including the TAU Accept message (or the Attach Accept message) including the eDRX parameter IE to the remote UE (step 2-C).

Thereafter, the remote UE may transmit the eDRX parameter with the network to the relay UE in order to apply the eDRX with the network to direct communication with the relay UE. This process may be performed immediately after step 2-C or may be performed in step 4. Further, the eDRX parameter may be transmitted as a value received in step 2-C as it is, or may be transmitted as an eDRX cycle and a paging occasion value or a value that can calculate the eDRX cycle and the paging occasion value.

Step 3. The remote UE performs UL/DL transmission.

Thereafter, the remote UE switches from an EMM-CONNECTED mode to an EMM-IDLE mode.

Step 4. Before or immediately before switching to the eDRX mode (for the Uu connection), the remote UE transmits a transmission termination indication and/or a suspend request indication via the SL message (e.g., a Sidelink Suspend Request message) to the relay UE.

Step 5. When the relay UE may suspend a UE context (including a session context, and a security context) of the remote UE, the relay UE transmits an SL message (e.g., a Sidelink Suspend accept/response message) including an SL Resume ID together with a suspend accept/confirm indication to the remote UE.

At this time, the relay UE and the remote UE release the direct link locally.

Alternatively, the relay UE and the remote UE may also perform a direct link release procedure to explicitly release the direct link.

When the direct link is successfully suspended, the remote UE and the relay UE may remember (store) that the SL Resume ID and the corresponding direct link have been suspended. To this end, the remote UE and the relay UE may remember (store) the corresponding direct link by UE identifiers corresponding to the corresponding direct link (e.g., a source layer-2 ID and a destination layer-2 ID). Alternatively, a link number for the direct link may be allocated and remembered (stored). In addition, the remote UE and the relay UE remembers (stores) the corresponding direct link is in a suspended state.

On the other hand, unlike FIG. 22, when the Relay UE cannot suspend the UE context (including the session context and the security context) of the remote UE, the relay UE may transmit an SL message (e.g., Sidelink Suspend reject/response message) including a suspend reject indication to the remote UE. The remote UE may operate in one of two cases below when the suspend is rejected.

Case A) Thereafter, if the direct link is maintained, the conventional operation may be performed as follows.

When the remote UE intends to maintain a direct link, the remote UE may perform a direct link keepalive process for maintaining a direct link.

When the remote UE does not intend to maintain a direct link, the remote UE may perform a direct link release procedure for releasing a direct link.

Case B) Thereafter, when the direct link is released, the remote UE may perform a conventional operation including a direct link setup procedure for establishing the direct link when MO (SL or UL) signaling/data occurs.

Case MO) The remote UE has UL signaling/data.

Step 6. When the direct link is successfully suspended in step 5 above, the remote UE performs a sidelink resume procedure to resume the suspended direct link when MO (SL or UL) signaling/data occurs.

That is, the remote UE includes the SL Resume ID received and stored in step 5 prior to the SL message (e.g., the Sidelink Resume Request message), and may set a Layer-2 ID of the relay UE corresponding to the direct link as the destination Layer-2 ID to transmit the Layer-2 ID to the relay UE.

Step 7. When the relay UE receiving the Layer-2 ID confirms the SL resume ID and resumes the SL UE context of the corresponding remote UE, the relay UE allocates and transmits a resume accept/confirm indication that the resume had been successful and an (existing or new) SL resume ID to the SL message (e.g., the Sidelink Resume message). Thereafter, the direct link between the relay UE and the remote UE is resumed.

The relay UE confirms the SL resume ID and does not resume the SL UE context of the corresponding remote UE, the relay UE transmits the SL message (e.g., a Sidelink Resume Reject message) including a Resume reject indication that the resume is rejected. The remote UE receiving the SL message recognizes that the resume has failed and may perform the conventional operation including the direct link setup procedure for establishing the direct link.

Step 8. When the direct link is resumed or established, the remote UE transmits signaling or data to the relay UE through the SL.

When there is UL signaling/data to be transmitted by the remote UE, the remote UE may perform a procedure for transmitting the corresponding UL signaling/data in a state where a direct link with the relay UE is established.

Case MT) In the case where DL data/signaling (or SL data/signaling) for the remote UE occurs Step 6. When the direct link is successfully suspended in step 5, in the case where the DL data/signaling (or SL data/signaling) occurs or the occurrence is recognized (e.g., a paging for the remote UE is received), the relay UE performs a Sidelink resume procedure for resuming the suspended direct link.

That is, the relay UE includes the SL Resume ID received and stored in step 5 prior to the SL message (e.g., the Sidelink Resume Request message), and may set a Layer-2 ID of the remote UE corresponding to the direct link as the destination Layer-2 ID to transmit the Layer-2 ID to the relay UE.

Step 7. When the remote UE receiving the Layer-2 ID confirms the SL resume ID and resumes the SL UE context of the corresponding relay UE, the remote UE allocates and transmits a resume accept/confirm indication that the resume had been successful and an (existing or new) SL resume ID to the SL message (e.g., the Sidelink Resume message). Thereafter, the direct link between the relay UE and the remote UE is resumed.

When the remote UE confirms the SL resume ID and does not resume the SL UE context of the corresponding relay UE, the remote UE transmits the SL message (e.g., a Sidelink Resume Reject message) including a Resume reject indication that the resume is rejected. The relay UE receiving the SL message recognizes that the resume has failed and may perform the conventional operation including the direct link setup procedure for establishing the direct link.

Step 8. When the direct link is resumed or established, the relay UE transmits signaling or data to the remote UE through the SL.

When there is the DL signaling/data, the relay UE performs the procedure for transmitting the DL signaling/data while the direct link with the remote UE is established.

Step 9. Thereafter, the relay UE may operate one of the following options:

Option 1) When the remote UE switches from the EMM-CONNECTED mode to the EMM-IDLE mode, the remote UE may perform the above step 4 again.

When the relay UE recognizes the switching of the remote UE from the EMM-CONNECTED mode to the EMM-IDLE mode, the relay UE performs the above step 4 toward the remote UE, and then the remote UE may perform the above step 5 to the relay UE. Thereafter, the process is the same as the above-described steps.

Option 2) As another method, without performing separate steps 4 and 5, the remote UE switches from the EMM-CONNECTED mode to the EMM-IDLE mode, and the relay UE and the remote UE may suspend the other UE context and locally release the direct link.

Thereafter, when MO (SL or UL) or MT (SL or DL) signaling/data occurs, the process may be performed again from step 6 above.

Hereinafter, a case where the UE is in an MICO mode in the 5G system will be described.

Figure 23:
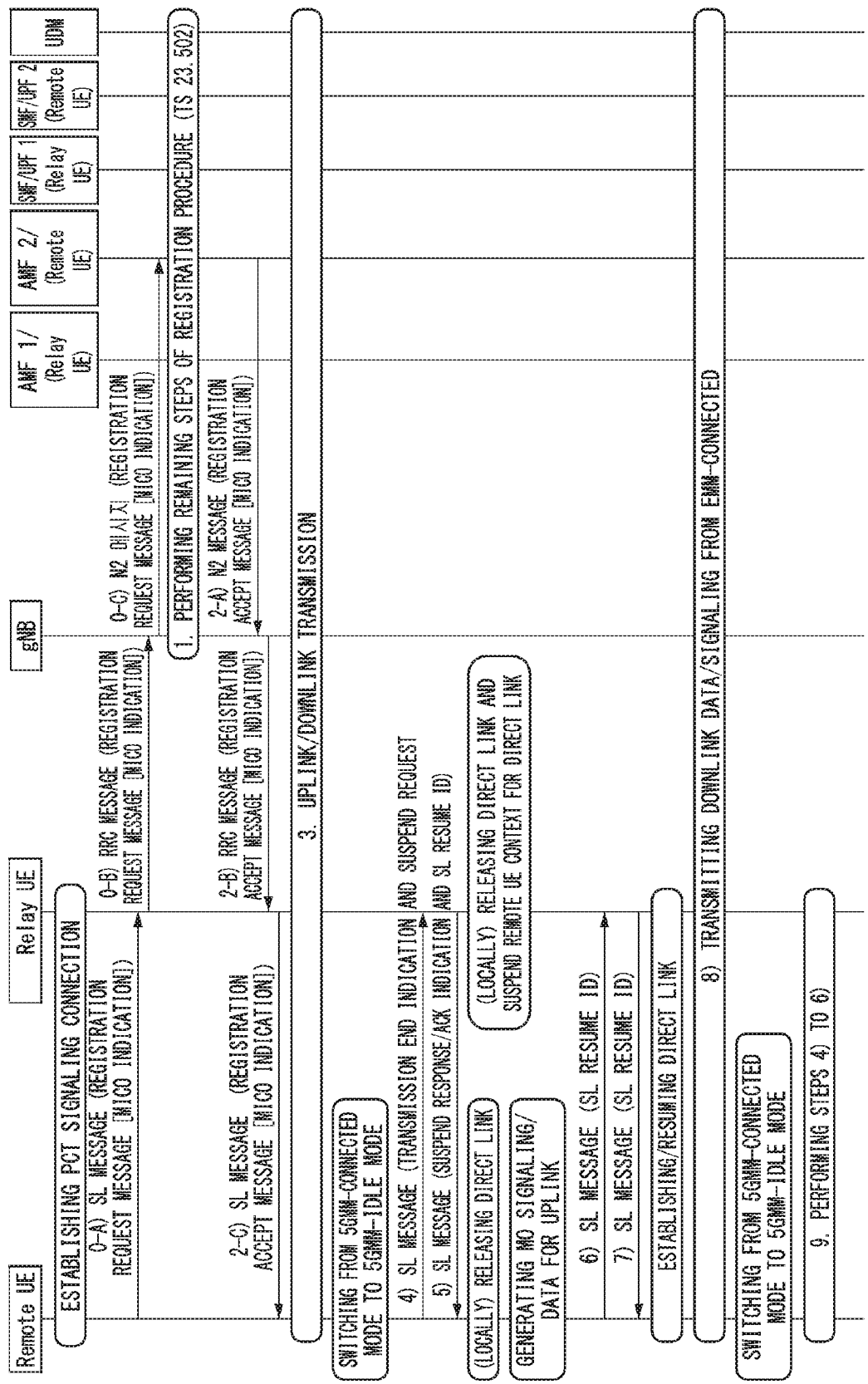
FIG. 23 is a diagram illustrating a method for transmitting data through a relay according to an embodiment of the present invention.

FIG. 23 is a diagram illustrating a method for transmitting data through a relay according to an embodiment of the present invention.

Steps 0-A to 2-C. The remote UE establishes a direct link with the relay UE and performs a process of receiving a request to the network to operate in the MICO mode.

The remote UE transmits an SL message including a Registration Request message including a MICO indication to a relay UE (step 0-A), the relay UE transmits an RRC message including the Registration Request message including the MICO indication to a gNB (step 0-B), and the gNB transmits an N2 message including the Registration Request message including the MICO indication to a AMF 2 of the remote UE (step 0-C).

Thereafter, the remaining steps of the registration procedure may be performed. In relation to more specific procedures, TS 23.502 V15.0.0 may be incorporated into this document as a reference.

The remote UE transmits an N2 message including a Registration Accept message including a MICO indication to the gNB (step 2-A), the gNB transmits an RRC message including the Registration Accept message including the MICO indication to the relay UE (step 2-B), and the relay UE transmits an SL message including the Registration Accept message including the MICO indication to the remote UE (step 2-C).

Step 3. The remote UE performs UL/DL transmission.

Thereafter, the remote UE switches from a SGMM-CONNECTED (or CM (Connection Management)-CONNECTED) mode to a SGMM-IDLE (or CM-IDLE) mode and operates in the MICO mode.

Step 4. While or immediately before switching to the MICO mode (for the Uu connection), the remote UE transmits a transmission termination indication and/or a suspend request indication via the SL message (e.g., a Sidelink Suspend Request message) to the relay UE.

Step 5. When the relay UE may suspend a UE context (including a session context, and a security context) of the remote UE, the relay UE transmits an SL message (e.g., a Sidelink Suspend accept/response message) including an SL message ID together with a suspend accept/confirm indication to the Remote UE.

At this time, the relay UE and the remote UE release the direct link locally.

Alternatively, the relay UE and the remote UE may also perform a direct link release procedure to explicitly release the direct link.

When the direct link is successfully suspended, the remote UE and the relay UE may remember (store) that the SL Resume ID and the corresponding direct link have been suspended. To this end, the remote UE and the relay UE may remember (store) the corresponding direct link by UE identifiers corresponding to the corresponding direct link (e.g., a source layer-2 ID and a destination layer-2 ID). Alternatively, a link number for the direct link may be allocated and remembered (stored). In addition, the remote UE and the relay UE remembers (stores) the corresponding direct link is in a suspended state.

On the other hand, unlike FIG. 23, when the relay UE can not suspend the UE context (including the session context and the security context) of the remote UE, the relay UE may transmit an SL message (e.g., Sidelink Suspend reject/response message) including a suspend reject indication to the remote UE. The remote UE may operate in one of two cases below when the suspend is rejected.

Case A) Thereafter, if the direct link is maintained, the conventional operation may be performed as follows.

When the remote UE intends to maintain a direct link, the remote UE may perform a direct link keepalive process for maintaining a direct link.

When the remote UE does not intend to maintain a direct link, the remote UE may perform a direct link release procedure for releasing a direct link.

Case B) Thereafter, when the direct link is released, the remote UE may perform a conventional operation including a direct link setup procedure for establishing the direct link when MO (SL or UL) signaling/data occurs.

Step 6. When the direct link is successfully suspended in step 5 above, the remote UE performs a sidelink resume procedure to resume the suspended direct link when MO (SL or UL) signaling/data occurs.

That is, the remote UE includes the SL Resume ID received and stored in step 5 prior to the SL message (e.g., the Sidelink Resume Request message), and may set a Layer-2 ID of the relay UE corresponding to the direct link as the destination Layer-2 ID to transmit the Layer-2 ID to the relay UE.

Step 7. When the Relay UE receiving the Layer-2 ID confirms the SL resume ID and resumes the SL UE context of the corresponding remote UE, the relay UE allocates and transmits a resume accept/confirm indication that the resume had been successful and an (existing or new) SL resume ID to the SL message (e.g., the Sidelink Resume message). Thereafter, the direct link between the relay UE and the remote UE is resumed.

When the relay UE confirms the SL resume ID and does not resume the SL UE context of the corresponding remote UE, the relay UE transmits the SL message (e.g., a Sidelink Resume Reject message) including a Resume reject indication that the resume is rejected. The remote UE receiving the SL message recognizes that the resume has failed and may perform the conventional operation including the direct link setup procedure for establishing the direct link.

Step 8. When the direct link is resumed or established, the remote UE transmits signaling or data to the relay UE through the SL.

When there is UL signaling/data to be transmitted by the remote UE, the remote UE may perform a procedure for transmitting the corresponding UL signaling/data in a state where a direct link with the relay UE is established.

Step 9. Thereafter, the remote UE may operate one of the following options:

Option 1) When the remote UE switches from the SGMM-CONNECTED mode to the SGMM-IDLE mode, the remote UE may perform step 4 above again.

When the relay UE recognizes the switching of the remote UE from the SGMM-CONNECTED mode to the SGMM-IDLE mode, the relay UE performs the above step 4 toward the remote UE, and then the remote UE may perform the above step 5 to the relay UE. Thereafter, the process is the same as the above-described steps.

Option 2) As another method, without performing separate steps 4 and 5, the remote UE switches from the SGMM-CONNECTED mode to the SGMM-IDLE mode, and the relay UE and the remote UE may suspend the other UE context and locally release the direct link.

Thereafter, when MO (SL or UL) signaling/data occurs, the process may be performed again from step 6 above.

When described above in FIGS. 21 to 23 (PSM, eDRX, MICO modes), the SL message may be a PC5 signaling protocol message. At this time, the SL message may be implemented as a PC5 signaling protocol message (e.g., a DIRECT_COMMUNICATION_RELEASE message and a DIRECT_COMMUNICATION_RELEASE_ACCEPT message), or may be implemented as a newly defined message.

Embodiment 2

In the embodiment, a method for efficiently transmitting/receiving small data received from a plurality of remote UEs to/from a relay UE will be proposed.

In the embodiment, it is assumed that the small data is not sensitive to delay and there is time to be transferred to a destination (e.g., an application server).

First, a UL data transmission processing method will be described.

1. If each remote UE intends to transmit its small data through a sidelink (i.e., a direct link), the remote UE transmits the small data as follows.

Each remote UE transmits a life time when the corresponding small data needs to be transmitted to the destination (e.g., the application server) as a separate IE included in the PC5 message while transmitting the corresponding small data through the PC5 message.

2. The relay UE receiving the data confirms the life time of the corresponding small data, sets a value of the timer for the life time as the received life time, and starts the timer.

The relay UE attempts to transmit small data through a Uu interface before the timer expires.

Specifically, the relay UE checks a timer having the smallest remaining time among the timers related with the life time of the small data of the received remote UEs. Then, when the timer value is equal to or smaller than a predetermined value (hereinafter referred to as alpha), the relay UE starts the small data transmission through the Uu interface.

In this case, the alpha value may be set to be equal to or larger than the time required for the relay UE to transmit UL data to a destination (e.g., an application server).

At this time, the relay UE may transmit all the small data that are currently received and buffered while transmitting the small data, regardless of the life time of the corresponding small data.

Next, a DL data transmission processing method will be described.

The DL data transmission may be performed by a method of transmitting maximum DL data to be collected like the UL processing at a time. At this time, the following options exist depending on the entity that is a subject of performing the corresponding operation.

Option I) if the Destination (e.g., the Application Server) Corresponds to a Subject that Processes the DL Data 1. The destination (e.g., the application server) recognizes that the remote UE is transmitting/receiving data to the network through the relay UE. For this operation, the remote UE or relay UE or the 3GPP network may inform the destination (e.g., the application server) of the following contents.

Indication that the remote UE transmits/receives data to the network through the relay UE Identifier (e.g., application identifier (ID) or external identifier) of the corresponding relay UE Last delivery time information of remote UE (a method of calculating the DL last delivery time will be described below)

2. The destination (e.g., the application server) confirms a relay UE linked with each remote UE based on the information received in step 1 above (using the identity of the relay UE). A set of remote UEs connected to the same relay UE is confirmed and the corresponding remote UEs is set as a group. Then, the small data to be delivered to each remote UE belonging to the group is confirmed. Further, the last delivery times that the corresponding small data should be delivered to each remote UE is confirmed.

3. The destination (e.g., the application server) confirms the last delivery time of the corresponding small data of the remote UEs connected to the same relay UE, sets the value of the timer for the last delivery time as the last delivery time, and starts the corresponding timer.

The destination (e.g., the application server) attempts to transmit DL small data before the timer expires.

Specifically, the destination (e.g., the application server) checks a value having the smallest remaining time among the timer values for the last delivery time of remote UEs connected to the same relay UE. The smallest value is set as the group last delivery time. The group last delivery time value may be updated as the corresponding value when a new last delivery time occurs.

When the value of the group last delivery time is equal to or smaller than a predetermined value (hereinafter, referred to as alpha), the destination (e.g., the application server) starts the small data transmission for the relay UE and the remote UEs belonging to the corresponding group.

In this case, the alpha value may be set to be equal to or larger than the time required for transmitting DL data from the destination (e.g., the application server) to the remote UE.

4. When the remote UE transmits UL small data to the destination (e.g., the application server), the remote UE may deliver the UL small data to the destination (e.g., the application server) without separate signaling (e.g., a service request procedure) until a non-reachable time (that is, a time period for maintaining a reachable state after the small data transmission). This information may be delivered from the remote UE or relay UE or the 3GPP network to the destination (e.g., the application server).

When it is determined that the destination (e.g., the application server) receiving the information can transmit the DL small data for the time period for maintaining the reachable state of the remote UE, the destination (e.g., the application server) may also transmit the DL small data for the corresponding remote UE regardless of steps 1 to 3 as the transmission method of the DL small data.

At this time, the destination (e.g., the application server) may transmit buffering small data of the remote UEs connected to the same relay UE together.

The time period for maintaining the reachable state after the small data transmission of the remote UE may be determined by considering a time period for maintaining the reachable state after the small data transmission of the relay UE. That is, the time period may be determined to be a smaller value among the corresponding time period of the remote UE and the corresponding time period of the relay UE. The determined value is set to a time (i.e., a time period for maintaining the reachable state after the small data transmission) until a non-reachable time of the remote UE to be delivered to the destination (e.g., the application server).

Option II) when the 3GPP Network Corresponds to a Subject that Processes DL Data 1. When the small data is transmitted from the destination (e.g., the application server), a life time for the corresponding small data is transmitted together. At this time, an identifier (e.g., an application identifier (ID) or an external identifier) of the relay UE is delivered together.

2. The P-GW receiving the identifier transmits the life time to the S-GW through GPRS Tunneling Protocol (GTP) signaling included in a separate IE together with the corresponding small data. An instruction or an IE indicating that the data is for DL small data may be further included. The identifier of the relay UE received in step 1 is converted into a 3GPP identifier (e.g., IMSI) of the relay UE to be further included in the GTP signaling. The identifier (e.g., IMSI) of the remote UE is included in the GTP signaling according to the conventional operation.

3. If the remote UE is in the EMM-IDLE, the S-GW receiving the identifier operates as follows.

A. The received life time and the identifier (e.g., IMSI) of the relay UE are included in a downlink data notification (DDN) message to be transmitted to the MME. This DDN message may include an indication or IE indicating that it is for DL small data.

B. The MME receiving the DDN message confirms the following information through the DDN message.

The remote UE is confirmed through the identifier included in the DDN message and the life time is also confirmed. The relay UE that is linked (or associated) with the corresponding remote UE may be confirmed through the identifier for the relay UE.

The MME may have the information of the relay UE to which the remote UE is linked (or associated) or confirm the information through the DDN message. Based on this, the identifier (e.g., IMSI or GUTI) of the relay UE is confirmed.

The last delivery time of the corresponding remote UE is calculated. (The method of calculating the DL last transmission time will be described below).

C. The MME performs the following operation based on the last delivery time of the remote UE.

i. When the last delivery time of the remote UE does not exist (i.e., the delivery of the corresponding small data to the remote UE is impossible during the life time), one of the following operations operates.

The MME responds to the S-GW with a DDN failure indication in response to the DDN message. At this time, an existing defined cause (e.g., 'unable to page UE') or a newly defined cause (e.g., 'unable to page UE during life time') is transmitted as the cause. The S-GW recognizes that the data is not delivered to the UE during the life time and discards the data.

In this case, the S-GW buffers the data until the life time expires and may discard the data if the UE is not reachable until the life time expires, as compared to the case where the UE is reachable during the life time.

Alternatively, the MME may request (extended) buffering during the life time of the UE in response to the S-GW. At this time, the MME may inform the S-GW of an expected reachable time of the UE. The S-GW buffers the data until the life time expires and may discard the data if the UE is not reachable until the life time has expired.

ii. On the other hand, when the last delivery time of the remote UE exists (i.e., the delivery of the small data to the remote UE is possible during the life time), one of the following operations operates.

The MME requests (extended) buffering during the last delivery time of the UE in response to the S-GW. At this time, an identifier (e.g., IMSI) of the connected relay UE may be informed.

The S-GW receiving this buffers both the small data of the corresponding remote UE and the subsequent small data during the last delivery time.

At this time, when the S-GW confirms that the corresponding remote UE is linked with the same relay UE as the other remote UE, it may be recognized as the same group. In addition, the S-GW may set the shortest last delivery time among the last delivery time of the corresponding group as the group last delivery time.

When either the remote UE or the relay UE belonging to the same group is in the EMM-CONNECTED before the Group Last delivery time expires, or when the Group Last delivery time expires, the S-GW may transmit the buffered DL small data for the group (both the relay UE and the remote UE).

Method of calculating DL last delivery time

A procedure of calculating a last delivery time is as follows.

1. The last reachable time of the remote UE is derived within a time period in which the life time of the small data is valid.

2. The last reachable time of the relay UE is derived from the last reachable time of the remote UE derived from step 1 above.

3. The last reachable time of the relay UE is derived as the last delivery time.

Here, the last delivery time may not exist during the time period in which the life time is valid. The reason is that the remote UE or the relay UE is not reachable during the time period in which the life time is valid. At this time, the value of the last delivery time may be set to null or '0'.

A detailed example of calculating the last delivery time is as follows.

First, it is assumed that the remote UE performs the sidelink eDRX in a 20-minute cycle, and the relay UE performs the eDRX in a 10-minute cycle. That is, the remote UE awakes at the sidelink eDRX in a clock pattern of 1:20, 1:40, 2:00, 2:20, . . . . The relay UE awakes at the eDRX in a clock pattern of 1:15, 1:25, 1:35, 1:45, 1:55, 2:00, 2:15, . . . . It is assumed that the received life time of small data is 5:25.

When performing step 1 above, the last reachable time of the remote UE within the valid time of the life time is 5:20.

When performing step 2 above, the last reachable time of the relay UE is 5:15 in the last reachable time of the remote UE.

When performing step 3 above, the last delivery time is 5:15.

If the UE is not always reachable, the meaning may be that the UE uses eDRX or PSM. In other words, the remote UE may use eDRX, PSM, or sidelink eDRX.

In the above example, it is assumed that both the remote UE and the relay UE use eDRX. However, if the remote UE or the relay UE uses a general operation that does not use eDRX or PSM, the UE is always reachable in the network, so that the reachable time of the UE can be applied without limitation.

That is, in the above example, assuming that the remote UE performs a normal operation, the last reachable time of the remote UE in the valid time of the life time in step 1 is 5 hours 25 minutes. In addition, assuming that the relay UE performs a general operation, the last reachable time of the relay UE in step 2 is 5 hours and 25 minutes. Assuming that the remote UE and the relay UE perform the general operation, the last delivery time is 5 hours and 25 minutes. In the above example, the life time or the reachable time is given as a duration, which may be given in an actual time (e.g., 15:35:30). When the life time or the reachable time is given as a duration, it is preferred to update the last delivery time by considering a time taken to transmit the life time or the reachable time to the corresponding subject (i.e., it is preferred to subtract the time taken to transmit from the life time).

Overview of Devices to which Present Invention is Applicable

Figure 24:
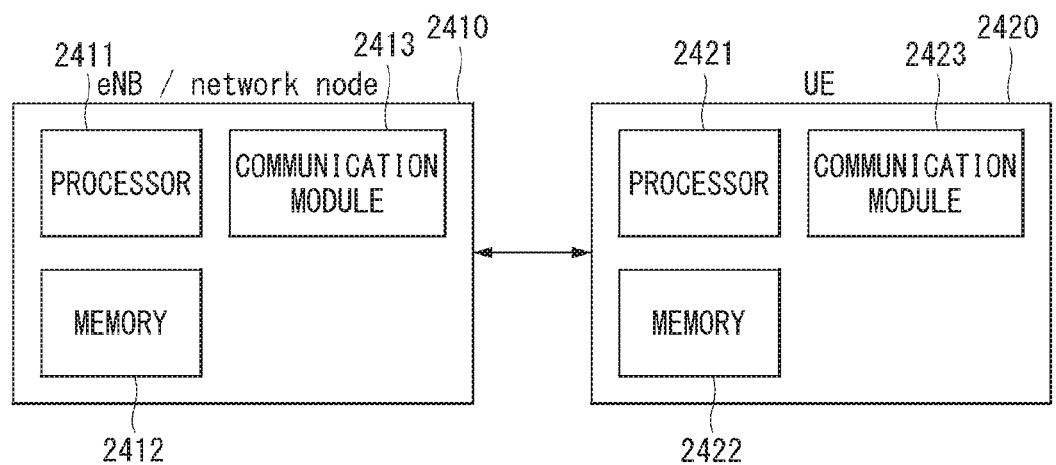
FIG. 24 illustrates a block diagram of a communication device according to an embodiment of the present invention.

FIG. 24 illustrates a block diagram of a communication apparatus according to an embodiment of the present invention.

Referring to FIG. 24, a wireless communication system includes a network node 2410 and multiple user equipments 2420.

The network node 2410 includes a processor 2411, a memory 2412, and a communication module 2413. The processor 2411 implements a function, a process, and/or a method which are proposed in FIGS. 1 to 23 above. Layers of a wired/wireless interface protocol may be implemented by the processor 2411.

The memory 2412 is connected with the processor 2411 to store various pieces of information for driving the processor 2411. The communication module 2413 is connected with the processor 2411 to transmit and/or receive a radio signal. An example of the network node 2410 may correspond to a base station, MME, HSS, SGW, PGW, SCEF, SCS/AS, etc. In particular when the network node 2410 is the base station, the communication module 2413 may include a radio frequency (RF) unit for transmitting/receiving a radio signal.

The UE 2420 includes a processor 2421, a memory 2422, and a communication module (or RF unit) 2423. The processor 2421 implements a function, a process, and/or a method which are proposed in FIGS. 1 to 23 above. The layers of the wireless interface protocol may be implemented by the processor 2421. In particular, the processor may include an NAS layer and an AS layer. The memory 2422 is connected with the processor 2421 to store various pieces of information for driving the processor 2421. The communication module 2423 is connected with the processor 2421 to transmit and/or receive a radio signal.

The memories 2412 and 2422 may be positioned inside or outside the processors 2411 and 2421 and connected with the processors 2411 and 2421 by various well-known means. Further, the network node 2410 (when the network node 2420 is the base station) and/or the UE 2820 may have a single antenna or multiple antennas.

Figure 25:
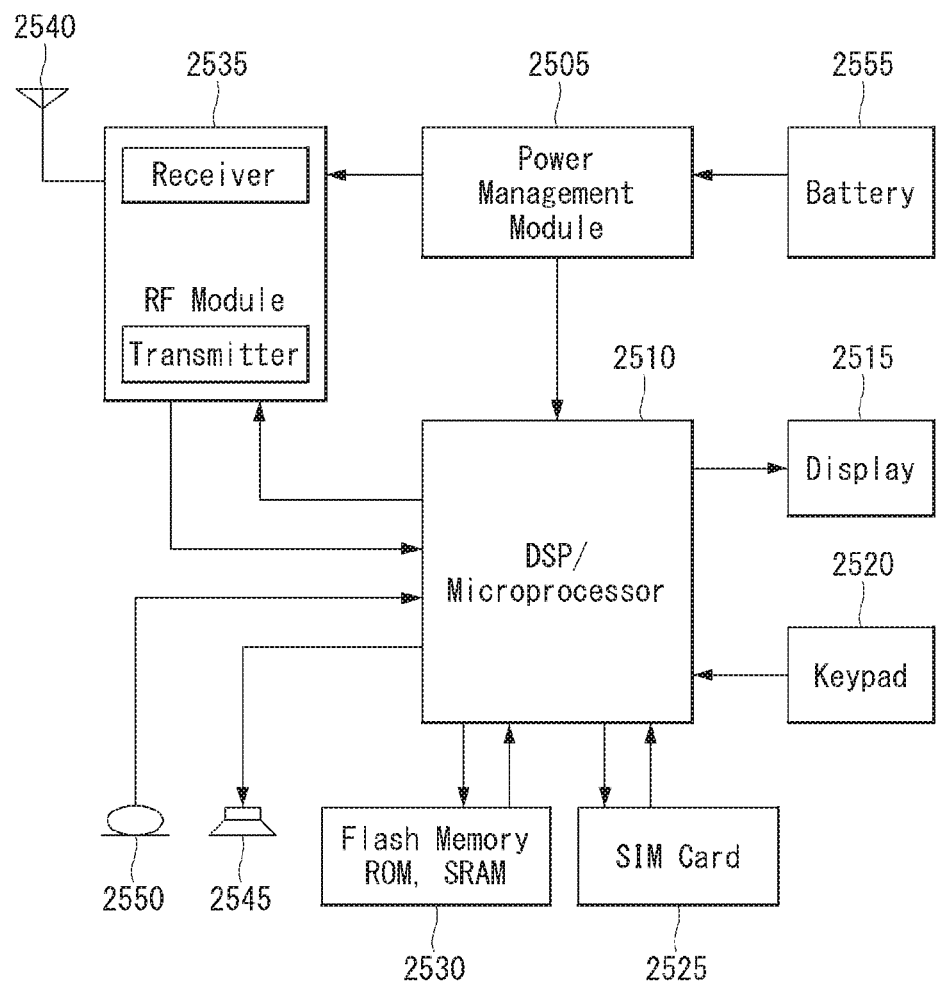
FIG. 25 illustrates a block diagram of a communication device according to an embodiment of the present invention.

FIG. 25 illustrates a block diagram of a communication apparatus according to an embodiment of the present invention.

In particular, FIG. 25 is a diagram more specifically illustrating the UE of FIG. 23 above.

Referring to FIG. 25, the UE may be configured to include a processor (or a digital signal processor (DSP) 2510, an RF module (or RF unit) 2535, a power management module 2505, an antenna 2540, a battery 2555, a display 2515, a keypad 2520, a memory 2530, a subscriber identification module (SIM) card 2525 (This component is optional), a speaker 2545, and a microphone 2550. The UE may also include a single antenna or multiple antennas.

The processor 2510 implements a function, a process, and/or a method which are proposed in FIGS. 1 to 23 above. Layers of a wireless interface protocol may be implemented by the processor 2510.

The memory 2530 is connected with the processor 2510 to store information related to an operation of the processor 2510. The memory 2530 may be positioned inside or outside the processor 2510 and connected with the processor 2510 by various well-known means.

A user inputs command information such as a telephone number or the like by, for example, pressing (or touching) a button on the keypad 2520 or by voice activation using the microphone 2550. The processor 2510 receives such command information and processes to perform appropriate functions including dialing a telephone number. Operational data may be extracted from the SIM card 2525 or the memory 2530. In addition, the processor 2510 may display command information or drive information on the display 2515 for the user to recognize and for convenience.

The RF module 2535 is connected with the processor 2510 to transmit and/or receive an RF signal. The processor 2510 transfers the command information to the RF module 2535 to initiate communication, for example, to transmit radio signals constituting voice communication data. The RF module 2535 is constituted by a receiver and a transmitter for receiving and transmitting the radio signals. The antenna 2540 functions to transmit and receive the radio signals. Upon receiving the radio signals, the RF module 2535 may transfer the signal for processing by the processor 2510 and convert the signal to a baseband. The processed signal may be converted into to audible or readable information output via the speaker 2545.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

An example is applied to the 3GPP LTE/LTE-A system is described primarily, but it is possible to apply the RRC connection method to various wireless communication systems, in particular, a 5 generation (G) system in addition to the 3GPP LTE/LTE-A system.

What is claimed is:

1. A method for transmitting and receiving, by a remote user equipment (UE), data to and from a network through a relay UE in a wireless communication system, the method comprising:
   recognizing that small data to be transmitted to the network is generated;
   performing a discovery procedure through the relay UE and a PC5 interface; and
   transmitting a PC5 message including:
      the small data to the relay UE when it is verified that the relay UE has an ability to transmit the small data to the network in the discovery procedure, and
      a life time value related to the time that the small data needs to be transmitted to the destination,
   wherein when it is indicated that the relay UE supports a small data transmitting procedure by a PC5 discovery message received from the relay UE in the discovery procedure, it is determined that the relay UE has the ability to transmit the small data to the network,
   wherein the life time value is set a value of timer in the relay UE for transmitting small data received from a plurality of remote UEs, and
   wherein based on a remaining value of the timer being equal or smaller than the time required for the relay UE to transmit the small data to a destination, the small data is transmitted to the Network.

2. The method of claim 1, wherein the PC5 discovery message is a PC5 discovery message for a UE-to-network relay discovery announcement or a PC5 discovery message for a UE-to-network relay discovery response.

3. The method of claim 1, wherein the PC5 discovery message includes a small data transmission indicator (SDTI) indicating whether the relay UE supports the small data transmitting procedure within a status indicator information element (IE) for indicating a status of a UE-to-network relay.

4. The method of claim 1, wherein when an indication indicating that transmission of the small data is required is provided from a higher layer of the remote UE together with the small data, it is recognized that the small data to be transmitted to the network is generated.

5. The method of claim 4, wherein information indicating whether set-up of a user plane is required is provided from the higher layer of the remote UE.

6. The method of claim 1, wherein the PC5 message further includes at least one of message type information indicating small data transmission or general data transmission, PDU type information indicating whether a protocol data unit (PDU) included in the PC5 message is a signaling or data, small data information indicating whether uplink and/or downlink transmission is predicted next to transmission of the small data, activation transmission time information indicating a time for maintaining transmission the relay UE and the PC5 interface, a security parameter, and a unique sequence number for the transmission of the small data.

7. The method of claim 6, further comprising:
receiving a PC5 response message in response to the PC5 message,
wherein the PCT message includes information indicating whether the transmission of the small data is successful or unsuccessful, a unique sequence number for the small data transmission, and the security parameter.

8. The method of claim 1, wherein in a case where a type of small data is control plane data, when the relay UE is in an idle mode, the small data of the remote UE, which is included in a non-access stratum (NAS) message is transmitted to the network by a control plane without performing a procedure for the relay UE to be switched to a connected mode.

9. The method of claim 1, further comprising:
transmitting or receiving, after data transmission is completed through an established direct link with the relay UE, a suspend request message for requesting suspension of the established direct link; and
receiving or transmitting a suspend accept message for indicating that the suspension for the established direct link is accepted.

10. The method of claim 9, wherein the suspend request message includes at least one of an indication indicating that transmission of all data is completed, a suspend request indication, a resume identifier, a signaling or a communication bandwidth, and communication period information.

11. The method of claim 9, wherein the suspend accept message includes at least one of the resume identifier, the signaling or the communication bandwidth, and the communication period information.

12. The method of claim 9, further comprising:
transmitting a resume request message for requesting resumption of the suspended direct link; and
receiving a resume message indicating whether the resumption of the suspended direct link is successful or unsuccessful in response to the resume request message.

13. The method of claim 12, wherein the resume request message includes a resume identifier included in the suspend accept message.

14. The method of claim 12, wherein the resume request message is used as the PC5 message including the small data.

15. A remote user equipment (UE) transmitting and receiving data to and from a network through a relay UE in a wireless communication system, the remote UE comprising:
a communication module transmitting and receiving a wired/wireless signal; and
a processor controlling the communication module,
wherein the processor is configured to
recognize that small data to be transmitted to the network is generated,
perform a discovery procedure through the relay UE and a PC5 interface, and
transmit a PC5 message including:
the small data to the relay UE when it is verified that the relay UE has an ability to transmit the small data to the network in the discovery procedure,
a life time value related to the time that the small data needs to be transmitted to the destination, and
wherein when it is indicated that the relay UE supports a small transmitting procedure by a PC5 discovery message received from the relay UE in the discovery procedure, it is determined that the relay UE has the ability to transmit the small data to the network,
wherein the life time value is set a value of timer in the relay UE for transmitting small data received from a plurality of remote UEs, and
wherein based on a remaining value of the timer being equal or smaller than the time required for the relay UE to transmit the small data to a destination, the small data is transmitted to the Network.

* * * * *